(12) United States Patent
Lee

(10) Patent No.: US 12,041,693 B2
(45) Date of Patent: Jul. 16, 2024

(54) NETWORK ID INFORMATION PROCESSING

(71) Applicant: LG Electronics Inc., Seoul (KR)

(72) Inventor: Ki-Dong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 268 days.

(21) Appl. No.: 17/614,898

(22) PCT Filed: Jul. 13, 2020

(86) PCT No.: PCT/KR2020/009158
§ 371 (c)(1),
(2) Date: Nov. 29, 2021

(87) PCT Pub. No.: WO2021/010692
PCT Pub. Date: Jan. 21, 2021

(65) Prior Publication Data
US 2022/0248216 A1    Aug. 4, 2022

Related U.S. Application Data

(60) Provisional application No. 62/873,192, filed on Jul. 12, 2019.

(51) Int. Cl.
*H04W 8/26* (2009.01)
*G06F 40/40* (2020.01)
*H04W 48/16* (2009.01)
*H04W 60/04* (2009.01)

(52) U.S. Cl.
CPC .............. *H04W 8/26* (2013.01); *G06F 40/40* (2020.01); *H04W 48/16* (2013.01); *H04W 60/04* (2013.01)

(58) Field of Classification Search
None
See application file for complete search history.

(56) References Cited

U.S. PATENT DOCUMENTS

| | | | |
|---|---|---|---|
| 8,515,422 B2 * | 8/2013 | Arzelier | H04M 1/724 455/435.1 |
| 8,756,051 B2 * | 6/2014 | Noldus | H04Q 3/005 455/433 |
| 9,049,557 B2 * | 6/2015 | Yu | H04M 1/72457 |
| 9,525,959 B1 * | 12/2016 | Eddings | H04W 8/183 |
| 2012/0015689 A1 | 1/2012 | Phillips et al. | |
| 2014/0310602 A1 | 10/2014 | Jones et al. | |
| 2014/0364056 A1 | 12/2014 | Belk et al. | |
| 2015/0351019 A1 | 12/2015 | Leonov et al. | |

FOREIGN PATENT DOCUMENTS

KR    20160125516    10/2016

* cited by examiner

*Primary Examiner* — Kenneth B Wells
(74) *Attorney, Agent, or Firm* — Fish & Richardson P.C.

(57) ABSTRACT

A disclosure of the present specification provides a method for a wireless communication device to process network ID information. The method may include the steps of: receiving network ID information about a first network; and displaying the name of the first network on a display of the wireless communication device on the basis of the network ID information and language setting information pertaining to the network name.

17 Claims, 33 Drawing Sheets

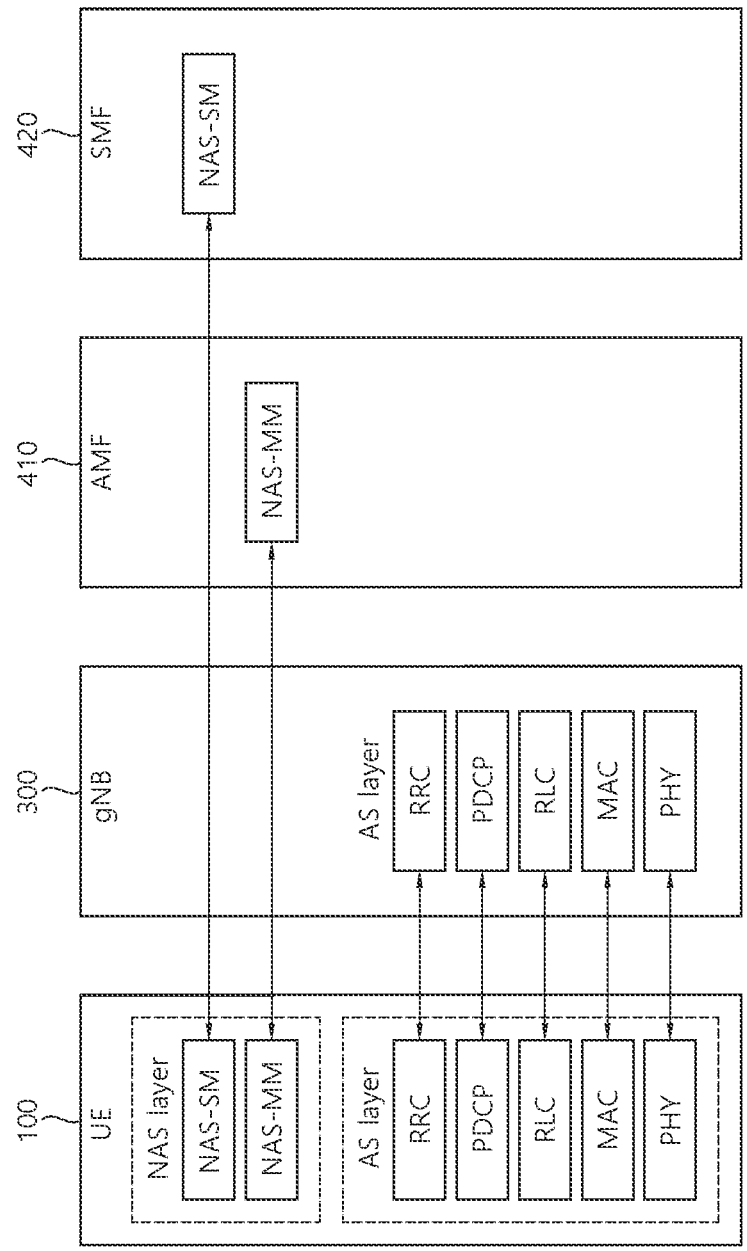

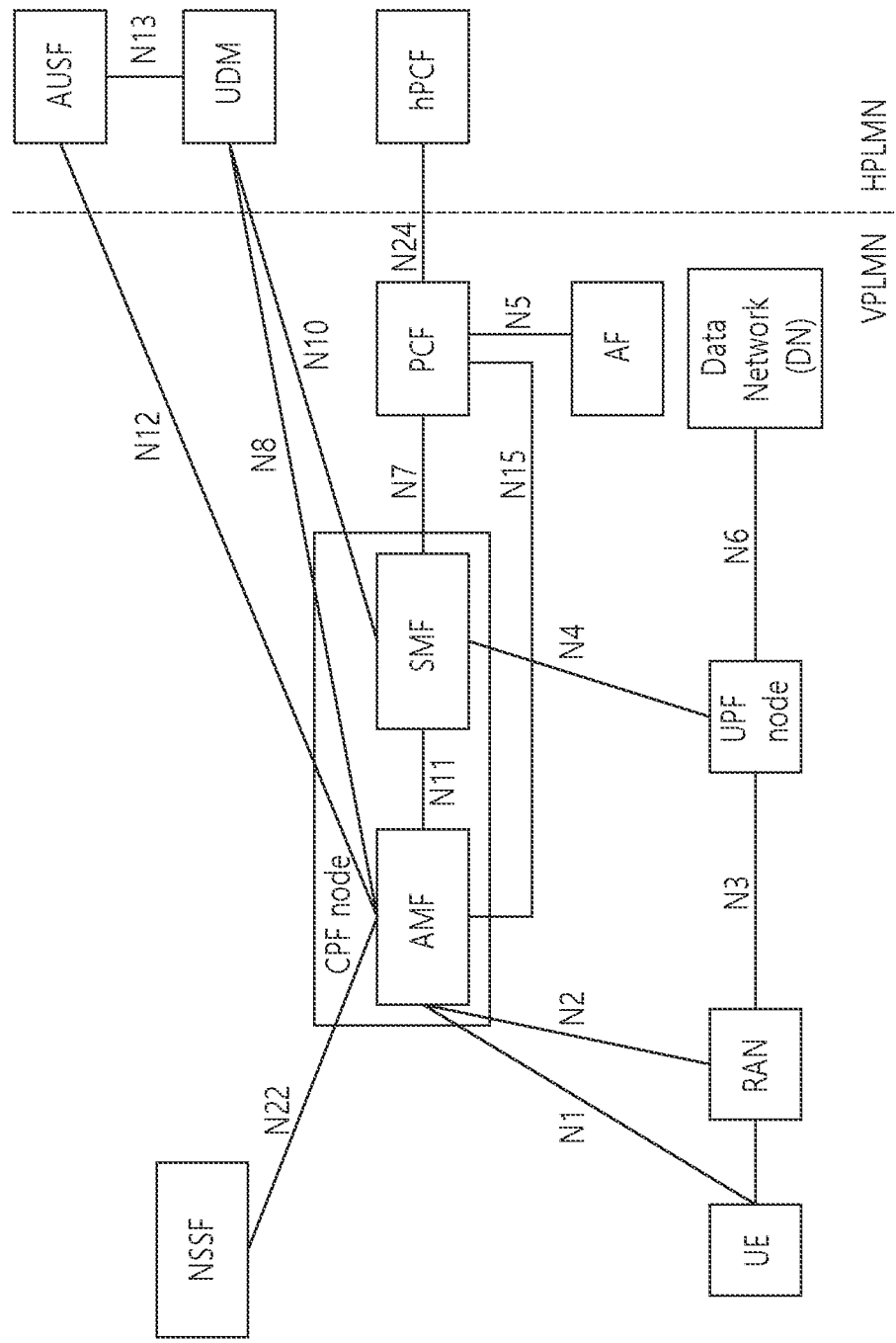

NETWORK ID INFORMATION PROCESSING

CROSS-REFERENCE TO RELATED APPLICATIONS

This application is a National Stage application under 35 U.S.C. § 371 of International Application No. PCT/KR2020/009158, filed on Jul. 13, 2020, which claims the benefit of U.S. Provisional Application No. 62/873,192, filed on Jul. 12, 2019. The disclosures of the prior applications are incorporated by reference in their entirety.

TECHNICAL FIELD

The present disclosure generally relates to mobile communication.

BACKGROUND

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

For the fifth-generation (so called 5G) mobile communication, a new radio access technology (New RAT or NR) have been studied and researched.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

The terminal may receive network ID (Identity) information from the serving network, and display the network name of the serving network on the display based on the network ID information. If a user uses a language based on Latin characters, such as English, the user may not understand non-Latin characters (eg, Chinese, Korean, Japanese, Vietnamese) included in the network name. In this case, unnecessary information that the user does not understand is displayed on the display, which may cause inconvenience to the user. When the network name includes non-Latin characters, a method for the terminal to process network ID information needs to be discussed.

SUMMARY

Accordingly, a disclosure of the present specification has been made in an effort to solve the aforementioned problem.

In order to solve the above problems, one disclosure of the present specification provides a method for a wireless communication device to process network ID information. The method includes: receiving network ID information of the first network; and displaying the name of the first network on a display of the wireless communication device based on the network ID information and the language setting information related to the network name.

In order to solve the above problems, one disclosure of the present specification provides a method for a wireless communication device to process network ID information. The method includes: displaying on a display of the wireless communication device a setting screen in which language setting information related to a network name can be input; and displaying the name of the first network on the display based on the language setting information related to the network name input based on the setting screen and the network ID information of the first network.

In order to solve the above problems, one disclosure of the present specification provides a wireless communication device for processing network ID information. The wireless communication device, at least one processor; and at least one memory for storing instructions and operably electrically connectable with the at least one processor, wherein the operations performed based on the instructions being executed by the at least one processor include: 1 Receiving network ID information of a network; and displaying the name of the first network on a display of the wireless communication device based on the network ID information and the language setting information related to the network name.

In order to solve the above problems, one disclosure of the present specification provides a wireless communication device for processing network ID information. The wireless communication device, at least one processor; and at least one memory for storing instructions and operably electrically connectable with the at least one processor, wherein the operations performed based on the instructions being executed by the at least one processor include: a network name displaying, on a display of the wireless communication device, a setting screen in which language setting information related to the language setting information can be input; and displaying the name of the first network on the display based on the language setting information related to the network name input based on the setting screen and the network ID information of the first network.

In order to solve the above problems, one disclosure of the present specification provides an apparatus in mobile communication. The apparatus includes at least one processor; and at least one memory for storing instructions and operably electrically connectable with the at least one processor, wherein the operations performed based on the instructions being executed by the at least one processor include: 1 identifying network ID information of a network; and displaying the name of the first network on the display of the device based on the network ID information and the language setting information related to the network name.

In order to solve the above problems, one disclosure of the present specification provides a non-volatile computer-readable storage medium recording instructions. The instructions, when executed by one or more processors, cause the one or more processors to: identify network ID information of the first network; and displaying the name of the first network on the display of the device based on the network ID information and the language setting information related to the network name.

Accordingly, a disclosure of the present specification has been made in an effort to solve the aforementioned problem.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIG. 4 is another exemplary diagram showing a structure of a radio interface protocol between a UE and a gNB.

FIG. 5a is an exemplary diagram illustrating an architecture to which a local breakout (LBO) scheme is applied during roaming and FIG. 5b is an exemplary diagram illustrating an architecture to which a home routed (HR) scheme is applied during roaming.

DESCRIPTION OF EXEMPLARY EMBODIMENTS

Figure 1:
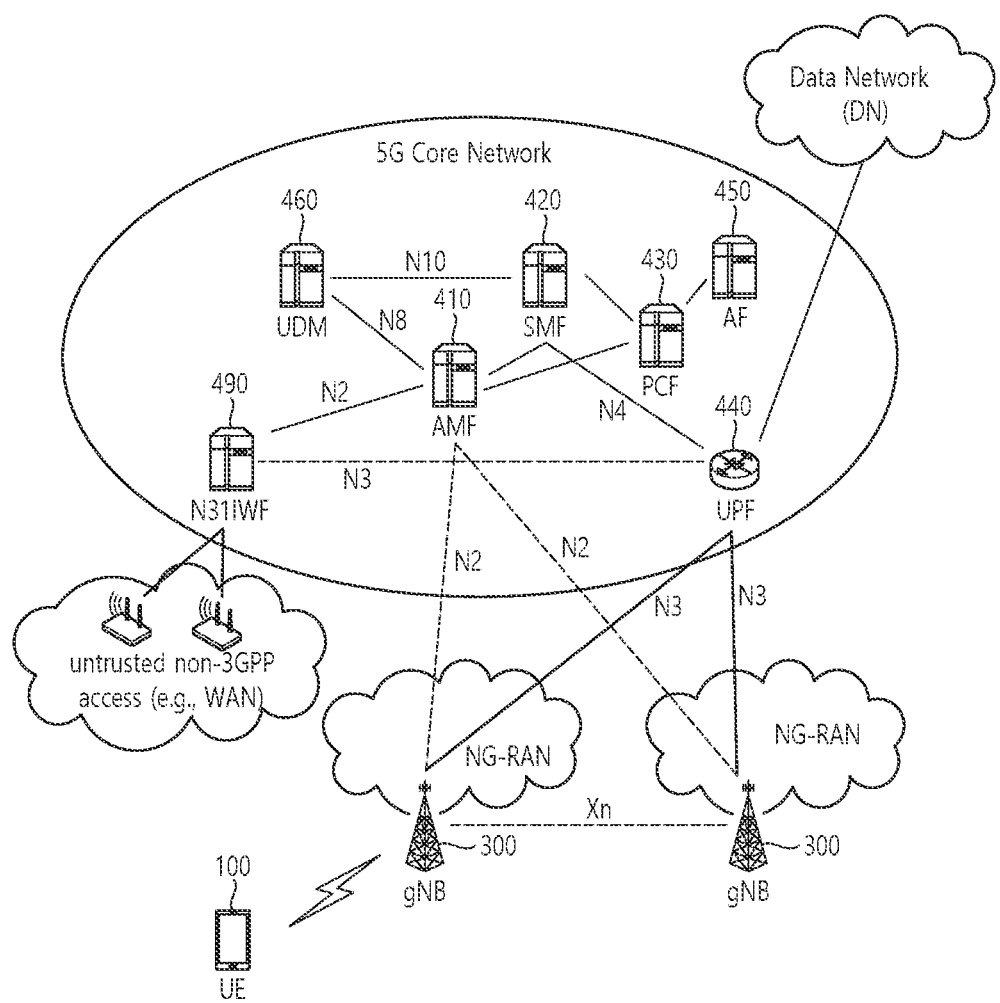
FIG. 1 is a structural diagram of a next-generation mobile communication network.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

As used herein, "A or B" may mean "only A", "only B", or "both A and B". In other words, "A or B" herein may be understood as "A and/or B". For example, "A, B or C" herein means "only A", "only B", "only C", or any combination of A, B and C (any combination of A, B and C)".

As used herein, a slash (/) or a comma may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, the expression "at least one of A or B" or "at least one of A and/or B" may be understood as "At least one of A and B".

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C".

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDDCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

I. Techniques and Procedures Applicable to the Disclosure of the Present Specification In the accompanying drawings, a user equipment (UE) is illustrated by way of example, but the illustrated UE may also be referred to in terms of UE 100 (terminal), mobile equipment (ME), and the like. In addition, the UE may be a portable device such as a notebook computer, a mobile phone, a PDA, a smartphone, or a multimedia device or may be a non-portable device such as a PC or vehicle-mounted device.

Hereinafter, the UE is used as an example of a wireless communication device (or a wireless device, or a wireless device) capable of wireless communication. An operation performed by the UE may be performed by a wireless communication device. A wireless communication device may also be referred to as a wireless device, a wireless device, or the like. Hereinafter, AMF may mean an AMF node, SMF may mean an SMF node, and UPF may mean a UPF node.

A base station, a term used below, generally refers to a fixed station that communicates with a wireless device, and may be called other terms such as an evolved-NodeB (eNodeB), an evolved-NodeB (eNB), a BTS (Base Transceiver System), an access point (Access Point) and gNB (Next generation NodeB).

FIG. 1 is a structural diagram of a next-generation mobile communication network.

5GC (5G Core) may include various components, part of which are shown in FIG. 1, including an access and mobility management function (AMF) 41, a session management function (SMF) 42, a policy control function (PCF) 43, a User Plane Function (UPF) 44, an application function (AF) 45, a unified data management (UDM) data network 46, and a non-3GPP interworking function (N3IWF) 49.

A UE 10 is connected to a data network via the UPF 44 through a Next Generation Radio Access Network (NG-RAN) including the gNB 20.

The UE 10 may be provided with a data service even through untrusted non-3GPP access, e.g., a wireless local area network (WLAN). In order to connect the non-3GPP access to a core network, the N3IWF 49 may be deployed.

The illustrated N3IWF 49 performs a function of managing interworking between the non-3GPP access and the 5G system. When the UE 10 is connected to non-3GPP access (e.g., WiFi referred to as IEEE 801.11), the UE 10 may be connected to the 5G system through the N3IWF 49. The N3IWF 49 performs control signaling with the AMF 41 and is connected to the UPF 44 through an N3 interface for data transmission.

The illustrated AMF 41 may manage access and mobility in the 5G system. The AMF 41 may perform a function of managing NAS security. The AMF 41 may perform a function of handling mobility in an idle state.

The illustrated UPF 44 is a type of gateway through which user data is transmitted/received. The UPF 44 may perform the entirety or a portion of a user plane function of a serving gateway (S-GW) and a packet data network gateway (P-GW) of 4G mobile communication.

The UPF 44 operates as a boundary point between a next generation radio access network (NG-RAN) and the core network and maintains a data path between the gNB 20 and the SMF 42. In addition, when the UE 10 moves over an area served by the gNB 20, the UPF 44 serves as a mobility anchor point. The UPF 44 may perform a function of handling a PDU. For mobility within the NG-RAN (which is defined after 3GPP Release-15), the UPF 44 may route packets. In addition, the UPF 54 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 44 may correspond to a termination point of a data interface toward the data network.

The illustrated PCF 43 is a node that controls an operator's policy.

The illustrated AF 45 is a server for providing various services to the UE 10.

The illustrated UDM 46 is a kind of server that manages subscriber information, such as home subscriber server (HSS) of 4G mobile communication. The UDM 46 stores and manages the subscriber information in a unified data repository (UDR).

The illustrated SMF 42 may perform a function of allocating an Internet protocol (IP) address of the UE. In addition, the SMF may control a protocol data unit (PDU) session.

For reference, hereinafter, reference numerals for AMF (41), SMF (42), PCF (43), UPF (44), AF (45), UDM (46), N3IWF (49), gNB (20), or UE (10) may be omitted.

The 5th generation mobile communication supports a plurality of numerologies (e.g. a plurality of values of subcarrier spacing (SCS)) in order to support various services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

The NR frequency band is defined as two types of frequency ranges (FR1, FR2). FR1 is 410 MHz-7125 MHz, and FR2 is 24250 MHz-52600 MHz, which may mean millimeter wave (mmW). For convenience of explanation, among the frequency ranges used in the NR system, FR1 may mean "sub 6 GHz range" and FR2 may mean "above 6 GHz range" and may be called millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or higher included in FR1 may include an unlicensed band. The unlicensed band may be used for various purposes, for example, for communication for a vehicle (eg, autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
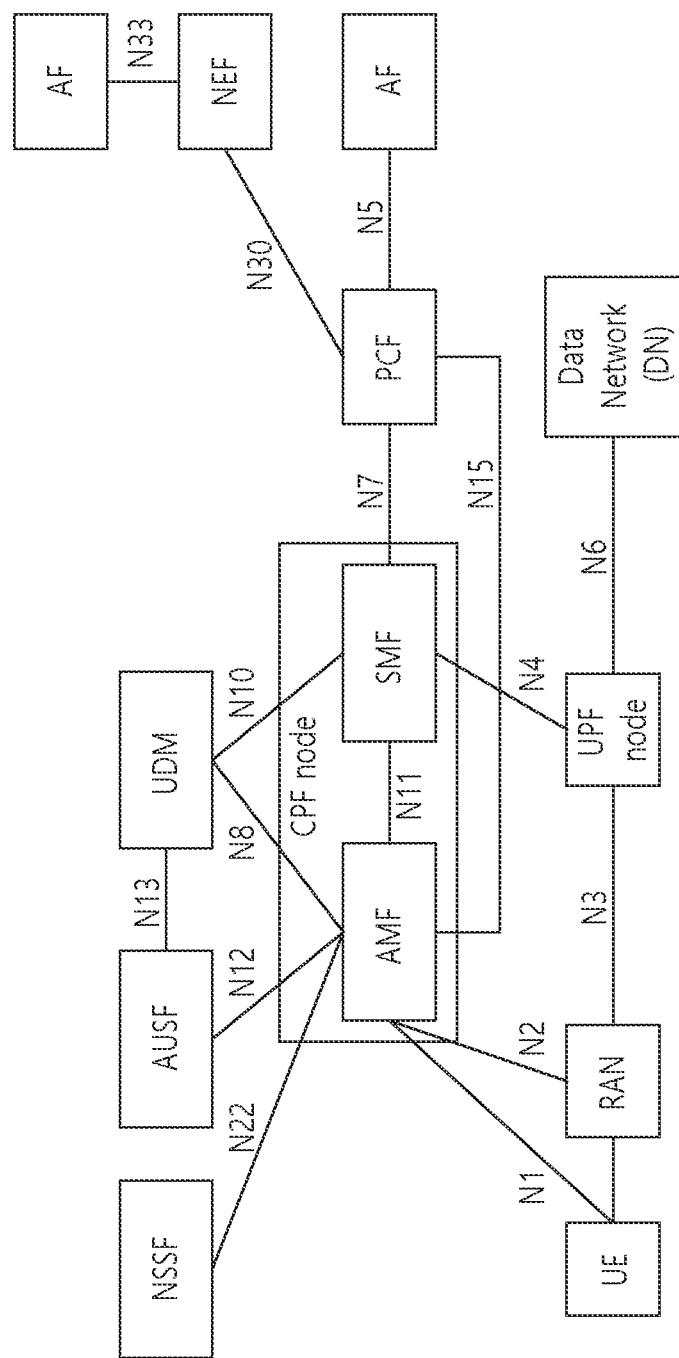
FIG. 2 is an exemplary diagram illustrating a predicted structure of a next generation mobile communication in terms of a node.

FIG. 2 is an exemplary diagram illustrating a predicted structure of a next generation mobile communication in terms of a node. Referring to FIG. 2, the UE is connected to a data network (DN) through a next generation RAN (Radio Access Network).

The Control Plane Function (CPF) node shown in FIG. 2 may perform all or part of the Mobility Management Entity (MME) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the drawing is a type of a gateway over which user data is transmitted and received. The UPF node may perform all or part of the user plane functions of the S-GW and the P-GW of the fourth generation mobile communication.

The Policy Control Function (PCF) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

The illustrated Network Exposure Function (NEF) is a node for providing a mechanism to securely expose services and functions of the 5G core. For example, NEF exposes functions and events, securely provides information from external applications to the 3GPP network, translates internal/external information, provides control plane parameters, and manages packet flow description (PFD).

Figure 3:
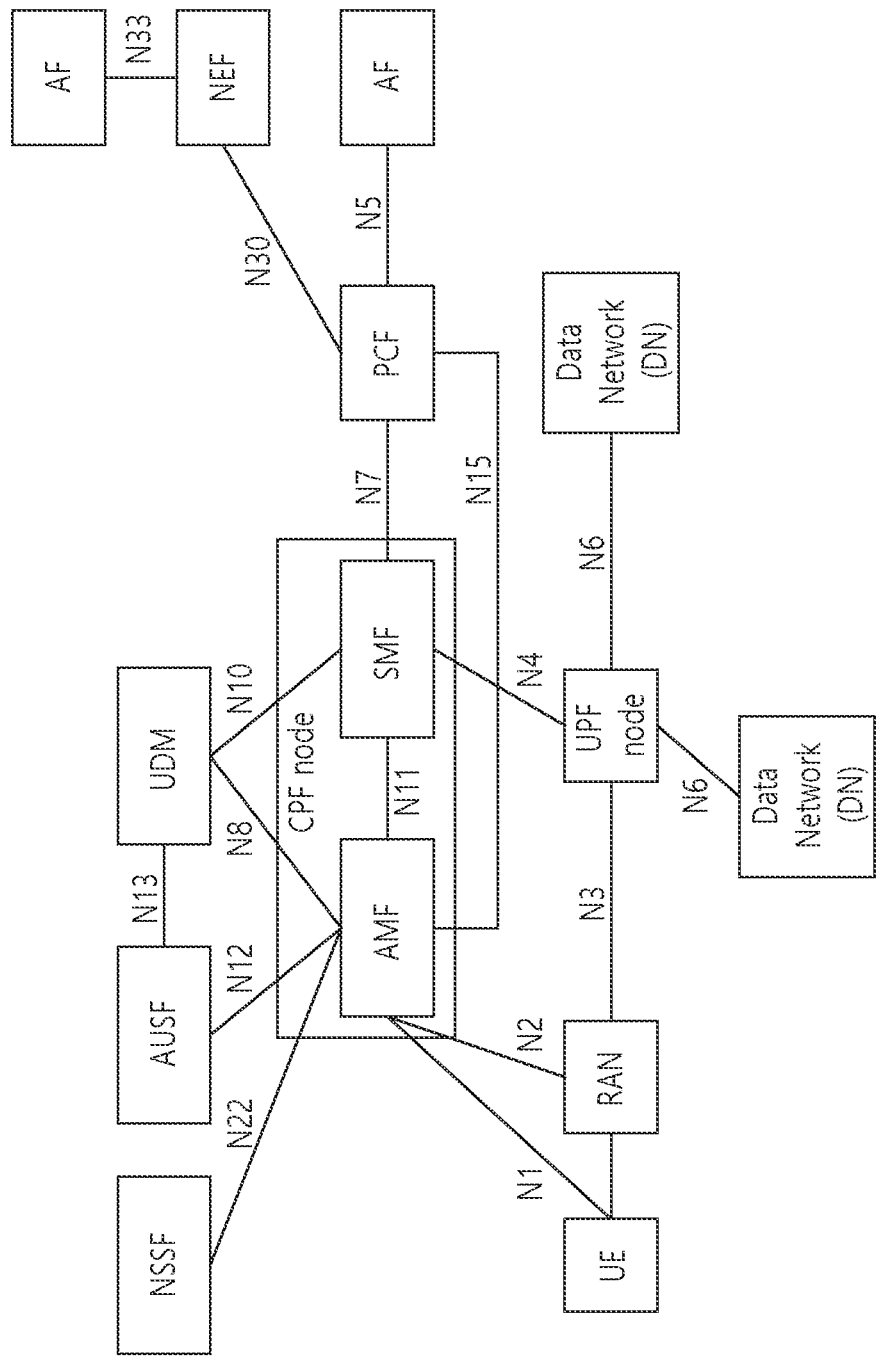
FIG. 3 illustrates an architecture that allows the UE to simultaneously access two data networks using one PDU session.

In FIG. 3, the UE may simultaneously access two data networks using multiple PDU sessions.

FIG. 3 illustrates an architecture that allows the UE to simultaneously access two data networks using one PDU session.

FIG. 3 illustrates an architecture that allows the UE to simultaneously access two data networks using one PDU session.

For reference, descriptions of the reference points shown in FIGS. 2 and 3 are as follows.

N1 represents Reference point between UE and AMF.
N2 represents Reference point between NG-RAN and AMF.
N3 represents Reference point between NG-RAN and UPF.
N4 represents Reference point between SMF and UPF.
N5 represents Reference point between PCF and AF.
N6 represents Reference point between UPF and DN.
N7 represents Reference point between SMF and PCF.
N8 represents Reference point between UDM and AMF.
N9 represents Reference point between UPFs.
N10 represents Reference point between UDM and SMF.
N11 represents Reference point between AMF and SMF.
N12 represents Reference point between AMF and AUSF.
N13 represents Reference point between UDM and AUSF.
N14 represents Reference point between AMFs.
N15 represents Reference point between PCF and AMF in a non-roaming scenario and reference point between AMF and PCF of visited network in roaming scenario.
N16 represents Reference point between SMFs.
N22 represents Reference point between AMF and NSSF.
N30 represents Reference point between PCF and NEF.
N33 represents Reference point between AF and NEF.

In FIGS. 2 and 3, AF by a third party other than an operator may be connected to 5GC through a network exposure function (NEF).

FIG. 4 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS entity for MM provides the following functions in general.
  NAS procedures related to AMF include the following.
  Registration management and access management procedures. AMF supports the following functions.
  Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,
  The NAS entity for the MM creates a NAS-MM message that derives how and where to deliver an SM signaling message through a security header representing the NAS transmission of SM signaling and additional information on a received NAS-MM.
  Upon receiving SM signaling, the NAS entity for the SM performs an integrity check of the NAS-MM message, analyzes additional information, and derives a method and place to derive the SM signaling message.

Meanwhile, in FIG. 4, the RRC layer, the RLC layer, the MAC layer, and the PHY layer located below the NAS layer are collectively referred to as an access stratum (AS).

A network system (ie, 5GC) for next-generation mobile communication (ie, 5G) also supports non-3GPP access. An example of the non-3GPP access is typically a WLAN access. The WLAN access may include both a trusted WLAN and an untrusted WLAN.

In the system for 5G, AMF performs registration management (RM: Registration Management) and connection management (CM: Connection Management) for 3GPP access as well as non-3GPP access.

A Multi-Access (MA) PDU session using both 3GPP access and non-3GPP access may be used.

The MA PDU session is a PDU session that can be serviced simultaneously with 3GPP access and non-3GPP access using one PDU session.

<Roaming in Next Generation Mobile Communication Network>

Meanwhile, there are two methods for managing a PDU session serviced to the UE in a situation in which the UE roams in a visited network, for example, a Visited Public Land Mobile Network (VPLMN). According to the local break out (LBO) method, which is the first method, the PDU session anchor is located in the visited network, and the session control is also handled in the visited network. According to HR (Home Routing) method, which is the second method, the PDU session anchor is located in the home network, and the SMF of the home network may control the session.

Figure 5B:
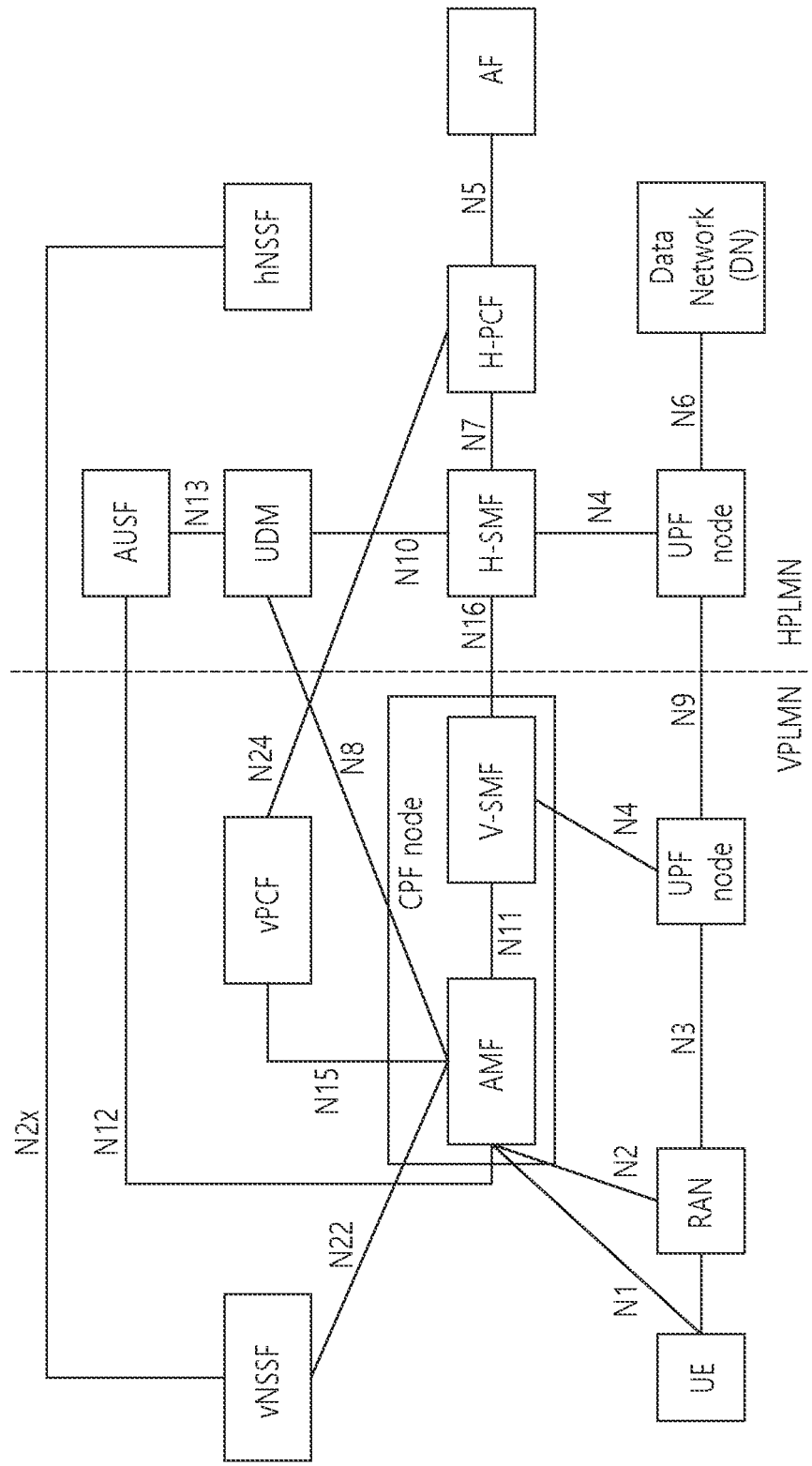

FIG. 5a is an exemplary diagram illustrating an architecture to which a local breakout (LBO) scheme is applied during roaming, and FIG. 5b is an exemplary diagram illustrating an architecture to which a home routed (HR) scheme is applied during roaming.

As illustrated in FIG. 5a, in an architecture to which the LBO scheme is applied, data of a user is delivered to a data network in the VPLMN. To this end, the PCF in the VPLMN performs an interaction with the AF in order to generate a PCC rule for a service in the VPLMN. A CPF node in the VPLMN generates the PCC rule based on a policy set internally according to a roaming agreement with a Home Public Land Mobile Network (HPLMN) operator.

As illustrated in FIG. 5b, in an architecture to which the HR scheme is applied, data of the UE is delivered to the data network in the HPLMN.

<Registration Procedure>

In order to allow mobility tracking and data reception to be performed, and in order to receive a service, the UE needs to gain authorization. For this, the UE shall register to a network. The registration procedure is performed when the UE needs to perform initial registration to a 5G system. Additionally, the Registration Procedure is performed when the UE performs periodic registration update, when the UE relocates to a new tracking area (TA) in an Idle state, and when the UE needs to perform periodic registration renewal.

During the initial registration procedure, an ID of the UE may be obtained from the UE. The AMF may forward (or transfer) a PEI (IMEISV) to a UDM, SMF, and PCF.

Figure 6A:
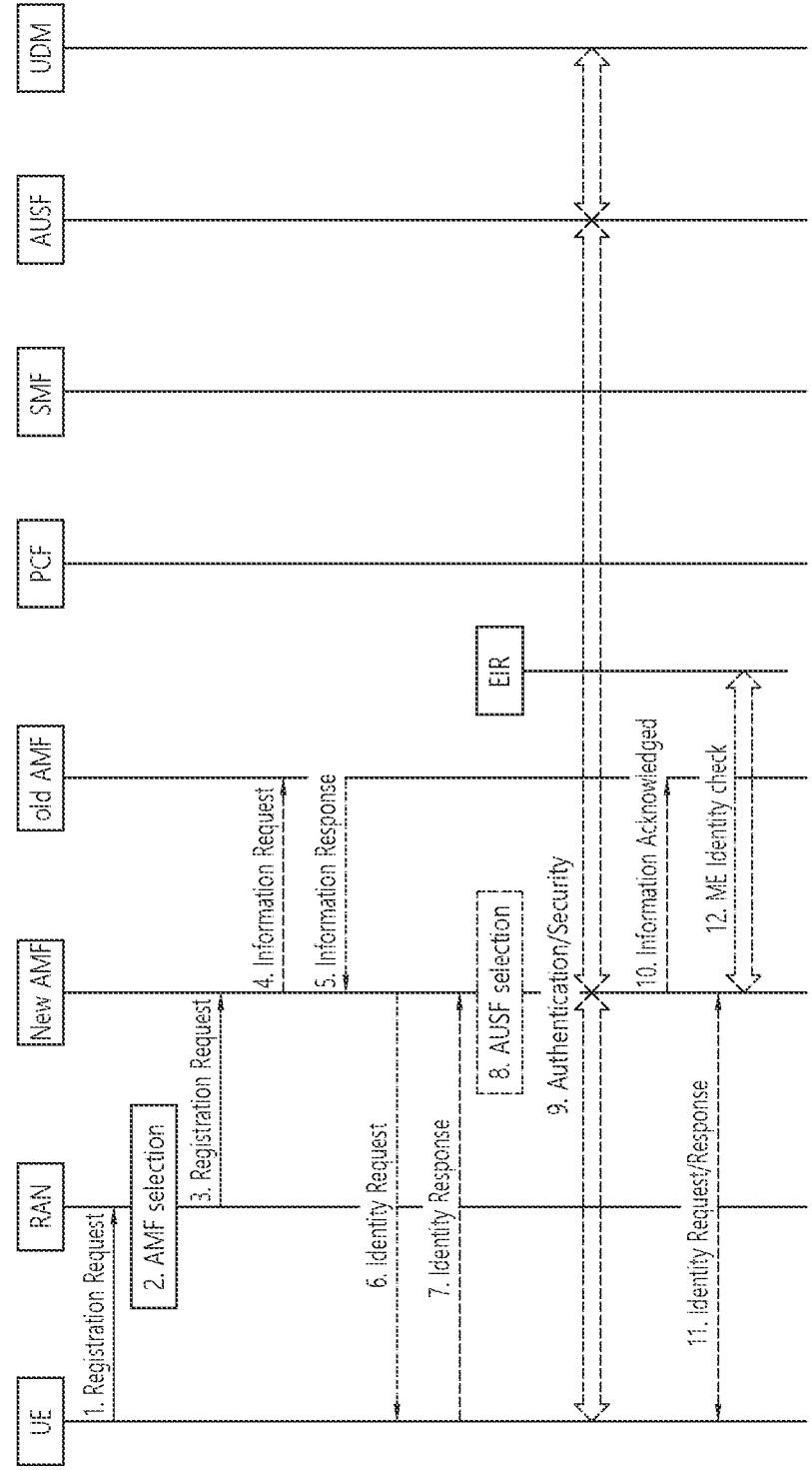
FIGS. 6a and 6b is a signal flow chart showing an exemplary registration procedure.
Figure 6B:
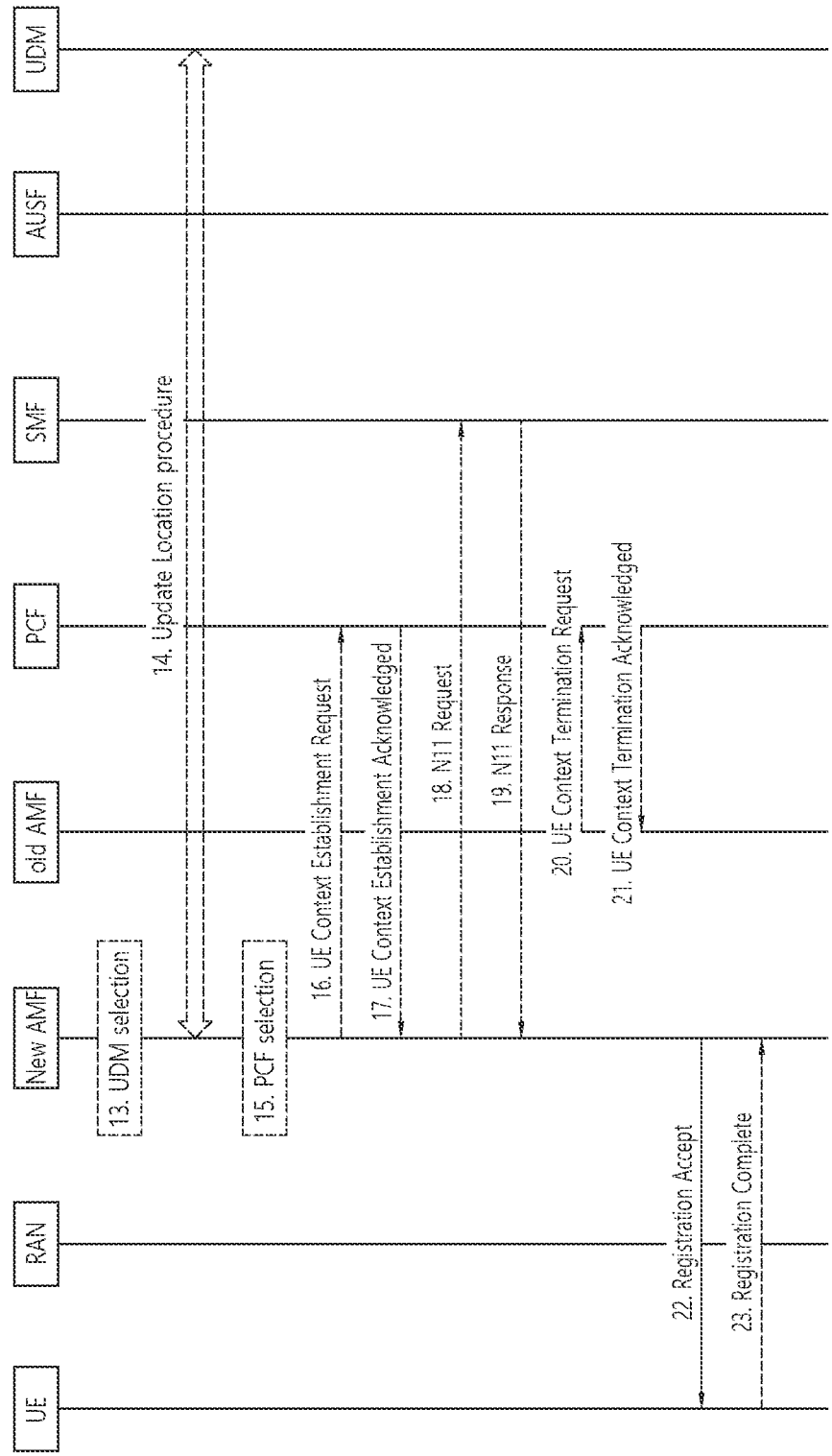

FIGS. 6a and 6b are signal flow charts showing an exemplary registration procedure.

1) The UE may transmit an AN message to the RAN. The AN message may include an AN parameter and a registration request message. The registration request message may include information, such as a register type, a subscriber permanent ID or temporary user ID, a security parameter, NASSAI, 5G capability of the UE, a PDU session status, and so on.

In case of a 5G RAN, the AN parameter may include a SUPI or a temporary user ID, a selected network, and NASSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a PLMN other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information of the allowed NSSAI and the mapped NSSAI. The allowed NSSAI information for the access type of the UE may be included in the N2 message including the registration accept message. The information of the mapped NSSAI is information that maps each S-NSSAI of the allowed NSSAI to the S-NASSI of the NSSAI configured for HPLMN.

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<Information Related to Network Name>

Information related to the network name is described. Information related to the network name includes, for example, country/PLMN information (or indication; information such as Mobile Country Code (MCC), PLMN ID, etc.), service provider name information (or indication; information such as Mobile Network Code (MNC)), and core network operator name information (or indication).

The country/PLMN information is information indicating the PLMN in which the UE is currently registered. Country/PLMN information may be necessary for the user to know when "roaming" occurs and to ensure that the PLMN selection is correct. The terminal may display both the name of the country (or an abbreviation code) and the name of the PLMN based on the country/PLMN information. When one or more visited PLMNs are available in a specific region, the country/PLMN information may include information that one or more visited PLMNs are available in a specific region.

The PLMN name may be one of the following:

A network name associated with a combination of Mobile Country Code (MCC) and Mobile Network Code (MNC) received on a broadcast channel among the network names stored in the ME;

It may be a Network Indicator Time Zone (NITZ). (if NITZ takes precedence over the name stored in the UE); or The network name associated with the combination of MCC and MNC among the network names stored in text and/or graphical format in the Universal Subscriber Identity Module (USIM). Optionally, a network name associated with a combination of MCC and MNC and Location Area Identification (LAI) from among the network names stored in the USIM in textual and/or graphical format. (If this network name takes precedence over the network name stored in the UE, and if this network name takes precedence over the NITz name when the NITZ name exists)

At least 10 PLMN IDs (Identifications) (a combination of MCC and MNC, optionally, Location Area identity (LAI)) for which the same PLMN name will be displayed may be stored in the USIM.

The PLMN name stored in the USIM may have the highest priority. Next, the PLMN name provided by NITZ may have a higher priority. The PLMN name stored in the ME may have the lowest priority.

If the PLMN stored in the USIM is not available in text form and the UE cannot display the graphic form, the PLMN name provided by NITZ may have the highest priority, and the PLMN name stored in the ME may have the second highest priority.

The display of service provider name information will be described.

The service provider name may be stored in the USIM in text form and/or optionally in graphic form. At least 10 PLMN IDs (a combination of MCC and MNC) may be associated with the same SP (Service Provider) name.

When the UE is registered with the HPLMN or registered with the PLMN associated with one PLMN ID used for the service provider name, the following actions may be performed:

(i) The SP name shall be indicated. For example, the UE must indicate the SP name;

(ii) Display of PLMN name is an option that operators can select by setting appropriate fields in USIM. (That is, the service provider name may appear in parallel with the PLMN name, or may appear instead of the PLMN name.)

If the UE is neither registered in HPLMN nor registered in PLMN corresponding to one of the PLMN IDs used in the service provider name, the following operations may be performed:

(i) the UE shall display the PLMN name;

(ii) The display of the SP name is an option that the operator can select through the setting of an appropriate field in the USIM.

If the UE cannot display the full name of the service provider, the name of the service provider may be displayed by being truncated from the end. The network operator can manage the storage of service provider names and options and the selection of options.

The core network operator name information may be used by the UE to display the name of the core network operator selected by the user.

<Device to which the Disclosure of the Present Specification can be Applied>

Hereinafter, an apparatus to which the disclosure of the present specification can be applied will be described.

Figure 7:
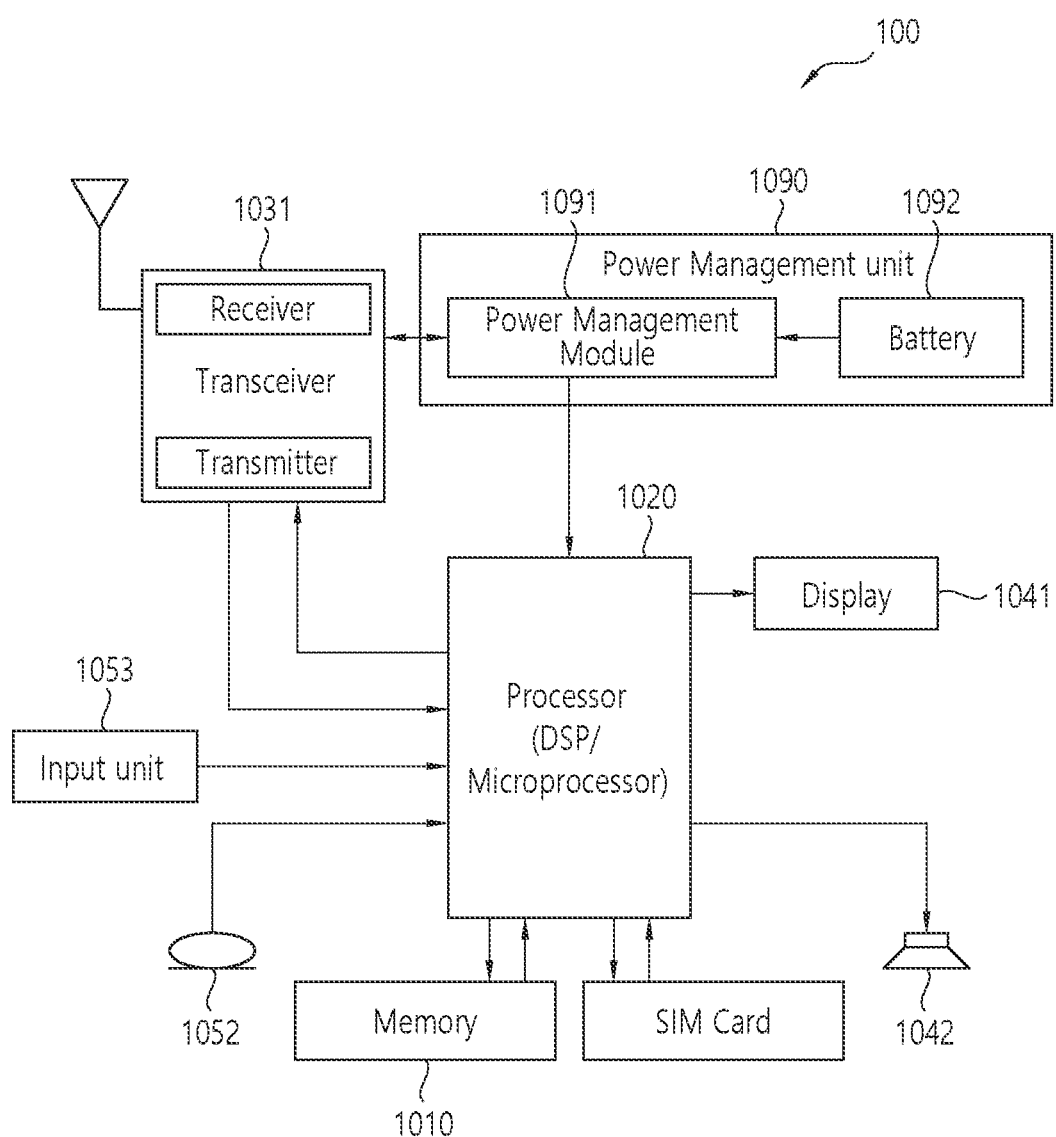
FIG. 7 is a block diagram of a UE according to an embodiment of the present disclosure.

FIG. 7 is a block diagram of a UE according to an embodiment of the present disclosure.

As can be seen with reference to FIG. 7, a UE includes a memory 1010, a processor 1020, a transceiver 1031, a power management module 1091, a battery 1092, a display 1041, an input unit 1053, a speaker 1042, a microphone 1052, a subscriber identification module (SIM) card, and one or more antennas.

The processor 1020 may be configured to implement the proposed function, process and/or method described in the present disclosure. Layers of a wireless interface protocol may be implemented in the processor 1020. The processor 1020 may include application-specific integrated circuit (ASIC), other chipset, logical circuit and/or data processing apparatus. The processor 1020 may be an application processor (AP). The processor 1020 may include at least one of a digital signal processor (DSP), a central processing unit (CPU), a graphics processing unit (GPU) and a modulator and demodulator (Modem). An example of the processor 1020 may be SNAPDRAGON™ series processor manufactured by Qualcomm®, EXYNOS'™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store international mobile subscriber identity (IMSI) used for identifying a subscriber in a mobile telephoning apparatus such as a mobile phone and a computer and the related key. Many types of contact address information may be stored in the SIM card.

The memory 1010 is coupled with the processor 1020 in a way to operate and stores various types of information to operate the processor 1020. The memory may include read-only memory (ROM), random access memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is connected to the processor 1020 in a way to operate and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

Figure 8:
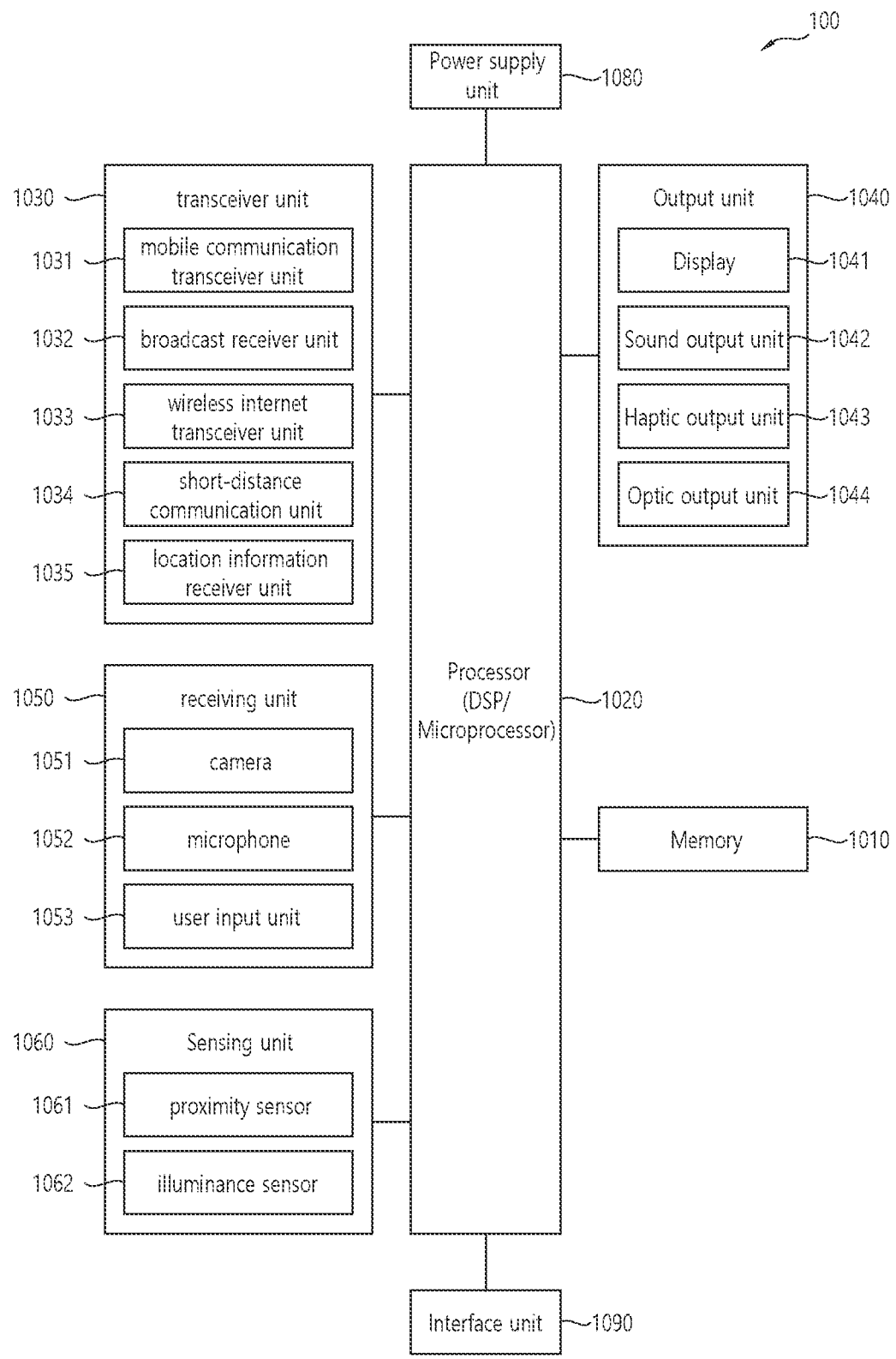
FIG. 8 is a block diagram showing the configuration of the terminal shown in FIG. 7 in more detail.

FIG. 8 is a block diagram showing the configuration of the terminal shown in FIG. 7 in more detail.

The terminal 100 may include a transceiver unit 1030, a processor 1020, a memory 1030, a sensing unit 1060, an output unit 1040, an interface unit 1090, an input unit 1050, and a power supply unit 1080, etc. Since the components shown in FIG. 8 are not essential for implementing the terminal, the terminal described in this specification may have more or fewer components than those listed above.

More specifically, among the components, the transceiver 1030 include one or more modules that enable wireless communication between the terminal 100 and the wireless communication system, between the terminal 100 and another terminal 100, or between the terminal 100 and an external server. In addition, the transceiver 1030 may include one or more modules for connecting the terminal 100 to one or more networks.

The transceiver 1030 may include at least one of a broadcast receiver 1032, a mobile communication transceiver 1031, a wireless Internet transceiver 1033, a short-range communication unit 1034, and a location information module 1150.

The input unit 1050 includes a camera 1051 or an image input unit for inputting an image signal, a microphone 1052 or an audio input unit for inputting an audio signal, and a user input unit 1053 for receiving information from a user, for example, a touch key, a push key (mechanical key), etc. The voice data or image data collected by the input unit 1050 may be analyzed and processed as a user's control command.

The sensing unit 1060 may include one or more sensors for sensing at least one of information in the mobile terminal, surrounding environment information surrounding the mobile terminal, and user information. For example, the sensing unit 1060 may include a proximity sensor 1061, an illumination sensor 1062, an illumination sensor, a touch sensor, an acceleration sensor, a magnetic sensor, gravity Sensor (G-sensor), gyroscope sensor, motion sensor, RGB sensor, infrared sensor (IR sensor: infrared sensor), fingerprint sensor (finger scan sensor), ultrasonic sensor, optical sensors (eg, cameras (see 1051)), microphones (see 1052), battery gauges, environmental sensors (eg, barometers, hygrometers, thermometers, radiation sensors, It may include at least one of a thermal sensor, a gas sensor, etc.) and a chemical sensor (eg, an electronic nose, a healthcare sensor, a biometric sensor, etc.). Meanwhile, the mobile terminal disclosed in the present specification may combine and utilize information sensed by at least two or more of these sensors.

The output unit 1040 is for generating an output related to visual, auditory or tactile sense, the output unit 1040 may include at least one of a display unit 1041, a sound output unit 1042, a haptip output unit 1043, and an optical output unit 1044. The display unit 1041 may implement a touch screen by forming a layer structure with the touch sensor each other or integrally formed with the touch sensor. Such a touch screen may function as a user input unit 1053 that provides an input interface between the terminal 100 and a user, and may provide an output interface between the terminal 100 and a user.

The interface unit 1090 serves as a passage with various types of external devices connected to the terminal 100. This interface unit 1090 may include at least one of a wired/wireless headset port (port), an external charger port (port), a wired/wireless data port (port), a memory card (memory card) port, a port connecting a device equipped with an identification module, an audio input/output (I/O) port, a video input/output (I/O) port, and an earphone port. Corresponding to the connection of the external device to the interface unit 1090, the terminal 100 may perform appropriate control related to the connected external device.

In addition, the memory 1030 stores data supporting various functions of the terminal 100. The memory 1030 may store a plurality of application programs (or applications) driven in the terminal 100, data for operation of the terminal 100, and commands. At least some of these application programs may be downloaded from an external server through wireless communication. Also, at least some of these application programs may exist on the terminal 100 from the time of shipment for basic functions (eg, functions for incoming calls, outgoing functions, message reception, and message outgoing functions) of the terminal 100. Meanwhile, the application program may be stored in the memory 1030, installed on the terminal 100, and driven by the processor 1020 to perform an operation (or function) of the mobile terminal.

The processor 1020 generally controls the overall operation of the terminal 100 in addition to the operation related to the application program. The processor 1020 may provide or process appropriate information or functions to a user by processing signals, data, information, etc. input or output through the above-described components or by driving an application program stored in the memory 1030.

In addition, the processor 1020 may control at least some of the aforementioned components in order to drive an application program stored in the memory 1030. Furthermore, the processor 1020 may operate by combining at least two or more of the components included in the terminal 100 to drive the application program.

The power supply unit 1080 receives external power and internal power under the control of the processor 1020 to supply power to each component included in the terminal 100. The power supply unit 1080 includes a battery, and the battery may be a built-in battery or a replaceable battery.

At least some of the respective components may operate in cooperation with each other to implement an operation, control, or control method of a mobile terminal according to various embodiments to be described below. In addition, the operation, control, or control method of the mobile terminal may be implemented on the mobile terminal by driving at least one application program stored in the memory 1030.

Hereinafter, before looking at various embodiments implemented through the terminal 100 as described above, the above-listed components will be described in more detail with reference to the drawings.

First, referring to the transceiver 1030, the broadcast receiver 1032 of the transceiver 1030 receives a broadcast signal and/or broadcast related information from an external broadcast management server through a broadcast channel. The broadcast channel may include a satellite channel and a terrestrial channel. Two or more of the broadcast reception modules may be provided to the mobile terminal 100 for simultaneous broadcast reception or broadcast channel switching for at least two broadcast channels.

The mobile communication transceiver 1031 transmit and receive wireless signal with at least one of a base station, an external terminal, and a server on a mobile communication network constructed according to the technical standards or communication methods for mobile communication (eg, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), LTE-A (Long Term Evolution-Advanced), 3GPP NR (New Radio access technology), etc.).

The wireless signal may include various types of data according to transmission and reception of a voice call signal, a video call signal, or a text/multimedia message.

The wireless Internet transceiver 1033 refers to a module for wireless Internet access, and may be built-in or external to the terminal 100. The wireless Internet transceiver 1033 is configured to transmit and receive wireless signals in a communication network according to wireless Internet technologies.

As wireless Internet technologies, for example, WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), High Speed Downlink Packet Access (HSDPA), High Speed Uplink Packet Access (HSUPA), Long Term Evolution (LTE), Long Term Evolution-Advanced (LTE-A), 3GPP NR, and the like, and The Internet transceiver 1033 transmits and receives data according to at least one wireless Internet technology within a range including Internet technologies not listed above.

From the point of view that wireless Internet access by WiBro, HSDPA, HSUPA, GSM, CDMA, WCDMA, LTE, LTE-A, 3GPP NR, etc, is made through a mobile communication network, the wireless Internet transceiver 1033 performing wireless Internet access through the mobile communication network may be understood as a type of the mobile communication transceiver 1031.

The short-range communication unit 1034 is for short-range communication, and may support short-distance communication by using at least one of Bluetooth™, Radio Frequency Identification (RFID), Infrared Data Association (IrDA), Ultra Wideband (UWB), ZigBee, NFC (Near Field Communication), Wi-Fi (Wireless-Fidelity), Wi-Fi Direct, and Wireless USB (Wireless Universal Serial Bus) technologies. The short-distance communication unit 1034 may support wireless communication between the terminal 100 and the wireless communication system, between the terminal 100 and the other terminal 100, or between the terminal 100 and another network in which the other terminal (1000, or external server) is located. The local area network may be wireless personal area networks.

Here, the other terminal 100 is a wearable device capable of exchanging (or interworking) data with the terminal 100 according to the present specification, for example, a smart watch, a smart glass, neckband, HMD (head mounted display). The short-range communication unit 1034 may detect (or recognize) a wearable device capable of communicating with the terminal 100 in the vicinity of the terminal 100. Furthermore, when the detected wearable device is a device authenticated to communicate with the terminal 100 according to the present specification, the processor 1020 transmits at least a portion of data processed by the terminal 100 to a wearable device through the short-range communication unit 1034. It can be transmitted. Accordingly, the user of the wearable device may use data processed by the terminal 100 through the wearable device. For example, according to this, when a call is received in the terminal 100, it is possible for the user to perform a phone call through the wearable device, or when a message is received in the terminal 100, it is possible for the user to receive the received message through the wearable device.

Furthermore, screen mirroring with a TV located in the house or a display inside a car is performed through the short-distance communication unit 1034, and a corresponding function is performed based on, for example, the MirrorLink or Miracast standard. In addition, it is also possible to directly control a TV or a display inside a vehicle by using the terminal 100.

The location information module 1150 is a module for acquiring a location (or current location) of a mobile terminal, and a representative example thereof includes a Global Positioning System (GPS) module or a Wireless Fidelity (WiFi) module. For example, if the mobile terminal utilizes a GPS module, it can acquire the location of the mobile terminal by using a signal transmitted from a GPS satellite. As another example, if the mobile terminal utilizes the Wi-Fi module, the location of the mobile terminal may be obtained based on information of the Wi-Fi module and a wireless access point (AP) that transmits or receives a wireless signal. If necessary, the location information module 1150 may perform any function of the other modules of the transceiver 1030 to obtain data on the location of the mobile terminal as a substitute or additionally. The location information module 1150 is a module used to obtain the location (or current location) of the mobile terminal, and is not limited to a module that directly calculates or obtains the location of the mobile terminal.

Each of the broadcast receiver 1032, the mobile communication transceiver 1031, the short-range communication unit 1034, and the location information module 1150 may be implemented as a separate module performing a corresponding function, and functions corresponding to two or more of the transceiver 1031, the short-range communication unit 1034, and the location information module 1150 may be implemented by one module.

Next, the input unit 1050 is for inputting image information (or signal), audio information (or signal), data, or information input from a user, for input of image information, the terminal 100 may be provided with one or a plurality of cameras 1051. The camera 1051 processes an image frame such as a still image or a moving image obtained by an image sensor in a video call mode or a photographing mode. The processed image frame may be displayed on the display unit 1041 or stored in the memory 1030. On the other hand, the plurality of cameras 1051 provided in the terminal 100 may be arranged to form a matrix structure, and through the cameras 1051 forming the matrix structure as described above, image information may be input to the terminal 100 has a plurality of cameras having various angles or focal points. In addition, the plurality of cameras 1051 may be arranged in a stereo structure to acquire a left image and a right image for realizing a stereoscopic image.

The microphone 1052 processes an external sound signal as electrical voice data. The processed voice data may be utilized in various ways according to a function (or a running application program) being performed by the terminal 100. Meanwhile, various noise removal algorithms for removing noise generated in the process of receiving an external sound signal may be implemented in the microphone 1052.

The user input unit 1053 is for receiving information from a user, and when information is input through the user input unit 1053, the processor 1020 may control the operation of the terminal 100 to correspond to the input information. The user input unit 1053 is a mechanical input means (or a mechanical key, for example, a button located on the front, rear or side of the terminal 100, a dome switch, a jog wheel, a jog switch, etc.) and a touch input means. As an example, the touch input means consists of a virtual key, a soft key, or a visual key displayed on the touch screen through software processing, or consists of a touch key (touch key) disposed on a part other than the touch screen. On the other hand, the virtual key or the visual key, is possible to be displayed on the touch screen while having various forms, for example, graphic, text, icon, video or a combination of these forms.

Meanwhile, the sensing unit 1060 senses at least one of information in the mobile terminal, surrounding environment information surrounding the mobile terminal, and user information, and generates a sensing signal corresponding thereto. The processor 1020 may control the driving or operation of the terminal 100 or perform data processing, functions, or operations related to an application program installed in the terminal 100 based on the sensing signal. Representative sensors among various sensors that may be included in the sensing unit 1060 will be described in more detail.

First, the proximity sensor 1061 refers to a sensor that detects the presence or absence of an object approaching a predetermined detection surface or an object existing in the vicinity without mechanical contact using the force of an electromagnetic field or infrared rays. The proximity sensor 1061 may be disposed in an inner region of the mobile terminal covered by the touch screen described above or in the vicinity of the touch screen.

Examples of the proximity sensor 1061 include a transmission type photoelectric sensor, a direct reflection type photoelectric sensor, a mirror reflection type photoelectric sensor, a high frequency oscillation type proximity sensor, a capacitive type proximity sensor, a magnetic type proximity sensor, an infrared proximity sensor, and the like. In the case where the touch screen is capacitive, the proximity sensor 1061 may be configured to detect the proximity of an object having conductivity as a change in an electric field according to the proximity of the object. In this case, the touch screen (or touch sensor) itself may be classified as a proximity sensor.

On the other hand, for convenience of description, the act of approaching an object on the touch screen without being in contact so that the object is recognized that it is located on the touch screen is called "proximity touch", and the act of actually touching an object on the screen is called "contact touch". The position where the object is touched in proximity on the touch screen means a position where the object is perpendicular to the touch screen when the object is touched in proximity. The proximity sensor 1061 may detect a proximity touch and a proximity touch pattern (eg, proximity touch distance, proximity touch direction, proximity touch speed, proximity touch time, proximity touch position, proximity touch movement state, etc.). On the other hand, the processor 1020 processes data (or information) corresponding to the proximity touch operation and the proximity touch pattern detected through the proximity sensor 1061 as above, and further, print visual information corresponding to the processed data on the touch screen. Furthermore, the processor 1020 may control the terminal 100 to process different operations or data (or information) according to whether a touch to the same point on the touch screen is a proximity touch or a contact touch.

The touch sensor detects a touch (or touch input) applied to the touch screen (or the display unit 1041) using at least one of various touch methods such as a resistive film method, a capacitive method, an infrared method, an ultrasonic method, and a magnetic field method, etc.

As an example, the touch sensor may be configured to convert a change in pressure applied to a specific part of the touch screen or a change in capacitance occurring in a specific part of the touch screen into an electrical input signal. The touch sensor may be configured to detect a position in which a touch object applying a touch on the touch screen, an area, a pressure at the time of touch, an electrostatic capacitance at the time of touch, etc. Here, the touch object is an object that applies a touch to the touch sensor, and may be, for example, a finger, a touch pen or a stylus pen, a pointer, or the like.

As such, when there is a touch input to the touch sensor, a signal(s) corresponding thereto is sent to the touch controller. The touch controller processes the signal(s) and then sends the corresponding data to the processor 1020. Accordingly, the processor 1020 may know which area of the display unit 1041 has been touched, and the like. Here, the touch controller may be a component separate from the processor 1020, or may be the processor 1020 itself.

Meanwhile, the processor 1020 may perform different controls or may perform the same control according to the type of the touch object that touches the touch screen (or a touch key provided other than the touch screen). Whether to perform different control or the same control according to the type of the touch object may be determined according to the current operating state of the terminal 100 or a running application program.

On the other hand, the touch sensor and the proximity sensor described above are independently or in combination, may sense various types of touch such as, a short (or tap) touch, a long touch, a multi touch, and a drag touch, flick touch, pinch-in touch, pinch-out touch, swype touch, hovering touch, etc.

The ultrasonic sensor may recognize location information of a sensing target by using ultrasonic waves. Meanwhile, the processor 1020 may calculate the position of the wave source based on information sensed by the optical sensor and the plurality of ultrasonic sensors. The position of the wave source may be calculated using the property that light is much faster than ultrasonic waves, that is, the time at which light reaches the optical sensor is much faster than the time at which ultrasonic waves reach the ultrasonic sensor. More specifically, the position of the wave source may be calculated by using a time difference from the time that the ultrasonic wave arrives using light as a reference signal.

On the other hand, the camera 1051 as described in terms of the components of the input unit 1050 includes at least one of a camera sensor (eg, CCD, CMOS, etc.), a photo sensor (or an image sensor), and a laser sensor.

The camera 1051 and the laser sensor may be combined with each other to detect a touch of a sensing target for a 3D stereoscopic image. The photo sensor may be stacked on the display device, and the photo sensor is configured to scan the motion of the sensing target close to the touch screen. More specifically, the photo sensor mounts photo diodes and transistors (TRs) in rows/columns and scans the contents placed on the photo sensors using electrical signals that change according to the amount of light applied to the photo diodes. That is, the photo sensor calculates the coordinates of the sensing target according to the amount of change in light, and through this, location information of the sensing target can be obtained.

The display unit 1041 displays (outputs) information processed by the terminal 100. For example, the display unit 1041 may display execution screen information of an application program driven in the terminal 100 or UI (User Interface) and GUI (Graphic User Interface) information according to the execution screen information.

Also, the display unit 1041 may be configured as a stereoscopic display unit for displaying a stereoscopic image.

A three-dimensional display method such as a stereoscopic method (glasses method), an auto stereoscopic method (glasses-free method), or a projection method (holographic method) may be applied to the stereoscopic display unit.

The sound output unit 1042 may output audio data received from the transceiver 1030 or stored in the memory 1030 in a call signal reception, a call mode or a recording mode, a voice recognition mode, a broadcast reception mode, and the like. The sound output unit 1042 also outputs a sound signal related to a function (eg, a call signal reception sound, a message reception sound, etc.) performed in the terminal 100. The sound output unit 1042 may include a receiver, a speaker, a buzzer, and the like.

The haptic module 1530 generates various tactile effects that the user can feel. A representative example of the tactile effect generated by the haptic output unit 1043 may be vibration. The intensity and pattern of vibration generated by the haptic output unit 1043 may be controlled by a user's selection or setting of a processor. For example, the haptic output unit 1043 may synthesize and output different vibrations or output them sequentially.

In addition to vibration, the haptic output unit 1043 may generate various tactile effects such as a pin arrangement that moves vertically with respect to the contact skin surface, a jet or suction force of air through a nozzle or an inlet, a touch on the skin surface, contact of an electrode, an electrostatic force, effect caused by heat absorption and the effect of reproducing a feeling of coolness and warmth using an element capable of absorbing heat or generating heat, etc.

The haptic output unit 1043 may not only deliver a tactile effect through direct contact, but may also be implemented so that the user can feel the tactile effect through a muscle sensation such as a finger or arm. Two or more haptic output units 1043 may be provided according to the configuration of the terminal 100.

The light output unit 1044 outputs a signal for notifying the occurrence of an event by using the light of the light source of the terminal 100. Examples of the event generated in the terminal 100 may be message reception, call signal reception, missed call, alarm, schedule notification, email reception, information reception through an application, and the like.

The signal output from the optical output unit 1044 is implemented as the mobile terminal emits light of a single color or a plurality of colors toward the front or rear side. The signal output may be terminated when the mobile terminal detects the user's event confirmation.

The interface unit 1090 serves as a passage with all external devices connected to the terminal 100. The interface unit 1090 receives data from an external device, receives power and transmits it to each component inside the terminal 100, or allows data inside the terminal 100 to be transmitted to an external device. For example, a wired/wireless headset port, an external charger port, a wired/wireless data port, a memory card port, a port for connecting a device equipped with an identification module (port), an audio I/O (Input/Output) port, a video I/O (Input/Output) port, an earphone port, etc. may be included in the interface unit 1090.

On the other hand, the identification module is a chip storing various information for authenticating the use authority of the terminal 100, the identification module may include a user identification module (UIM), a subscriber identity module (subscriber identity module; SIM), a universal user authentication module (universal subscriber identity module; USIM) and the like. A device equipped with an identification module (hereinafter, 'identification device') may be manufactured in the form of a smart card. Accordingly, the identification device may be connected to the terminal 100 through the interface unit 1090.

In addition, the interface unit 1090 may be a path through which power from the cradle is supplied to the terminal 100 when the terminal 100 is connected to an external cradle, or a path through which various commands signal input from the cradle by the user transmitted to the terminal 100. Various command signals or the power input from the cradle may be operated as signals for recognizing that the terminal 100 is correctly mounted on the cradle.

The memory 1030 may store a program for the operation of the processor 1020, and may temporarily store input/output data (eg, a phone book, a message, a still image, a moving image, etc.). The memory 1030 may store data related to vibrations and sounds of various patterns output when a touch input is performed on the touch screen.

The memory 1030 may include at least one type of storage medium such as a flash memory type, a hard disk type, a solid state disk type (SSD), a silicon disk drive type (SDD), and a multimedia card micro type.), card-type memory (such as SD or XD memory), random access memory (RAM), static random access memory (SRAM), read-only memory (ROM), electrically erasable programmable read-only memory (EEPROM), a programmable read-only memory (PROM), a magnetic memory, a magnetic disk, and an optical disk. The terminal 100 may be operated in relation to a web storage that performs a storage function of the memory 1030 on the Internet.

Meanwhile, as described above, the processor 1020 controls the operation related to the application program and the general operation of the terminal 100 in general. For example, if the state of the mobile terminal satisfies a set condition, the processor 1020 may execute or release a lock state that restricts input of a user's control command to applications.

In addition, the processor 1020 may perform control and processing related to voice calls, data communication, video calls, etc., or perform pattern recognition processing capable of recognizing handwriting input or drawing input performed on the touch screen as text and images, respectively. Furthermore, the processor 1020 may control any one or a plurality of the components described above in combination to implement various embodiments described below on the terminal 100 according to the present specification.

The power supply unit 1080 receives external power and internal power under the control of the processor 1020 to supply power necessary for operation of each component. The power supply unit 1080 includes a battery, and the battery may be a built-in battery configured to be rechargeable, and may be detachably coupled to the terminal body for charging or the like.

In addition, the power supply unit 1080 may include a connection port, and the connection port may be configured as an example of the interface 1090 to which an external charger that supplies power for charging the battery is electrically connected.

As another example, the power supply unit 1080 may be configured to charge the battery in a wireless manner without using the connection port. In this case, power can be transmitted to the power supply unit 1080 uses one or more of an inductive coupling method based on a magnetic induction phenomenon or a resonance coupling method based on an electromagnetic resonance phenomenon from an external wireless power transmitter.

Meanwhile, various embodiments below may be implemented in, for example, a computer-readable recording medium using software, hardware, or a combination thereof.

On the other hand, the mobile terminal can be extended to a wearable device that can be worn on the body beyond the dimension that the user mainly holds in the hand. Such wearable devices include a smart watch, smart glass, and head mounted display (HMD) and the like. Hereinafter, examples of mobile terminals extended to wearable devices will be described.

The wearable device may be configured to be able to exchange (or interwork) data with another terminal 100. The short-range communication unit 1034 may detect (or recognize) a wearable device capable of communicating around the terminal 100. Furthermore, when the detected wearable device is a device authenticated to communicate with the terminal 100, the processor 1020 may transmit at least a portion of data processed in the terminal 100 to the wearable device through the short-range communication unit 1034. Accordingly, the user may use data processed by the terminal 100 through the wearable device. For example, it is possible to perform a phone call through the wearable device when a call is received in the terminal 100, or to check the received message through the wearable device when a message is received to the terminal 100.

II. Disclosure of the Present Specification

The disclosures described below in this specification may be implemented in one or more combinations. Each of the drawings shows an embodiment of each disclosure, but the embodiments of the drawings may be implemented in combination with each other.

The terminal may receive network ID information from the serving network and display the network name of the serving network on the display. If the user uses characters from a language based on Latin characters, such as English, the user may not understand non-Latin characters (eg, Chinese, Korean, Japanese, Vietnamese) included in the displayed network name. In this case, unnecessary information that the user does not understand is displayed on the display, which may cause inconvenience to the user. When the network name includes non-Latin characters, a method of processing network ID information needs to be discussed.

For reference, the terminal may refer to a device capable of performing wireless communication, such as, for example, a UE. The terminal may include a USIM or a Universal Integrated Circuit Card (UICC). A portion of the terminal other than the USIM or UICC may be referred to as an ME.

In addition, the user may not prefer that non-Latin characters are displayed on the display or prefer that the network name is displayed on the display as it is, but the terminal could not reflect the user's preference. Therefore, it is also necessary to discuss a method that considers the user's preference related to the network name.

In the disclosure of this specification, a method for the terminal to process information on the ID of the network will be described.

For example the method of the terminal for processing information about the ID of the network will be described, when a terminal (eg, UE) roams to a network (PLMN) other than a network (eg, Public Land Mobile Network (PLMN)) that has previously served the terminal. As an example, when the terminal roams from the HPLMN to the VPLMN, a method of displaying the name of the VPLMN will be described.

As another example, a method of displaying, on the display of the terminal, a screen in which the terminal (eg, UE) can input language setting information related to a network name will be described. Also, a method of displaying a network name by the terminal based on language setting information related to the input network name will be described. Here, the language setting information related to the network name may be a setting reflecting the user's preferred language for displaying the network name (eg, displayed on the display of the terminal). For example, the language setting information related to the network name may also be referred to as user preferred language setting information for displaying the network name. For example, language setting information related to a network name may be briefly referred to as "user preference setting".

The terminal may receive information related to a network ID (or name). For example, the terminal may receive information related to a network ID (or name) from the network through an initial access procedure. For example, when the terminal is attached (or registered) to a new serving network, the terminal may receive information related to a network ID (or name). Here, the new serving network may mean a network other than the network that previously served the terminal.

As an example, if the UE is being served by the HPLMN, the new serving network may mean a network other than the HPLMN. For example, when a UE served by the HPLMN roams to another network (eg, VPLMN), the VPLMN is the new serving network.

As another example, if the UE is being served by a VPLMN, when the UE returns to the UE's HPLMN, the new serving network may be an HPLMN.

An example in which the terminal may receive network ID information is as follows.

(1) When the UE performs the interoperation procedure

For example, the terminal may receive network ID information when performing an interoperation procedure.

The following description is based on the procedure in the 3rd generation mobile communication UTRA. Functionally similar contents can be applied to 4th generation mobile communication LTE (E-UTRA) and 5th generation mobile communication NG-RA (however, in 4th generation, MME instead of SGSN, and in 5th generation, functional nodes exist as AMF and RNC does not exist in the 4th and 5th generations). When the Core Network (CN) receives a Relocation Complete message, the CN may switch the user plane from the Radio Network Controller (RNC) to the target serving RNC (SRNC). When Serving Radio Network Subsystem (SRNS) relocation is inter-SGSN (Serving General Packet Radio Service (GPRS) Support Node) SRNS relocation or Direct Tunnel is established in intra-SGSN SRNS relocation, new SGSN may transmit PDP context update Request messages (eg, Update PDP Context Request messages) to related Gateway GPRS Support Nodes (GGSNs). Here, the PDP context update request message may include network ID information of the serving network. The SGSN shall transmit the network ID information of the serving network to the GGSN.

For reference, the former Mobility Management Entity (MME) may operate like the former SGSN. The source eNB may operate with the source SRNC.

(2) When the terminal performs a routing area update procedure

For example, the terminal may receive network ID information when performing a Routing Area Update procedure.

The new SGSN may transmit PDP context update request messages (eg, Update PDP Context Request messages) to the related GGSN. Here, the Packet Data Protocol (PDP) context update request message may include network ID information of the serving network.

The SGSN shall transmit the network ID information of the serving network to the GGSN.

(3) When the UE performs the tracking area update procedure (for reference, this is the case that update procedure is performed from the 3rd generation network to the 4th generation network (ie, SGSN to MME)).

For example, when the terminal performs the Gn/Gp SGSN to MME tracking area update procedure (eg, when step 9 ("Create Session Request" related step) is performed), the terminal may receive the network ID information. For reference, the Gn interface may mean an interface between GSNs within the same PLMN. The Gp interface may mean an interface between GSNs in different PLMNs.

The new MME may adopt (adopt) the bearer contexts received from the SGSN as the Evolved Packet System (EPS) bearer context of the UE. The adopted bearer context may be maintained by the new MME. The new MME may map the PDP context to the EPS bearer one-to-one. The MME may verify the EPS bearer state received from the UE with the bearer context received from the old SGSN. And, the MME may release the network resource related to the EPS bearer that is not activated in the UE. If the UE does not have a PDP context, the MME may reject the TAU request.

The new MME may select a Serving Gateway (S-GW) and transmit a Create Session Request message to the S-GW. The session creation request message may include network ID information of the serving network. The MME shall transmit the network ID information of the serving network to the S-GW. The S-GW may transmit network ID information of the serving network to the UE.

The three cases described above are merely examples, and the terminal may receive network ID information from the serving network in various procedures such as an initial access procedure and a registration procedure, etc.

The network identity (ID) information received by the terminal may include PLMN ID information. The PLMN ID may mean a unique identification of the PLMN. PLMN ID information may consist of, for example, a maximum of 6 digits (eg, 6 digits). The PLMN ID information may include a Mobile Country Code (MCC) and a Mobile Network Code (MNC). The MCC may be a country code assigned by the International Telecommunication Union (ITU). The MNC may be a network code allocated by a National Authority. MCC may consist of 3 digits (eg, 3 digits). MNC may consist of 2 digits (eg 2 digits) or 3 digits (eg 3 digits). The network ID information may further include information on the name of the network. For example, the information on the network name may include information on languages and characters included in the network name.

The network ID information may include both PLMN ID information and information about a network name. Alternatively, the network ID information may include PLMN ID information, and the serving network may separately transmit information about the network name. That is, the terminal may receive network ID information including both PLMN ID information and information on the network name from the network. In addition, the terminal may receive network ID information including PLMN ID information from the network, and may receive information about a network name. The scope of the disclosure of the present specification includes both a case in which information on a network name is included in network ID information and a case in which information on a network name is transmitted separately from the network ID information.

The length of the network ID information may be variable to n bytes (where n is an arbitrary integer greater than or equal to 3), and the length of the network ID information may be at least 3 bytes. For reference, Table 3 below is an example of mapping MCC and non-Latin characters (eg, Chinese, Japanese, Korean, Vietnamese) characters and ideographs included in network ID information.

TABLE 3

| MCC(s) | Country/Region | Language (C, J, K, or V) |
| --- | --- | --- |
| 460, 461 | Mainland China | Chinese-G |
| 466 | Taiwan | Chinese-T |
| 454 | HongKong | Chinese-T |
| 455 | Macao | Chinese-T |
| 440, 441 | Japan | J (Kanji) |
| 450, 467 | Korea | K (Hanja) |
| 452 | Vietnam | V (Chunom) |

In Table 3, Mainland China may mean mainland China. Chinese-G can mean Simplified Chinese. Chinese-T (Traditional) may mean traditional Chinese. The information on the network name may be, for example, a type 4 information element having a minimum length of 3 octets. Except for the maximum number of octets given in the L3 message, the upper limit of the information about the network name may not be limited.

Here, the type 4 information element may be an information element based on the format of LV or TLV.

V is Value, and when the format of the IE includes V, it indicates that the IE includes Value information (eg, Value field). L is Length and means the length of the value field of IE. When the format of the IE includes L, information on the length of the value field of the IE may be included in the corresponding IE. T is a Type, and indicates that header information such as IEI of IE exists.

For example, the type 4 information element based on the LV format may include a length indicator (LI) and a value field (value part). LI may be located before the value field (value part). For example, LI may be located in octet n (n is an integer greater than or equal to 1), and a value field (value part) may be located in octet n+1 to octet n+k (where k is an integer greater than or equal to 1). For reference, the length of the value field (value part) may be 0 to k bytes (byte). The type 4 information element based on the TLV format may further include an IEI. The IEI may be placed before the LI.

For reference, in Table 5, UCS2 is a Universal Coded Character Set determined by the International Organization for Standardization (ISO). USC2 indicates a character encoding form that can display various types of characters, for example, letters, numbers, symbols, ideograms (ideograms), and abbreviations (logograms). In particular, UCS2 is an encoding form that allows one code value to be expressed in 2 bytes (16-bit word). For example, Hangul and Chinese characters may be expressed as 16-bit words based on USC2.

A terminal (eg, UE) may receive information (eg, an information element) about a network name (or network ID). The terminal may provide an indication or notification to a user based on the MCC of the serving network (eg, serving PLMN) (eg, sound, vibration, beeping and/or alarm, etc.). For example, the terminal may provide an indication or notification to the user using an audio and/or a visual

TABLE 4

| 8 | 7 | 6 | 5 | 4 | 3 | 2 | 1 | |
|---|---|---|---|---|---|---|---|---|
| | | | | Network Name IEI | | | | octet 1 |
| | | | Length of Network Name contents | | | | | octet 2 |
| ext 1 | | coding scheme | | Add CI | Number of spare bits in last octet | | | octet 3 |
| | | | | Text String | | | | octet 4 |
| | | | | | | | | ... |
| | | | | | | | | ... |
| | | | | | | | | octet n |

Referring to Table 4, an example of information about a network name is shown. IEI stands for Information-Element-Identifier. ext 1 means extension 1. Add CI is a 1-bit value that means Add Configuration Item (CI). If Add CI is 0, it means that the ME (or UE) cannot add characters to the Country initials text string. If Add CI is 1, it means that a separator, a space character, etc. can be added. Text String means a text string. Number of spare bits in last octet means the number of spare bits in the last octet. Hereinafter, in Table 5, a specific example of the Number of spare bits in last octet, Add CI, Coding Scheme, and Text String of Table 4 is provided.

display. The terminal may provide an indication (or notification) for the country of the serving network and/or an indication (or notification) for the name of the serving network (name of the PLMN) to the user.

For example, the terminal may provide an indication or notification to the user in the same manner as in the following examples 1-a to 1-c:

1-a: When the MCC is 440 (ie, the country of the serving network is Japan), the terminal may provide an indication or notification related to Japan to the user. For example, the terminal may display "roaming into Japan", a country name

| 2 | 1 | | |
|---|---|---|---|
| | | Number of spare bits in last octet (octet 3, bits 1 to 3 of Table 4) | |
| 0 | 0 | 1 | bit 8 is spare and set to "0" in octet n |
| 0 | 1 | 0 | bits 7 and 8 are spare and set to "0" in octet n |
| 0 | 1 | 1 | bits 6 to 8(inclusive) are spare and set to "0" in octet n |
| 1 | 0 | 0 | bits 5 to 8(inclusive) are spare and set to "0" in octet n |
| 1 | 0 | 1 | bits 4 to 8(inclusive) are spare and set to "0" in octet n |
| 1 | 1 | 0 | bits 3 to 8(inclusive) are spare and set to "0" in octet n |
| 1 | 1 | 1 | bits 2 to 8(inclusive) are spare and set to "0" in octet n |
| 0 | 0 | 0 | this field carries no information about the number of spare bits in octet n |
| | | | Add CI (octet 3, bit 4 of Table 4) |
| 0 | | | The MS should not add the letters for the Country's Initials to the text string |
| 1 | | | The MS should add the letters for the Country's Initials and a separator (e.g. a space) to the text string |
| | | | Coding Scheme (octet 3, bits 5-7 of Table 4) |
| 0 | 0 | 0 | Cell Broadcast data coding scheme, GSM default alphabet, language unspecified |
| 0 | 0 | 1 | UCS2 (16 bit) |
| 0 | 1 | 0 | |
| | to | | reserved |
| 1 | 1 | 1 | |
| | | | Text String (octet 4 to octet n, inclusive of Table 4) |
| | | | Encoded according to the Coding Scheme defined by octet 3, bits 5-7(octet 3, bits 5-7 of Table 4) |

("Japan"), or an initial ("JP") on the display of the terminal. The terminal may also provide voice notification and/or vibration.

1-b: When the MCC is 450 (ie, when the country of the serving network is Japan), the terminal may provide an indication or notification related to Japan to the user. For example, the terminal may display "roaming into Japan", a country name ("Japan"), or an initial ("JP") on the display of the terminal. The terminal may also provide voice notification and/or vibration.

1-c: The UE may display both "country (eg, country name of serving network)" and "PLMN (eg, name of serving network)". For example, the terminal may display "country (eg, country name of the serving network)" and "PLMN (eg, name of the serving network)" on the display in English text. And, if "country (eg, country name of serving network)" and "PLMN (eg, name of serving network)" include characters based on languages other than English, the terminal may translate them into English and display them on the display.

The terminal may display the name of the network (eg, the name of the PLMN) on the display based on the network ID information. The name of the network may contain non-Latin characters. For example, the non-Latin character may mean a character based on Chinese, Japanese, Korean, Vietnamese, Arabic, Hindi, or Turkish.

In this case, when the terminal displays the network name including non-Latin characters on the display of the terminal, users who use language characters based on Latin characters (eg, English, French characters, etc.) cannot understand the non-Latin characters. or may not prefer non-Latin letters being displayed. The terminal may or may not display non-Latin characters in the network name based on the user's language setting related to the network name. The language setting related to the network name may be a setting based on user preference.

In order for the user to set the language setting related to the network name, the terminal may provide the user with a means (eg, displaying a setting screen, receiving setting information through voice recognition, etc.). For example, the terminal may provide a setting screen to the user so that the user can set whether to display non-Latin characters (eg, Chinese, Japanese, Korean, Vietnamese (CJKV) characters).

When the terminal stores the language setting related to the network name, when the terminal displays the network name based on the network ID information, the language setting related to the network name may be considered as the highest priority. In addition, the network name stored in the terminal (eg, the network name stored in the terminal's USIM or Universal Integrated Circuit Card (UICC) or the network name stored in the terminal itself (UE, ME, etc.)) may be considered as the second highest priority.

For example, the terminal may display the name of the network based on language setting related to the network name and/or the network name stored in the terminal (eg, network name stored in USIM or UICC of the terminal) in the same manner as in the examples of 2-a to 2-c below. For reference, examples of 2-a to 2-c are examples when the network ID information received by the terminal is ID information of a network (eg, China Mobile in China) having a name including non-Latin characters. China Mobile may be 中国移动 in Chinese.

2-a: When the language setting related to the network name includes a setting not to display non-Latin characters (eg, when the user preference setting for non-Latin character display is "No, do not display"), the terminal may not display non-Latin characters in the network name, but only display Latin characters. For example, when the network ID information received by the terminal includes information that the network name is "China Mobile 中国移动", the terminal may display "China Mobile" on the display (refer to the example of FIG. 24).

2-b: If the language setting related to the network name includes a setting to display non-Latin characters (eg, when the user preference setting for non-Latin characters is "Yes, display"), the terminal nay display both Latin characters and non-Latin characters included in the network name. That is, the terminal may display the received information on the network name as is. For example, when the network ID information received by the terminal includes information that the network name is "China Mobile 中国移动", for example, the terminal may display "China Mobile 中国移动" on the display as it is. (see the example of FIG. 23).

2-c: In general, the UE may operate as in the examples of 2-c-i to 2-c-ii below.

2-ci: If the language setting related to the network name (eg, user preference setting/setting) is not stored in the terminal, the terminal may check whether the network name related to the network ID information is already stored in the USIM or UICC. When the network name related to the network ID information received by the terminal is stored in the USIM or UICC, the terminal may operate as in the example of 2-c-i-1. Otherwise, the terminal may operate as in the example of 2-c-i-2:

2-c-i-1: When the network name related to the network ID information received by the terminal is stored in the USIM or UICC, the terminal may display the stored name. For example, if the network name related to the network ID information received by the terminal (eg, network ID information of "China Mobile") is stored in USIM or UICC as "China Mobile" or "CM" (eg, an abbreviation of China Mobile), the terminal may display the stored "China Mobile" or "CM" (refer to the example of FIG. 24). For another example, when the network name related to the network ID information received by the terminal (eg, network ID information of "China Mobile") is stored in the USIM or UICC as "China Mobile 中国移动", the terminal may display the stored "China Mobile 中国移动" (see example in FIG. 23).

2-c-i-2: If the network name related to the network ID information received by the UE is not stored in the USIM or UICC, the UE may display the network name received from the serving network (eg, serving PLMN). For example, if the network ID information received by the terminal includes information that the network name is "China Mobile 中国移动", the terminal may display "China Mobile 中国移动" (see the example of FIG. 23).

2-c-ii: When the language setting (eg, user preference setting/setting) related to the network name is stored in the terminal, the terminal may operate as in the examples of 2-c-ii-1 and 2-c-ii-2:

2-c-ii-1: When the language setting (eg, user preference setting/setting) related to the network name in the terminal includes a setting to display the network name as it is (eg, the user preference setting is "display as is")), the terminal may display the network name as it is on the display. For example, the terminal may display the network name received from the serving PLMN or the network name stored in the USIM or UICC (the network name related to the network ID information received by the terminal) as it is (refer to the example of FIG. 23).

2-c-ii-2: When the terminal includes a setting not to display non-Latin characters in the language setting (eg, user preference setting/setting) related to the network name (eg, the user preference setting is "not display" non-Latin character (or CJKV character)"), the terminal may display only Latin characters without displaying non-Latin characters in the network name. For example, the terminal does not display non-Latin characters in the network name received from the serving PLMN or the network name stored in USIM or UICC (network name related to the network ID information received by the terminal), but only Latin letters. There is (see example in FIG. 24).

For reference, CJKV is an example of a language set for a network ID or name that a user can select to display or not to display. The terminal may provide a means to the user so that the user can set the language setting related to the network name for various non-Latin characters.

In a roaming case and/or non-roaming case, a terminal (eg UE or ME) provides the user with means (eg, displaying a setting screen, reception of setting information through voice recognition the, etc.), so that the user can set preferences for the display of the network ID (or name).

Hereinafter, an example of the operation of the terminal according to the disclosure of the present specification will be described with reference to FIGS. 9 and 10.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 9:
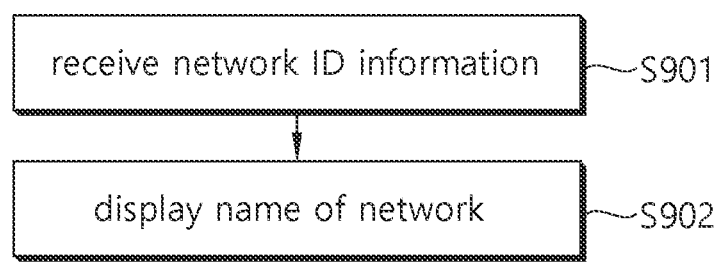
FIG. 9 is an exemplary diagram illustrating a first example of an operation of a terminal according to the disclosure of the present specification.

FIG. 9 is an exemplary diagram illustrating a first example of an operation of a terminal according to the disclosure of the present specification.

In step S901, the terminal may receive network ID information. For example, the UE may receive network ID information from a new serving network (eg, VPLMN). The network ID information may include information on the name of a new serving network.

The name of the new serving network may include a first character group including at least one character based on a first language and a second character group including at least one character based on a second language. For example, the new serving network may include a first character group based on English (eg, China Mobile) and a second character group (eg 中国移动) based on Chinese.

In step S902, the terminal may display the name of the network. For example, the terminal may determine the name of the network to be displayed on the display based on the network ID information, and display the name of the network on the display. If language setting information related to the network name is stored, the terminal may display the name of the network on the display of the terminal based on the language setting related to the network name and network ID information. According to the language setting information related to the network name, either one of the first character group and the second character group may be displayed, or both groups may be displayed.

When the language setting information related to the network name does not exist, a network name related to the ID information of the first network among at least one network name stored in the UICC or USIM of the terminal may be displayed on the display.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 10:
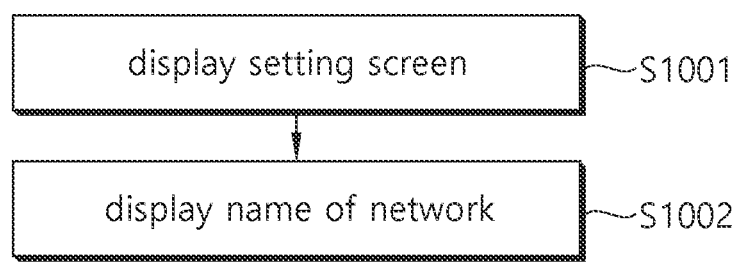
FIG. 10 is an exemplary diagram illustrating a second example of an operation of a terminal according to the disclosure of the present specification.

FIG. 10 is an exemplary diagram illustrating a second example of an operation of a terminal according to the disclosure of the present specification.

In step S1001, the terminal may display a setting screen. For example, the terminal may display a setting screen in which language setting information related to a network name may be input on the display of the terminal. When the user inputs language setting information related to the network name based on the setting screen, the terminal may identify the information input by the user and store the language setting information related to the network name.

In step S1002, the terminal may display the name of the network. For example, the terminal may display the name of the network on the display based on language setting information related to the network name. When the terminal receives the network ID information from the serving network, the terminal may determine the name of the network to be displayed on the display based on the network ID information and the language setting information related to the network name. The terminal may display the determined name of the network on the display.

The name of the network may include a first character group including at least one character based on a first language and a second character group including at least one character based on a second language. For example, the new serving network may include a first character group based on English (eg, China Mobile) and a second character group (eg 中国移动) based on Chinese. According to the language setting information related to the network name, either one of the first character group and the second character group may be displayed, or both groups may be displayed.

The operation of the terminal shown in FIGS. 9 and 10 is described above based on separate drawings, but this is only an example. The operation of the terminal described with reference to FIG. 9 and the operation of the terminal described with reference to FIG. 10 may be applied in combination. For example, after performing step S1001 of FIG. 10, the terminal may perform step S901 of FIG. 9, and may perform step S902 of FIG. 10 or step S1002 of FIG. 9.

In addition, the operation performed by the terminal is not limited by the operation described with reference to FIG. 9 and the operation described with reference to FIG. 10. The terminal may perform various operations described below in addition to the operation described with reference to FIG. 9 and the operation described with reference to FIG. 10.

Hereinafter, a first example and a second example of the disclosure of the present specification will be specifically described. Several methods of the disclosure of the present specification (eg, methods described in the first example, the second example, etc.) may be implemented in combination of one or more.

1. A First Example of the Disclosure of the Present Specification (an Example of an Operation in which the Terminal Displays the Name of the Network)

Hereinafter, an operation in which the terminal displays the name of the network will be described in detail with reference to FIGS. 11 to 14. Hereinafter, the network name displayed by the terminal may also be referred to as Network Identity and Time Zone (NITZ).

The following drawings were created to explain a specific example of the present specification. Since the names of specific devices described in the drawings or the names of specific signals/messages/fields are presented by way of example, the technical features of the present specification are not limited to the specific names used in the following drawings.

Figure 11:
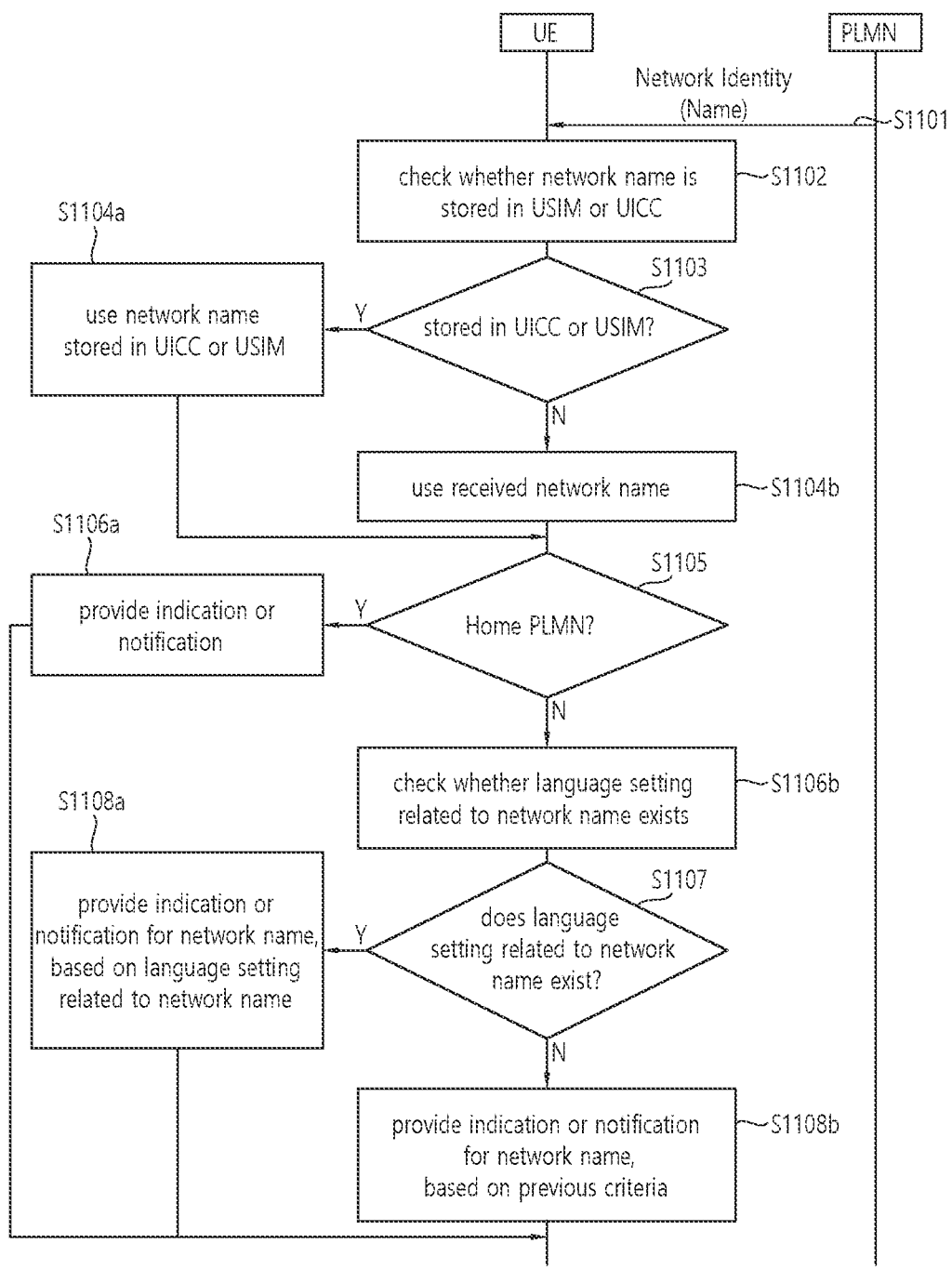
FIG. 11 is an exemplary diagram illustrating a first example in which the terminal displays the name of the network according to the disclosure of the present specification.

FIG. 11 is an exemplary diagram illustrating a first example in which the terminal displays the name of the network according to the disclosure of the present specification.

In step S1101, the terminal may receive network ID information (or network name information) from the PLMN. Here, the PLMN may be a new serving network. The network ID information may include network name information.

In step S1102, the terminal may check whether the network name related to the network ID information is stored in the USIM or UICC of the terminal. As an example, the UE may check whether a network name corresponding to network ID information (eg, a combination of MCC and MNC) is stored in USIM or UICC. As another example, the terminal may check whether a network name corresponding to the information on the name of the network included in the network ID information is stored in the USIM or the UICC.

In step S1103, the terminal may determine whether to perform step S1104a or S1104b according to whether a network name related to network ID information is stored in USIM or UICC.

If the network name is stored in the USIM or UICC, the terminal may perform step S1104a. If the network name is not stored in the USIM or UICC, the terminal may perform step S1104b.

In step S1104a, the terminal may use the network name stored in the USIM or UICC. For example, the terminal may perform the operations described below based on the network name related to the network ID information stored in the USIM or UICC.

In step S1104b, the terminal may use the received network name. For example, the terminal may identify the network name of the serving network (PLMN in FIG. 11) based on the received network ID information. As another example, when the terminal receives the information on the network name, the terminal may identify the network name of the serving network (PLMN in FIG. 12) based on the information on the network name. When the terminal does not receive the information on the network name, the terminal can use the network name if the network name related to the network ID information is stored in a part except for the USIM or UICC in the terminal. The terminal may perform operations described below based on the received network name.

In step S1105, the terminal may check whether the serving network (PLMN in FIG. 11) is a home PLMN. For example, the UE may determine whether the serving network (PLMN in FIG. 11) is a home PLMN based on network ID information or a network name.

When the serving network (PLMN in FIG. 11) is the home PLMN, the terminal may perform step S1106a. If the serving network (PLMN in FIG. 11) is not the home PLMN, the terminal may perform step S1106b.

In step S1106a, the terminal may provide an indication or notification to the user. For example, the terminal may provide an indication or notification to the user that the serving network is a home PLMN. Here, the indication or notification may be provided based on a visual display. Alternatively, the indication or notification may be provided based on an audio and/or visual display. For example, the terminal may provide an indication or notification to the user based on sound, vibration, beeping, and/or alarm, etc.

In step S1106b, the terminal may check whether a language setting related to the network name exists. For example, the terminal may check whether a language setting related to a network name based on information input by the user is stored.

In step S1107, the terminal may determine whether to perform step S1108a or step S1108b according to whether a language setting related to the network name exists.

In step S1108a, the terminal may provide an indication or notification for the network name (or network ID or NITZ) based on the language setting related to the network name. Here, the indication or notification may be provided based on a visual display. Alternatively, the indication or notification may be provided based on an audio and/or visual display. For example, the terminal may provide an indication or notification to the user based on sound, vibration, beeping, and/or alarm, etc.

For example, if the language setting related to the network name includes a setting not to display non-Latin characters or specific languages (eg, Chinese, Korean and/or Vietnamese, etc.), the terminal may not display a specific language, and only display Latin characters.

In addition, the terminal may also provide an indication or notification about the roaming state. For example, the terminal may display an indication or notification such as "roaming into country AAA" on the display. AAA may indicate the country of the PLMN of FIG. 11. For example, AAA may be China, Japan, or the like.

In step S1108b, the terminal may provide an indication or notification for the network name (or network ID or NITZ) based on the previous criteria. Here, the indication or notification may be provided based on a visual display. Alternatively, the indication or notification may be provided based on an audio and/or visual display. For example, the terminal may provide an indication or notification to the user based on sound, vibration, beeping, and/or alarm, etc.

For example, the terminal may display the received network name as it is. Alternatively, the terminal may display the network name based on the language setting related to the network name received from the network even if the language setting related to the current network name is not stored. Specifically, a language setting (eg, user preference setting) related to a network name may have been previously stored in a network storage and the network may have provided it to the terminal. In this case, the terminal may display the network name based on the language setting related to the network name received from the network.

In addition, the terminal may also provide an indication or notification about the roaming state. For example, the terminal may display an indication or notification such as "roaming into country AAA" on the display. AAA may indicate the country of the PLMN of FIG. 11. For example, AAA may be China, Japan, or the like.

For reference, the language setting related to the network name of FIG. 11 may be set based on information input by the user. According to the example of FIG. 11, a user can set a language related to a network name for a roaming case (when the PLMN of FIG. 11 is a visted PLMN), and the user can omit language setting related to a network name for a home PLMN.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 12:
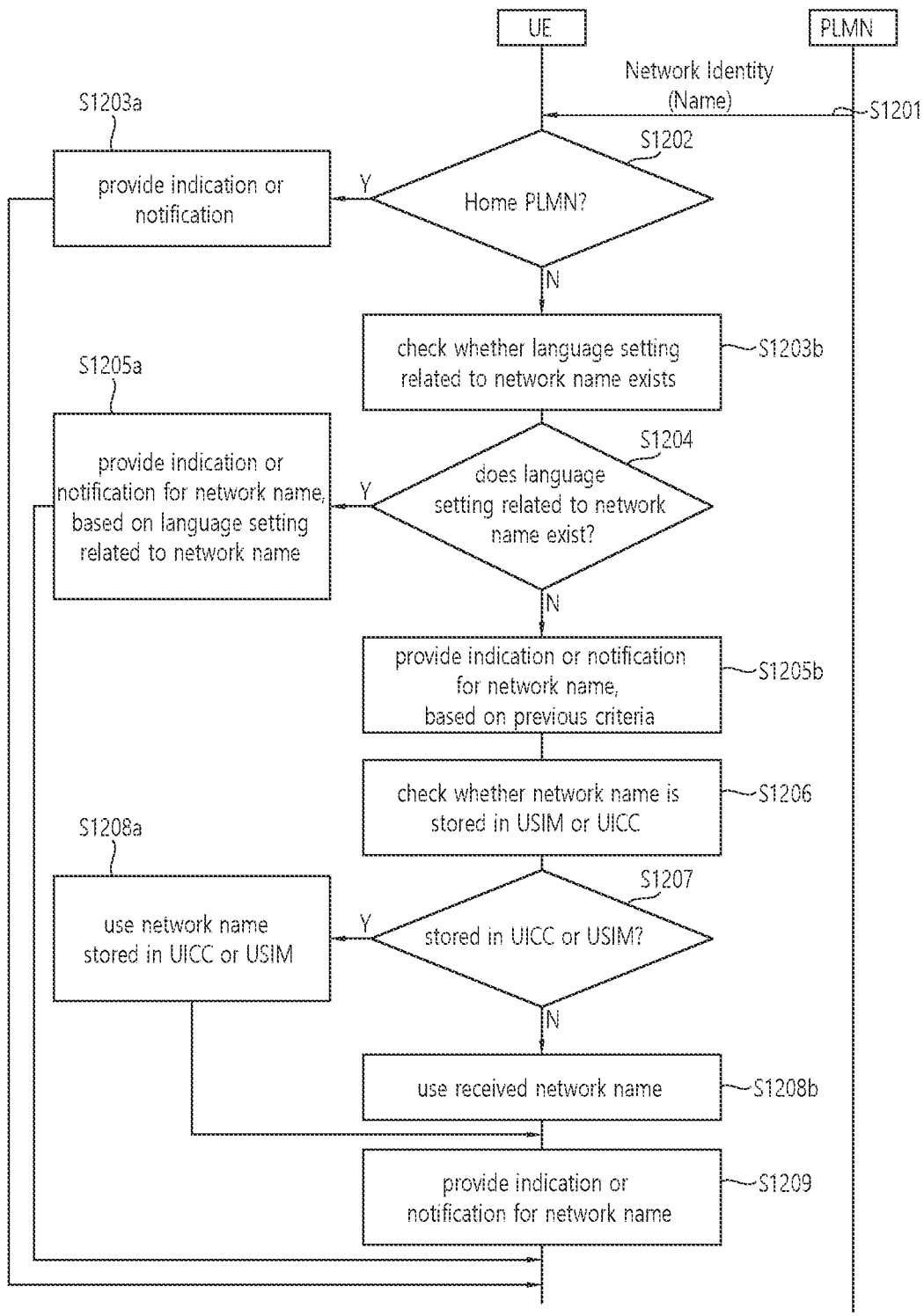
FIG. 12 is an exemplary diagram illustrating a second example in which the terminal displays the name of the network according to the disclosure of the present specification.

FIG. 12 is an exemplary diagram illustrating a second example in which the terminal displays the name of the network according to the disclosure of the present specification.

Step S1201 may be performed in the same manner as step S1101 of FIG. 11.

In step S1202, the terminal may check whether the serving network (PLMN in FIG. 12) is a home PLMN. For example, the UE may determine whether the serving network (PLMN in FIG. 12) is a home PLMN based on network ID information.

When the serving network (PLMN in FIG. 12) is the home PLMN, the terminal may perform step S1203*a*. If the serving network (PLMN in FIG. 11) is not the home PLMN, the terminal may perform step S1203*b*.

In step S1203*a*, the terminal may provide an indication or notification to the user. For example, the terminal may provide an indication or notification to the user that the serving network is a home PLMN. Here, the indication or notification may be provided based on a visual display. Alternatively, the indication or notification may be provided based on an audio and/or visual display. For example, the terminal may provide an indication or notification to the user based on sound, vibration, beeping, and/or alarm, etc.

In step S1203*b*, the terminal may check whether a language setting related to the network name exists. For example, the terminal may check whether a language setting related to a network name based on information input by the user is stored.

In step S1204, the terminal may determine whether to perform step S1205*a* or step S1205*b* according to whether a language setting related to the network name exists.

In step S1205*a*, the terminal may provide an indication or notification for the network name (or network ID or NITZ) based on the language setting related to the network name. Here, the indication or notification may be provided based on a visual display. Alternatively, the indication or notification may be provided based on an audio and/or visual display. For example, the terminal may provide an indication or notification to the user based on sound, vibration, beeping, and/or alarm, etc.

For example, if the language setting related to the network name includes a setting not to display non-Latin characters or specific languages (eg, Chinese, Korean and/or Vietnamese, etc.) the terminal may not display a specific language or non-Latin characters, and the terminal may only Latin characters.

In addition, the terminal may also provide an indication or notification about the roaming state. For example, the terminal may display an indication or notification such as "roaming into country AAA" on the display. AAA may indicate the country of the PLMN of FIG. 11. For example, AAA may be China, Japan, or the like.

In step S1205*b*, the terminal may determine the network name (or network ID or NITZ) to be used in the following steps S1206 to S1207 based on the previous criteria.

For example, the terminal may use the received network name as it is. Alternatively, the terminal may display the network name based on the language setting related to the network name received from the network even if the language setting related to the current network name is not stored. Specifically, a language setting (eg, user preference setting) related to a network name may have been previously stored in a network storage and the network may have provided it to the terminal. In this case, the terminal may display the network name based on the language setting related to the network name received from the network.

In step S1206, the terminal may check whether the network name determined to be used in step S1205*b* or a network name related to network ID information is stored in the USIM or UICC of the terminal. As an example, the terminal may check whether a network name corresponding to the network name or network ID information (eg, a combination of MCC and MNC) determined to be used in step S1205*b* is stored in the USIM or UICC. As another example, the terminal may check whether the network name determined to be used in step S1205*b* or the network name corresponding to information on the network name included in the network ID information is stored in the USIM or the UICC.

In step S1207, the terminal may determine to perform step S1208*a* or step S1208*b*, depending on whether the network name determined to be used in step S1205*b* or the network name related to the network ID information is stored in the USIM or UICC.

If the network name is stored in the USIM or UICC, the terminal may perform step S1208*a*. If the network name is not stored in the USIM or UICC, the terminal may perform step S1208*b*.

In step S1208*a*, the terminal may use the network name stored in the USIM or UICC. For example, the terminal may perform step S1209 based on the network name related to the network ID information stored in the USIM or UICC.

In step S1208*b*, the terminal may use the received network name or the network name determined to be used in step S1205*b*. For example, the terminal may identify the network name of the serving network (PLMN in FIG. 12) based on the received network ID information. As another example, when the terminal receives the information on the network name, the terminal may identify the network name of the serving network (PLMN in FIG. 12) based on the information on the network name. When the terminal does not receive the information on the network name, the terminal can use the network name if the network name related to the network ID information is stored in a part except for the USIM or UICC in the terminal. The terminal may perform step S1209 based on the received network name or the network name determined to be used in step S1205*b*.

In step S1209, the terminal may provide an indication or notification for the network name determined to be used in step S1208*a* or the network name determined to be used in step S1208*b*. Here, the indication or notification may be provided based on a visual display. Alternatively, the indication or notification may be provided based on an audio and/or visual display. For example, the terminal may provide an indication or notification to the user based on sound, vibration, beeping, and/or alarm, etc.

For example, when it is determined to use the received network name in step S1208*b*, the terminal may display the received network name as it is. Alternatively, when it is determined to use the network name determined to be used in step S1205*b*, even if the language setting related to the current network name is not stored, the terminal may display the network name based on the language setting related to the network name received from the network. Specifically, a language setting (eg, user preference setting) related to a network name may have been previously stored in the network storage and the language setting may be provided by the network to the terminal. In this case, the terminal may display the network name based on the language setting related to the network name received from the network. In addition, the terminal may also provide an indication or notification about the roaming state. For example, the terminal may display an indication or notification such as "roaming into country AAA" on the display. AAA may indicate the country of the PLMN of FIG. 12. For example, AAA may be China, Japan, or the like.

For reference, the language setting related to the network name of FIG. 12 may be set based on information input by the user. According to the example of FIG. 12, the user can set a language setting related to the network name for a roaming case (when the PLMN of FIG. 12 is a visted PLMN), and the user can set a language setting related to the network name in the case of a home PLMN cannot be set The following drawings were created to explain a specific example of the present specification. Since the names of specific devices described in the drawings or the names of specific signals/messages/fields are presented by way of example, the technical features of the present specification are not limited to the specific names used in the following drawings.

Figure 13:
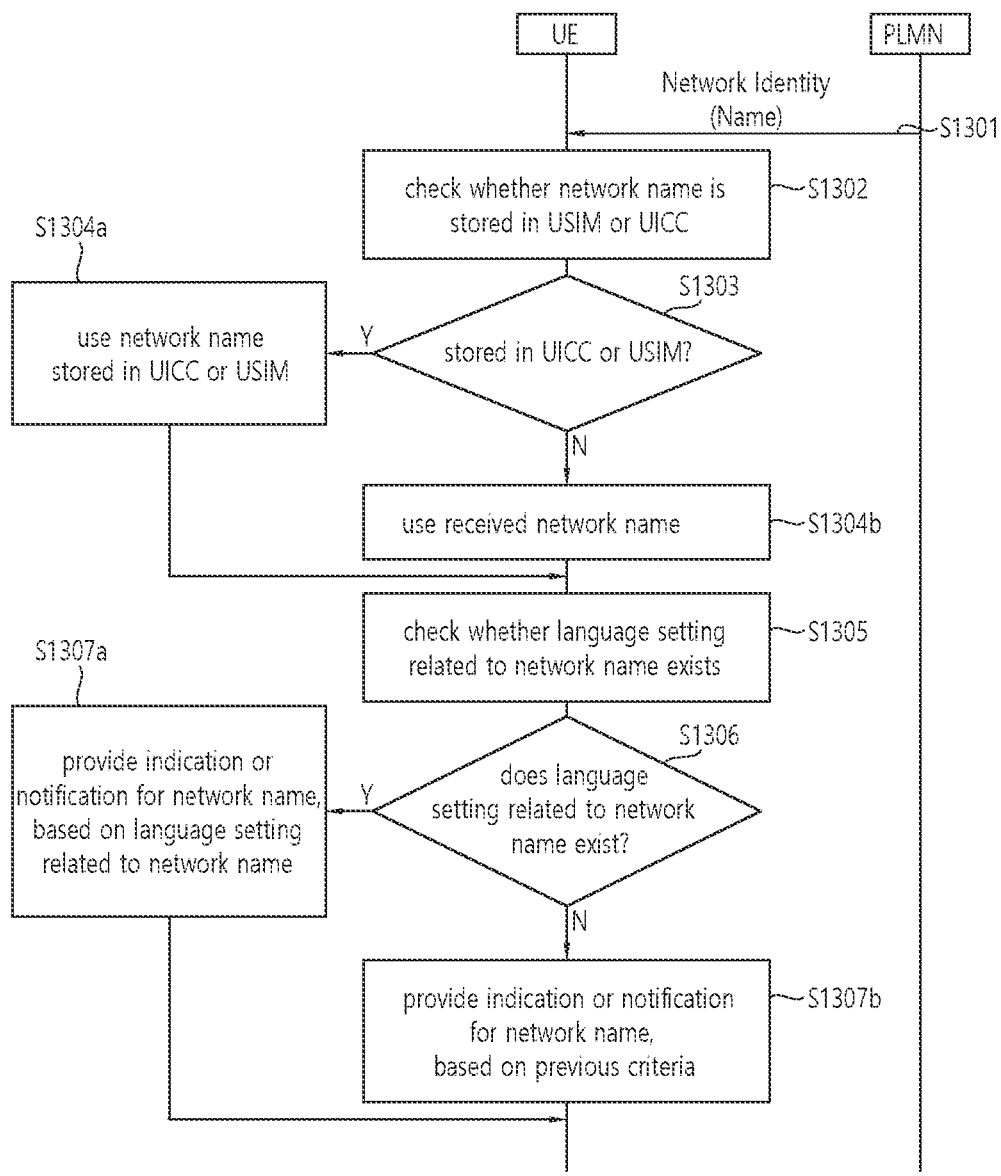
FIG. 13 is an exemplary diagram illustrating a third example in which the terminal displays the name of the network according to the disclosure of the present specification.

FIG. 13 is an exemplary diagram illustrating a third example in which the terminal displays the name of the network according to the disclosure of the present specification.

Step S1301 may be the same as step S1101 of FIG. 11.

In step S1302, the terminal may check whether the network name related to the network ID information is stored in the USIM or UICC of the terminal. As an example, the UE may check whether a network name corresponding to network ID information (eg, a combination of MCC and MNC) is stored in USIM or UICC. As another example, the terminal may check whether a network name corresponding to the information on the name of the network included in the network ID information is stored in the USIM or the UICC.

In step S1303, the terminal may determine whether to perform step S1304a or S1304b according to whether the network name related to the network ID information is stored in the USIM or UICC.

If the network name is stored in the USIM or UICC, the terminal may perform step S1304a. If the network name is not stored in the USIM or UICC, the terminal may perform step S1304b.

In step S1304a, the terminal may use the network name stored in the USIM or UICC. For example, the terminal may perform the operations described below based on the network name related to the network ID information stored in the USIM or UICC.

In step S1304b, the terminal may use the received network name. For example, the terminal may identify the network name of the serving network (PLMN in FIG. 13) based on the received network ID information. As another example, when the terminal receives the information on the network name, the terminal may identify the network name of the serving network (PLMN in FIG. 13) based on the information on the network name. When the terminal does not receive the information on the network name, if the network name related to the network ID information is stored in a part except for USIM or UICC in the terminal, the terminal can use the network name. Based on the received network name, the operations described below can be performed.

In step S1305, the terminal may check whether a language setting related to the network name exists. For example, the terminal may check whether a language setting related to a network name based on information input by the user is stored.

In step S1306, the terminal may determine whether to perform step S1307a or step S1107b according to whether a language setting related to the network name exists.

In step S1307a, the terminal may provide an indication or notification for the network name (or network ID or NITZ) based on the language setting related to the network name. Here, the indication or notification may be provided based on a visual display. Alternatively, the indication or notification may be provided based on an audio and/or visual display. For example, the terminal may provide an indication or notification to the user based on sound, vibration, beeping, and/or alarm. etc.

For example, if the language setting related to the network name includes a setting not to display non-Latin characters or specific languages (eg, Chinese, Korean and/or Vietnamese, etc.), the terminal may not display a specific language, and only display Latin characters.

In addition, the terminal may also provide an indication or notification about the roaming state. For example, the terminal may display an indication or notification such as "roaming into country AAA" on the display. AAA may indicate the country of the PLMN of FIG. 13. For example, AAA may be China, Japan, or the like.

In step S1307b, the terminal may provide an indication or notification for the network name (or network ID or NITZ) based on the previous criteria. Here, the indication or notification may be provided based on a visual display. Alternatively, the indication or notification may be provided based on an audio and/or visual display. For example, the terminal may provide an indication or notification to the user based on sound, vibration, beeping, and/or alarm, etc.

For example, the terminal may display the received network name as it is. Alternatively, even if the terminal does not currently store the language setting related to the network name, if the language setting related to the network name has been previously stored and the network name has been displayed based on this setting, the terminal may display the network name based on the previous setting.

In addition, the terminal may also provide an indication or notification about the roaming state. For example, the terminal may display an indication or notification such as "roaming into country AAA" on the display. AAA may indicate the country of the PLMN of FIG. 13. For example, AAA may be China, Japan, or the like.

For reference, the language setting related to the network name of FIG. 13 may be set based on information input by the user. According to the example of FIG. 13, a user can set a language related to a network name for a roaming case (when the PLMN of FIG. 13 is a visted PLMN) and a non-roaming case (when the PLMN of FIG. 13 is a home PLMN).

The following drawings were created to explain a specific example of the present specification. Since the names of specific devices described in the drawings or the names of specific signals/messages/fields are presented by way of example, the technical features of the present specification are not limited to the specific names used in the following drawings.

Figure 14:
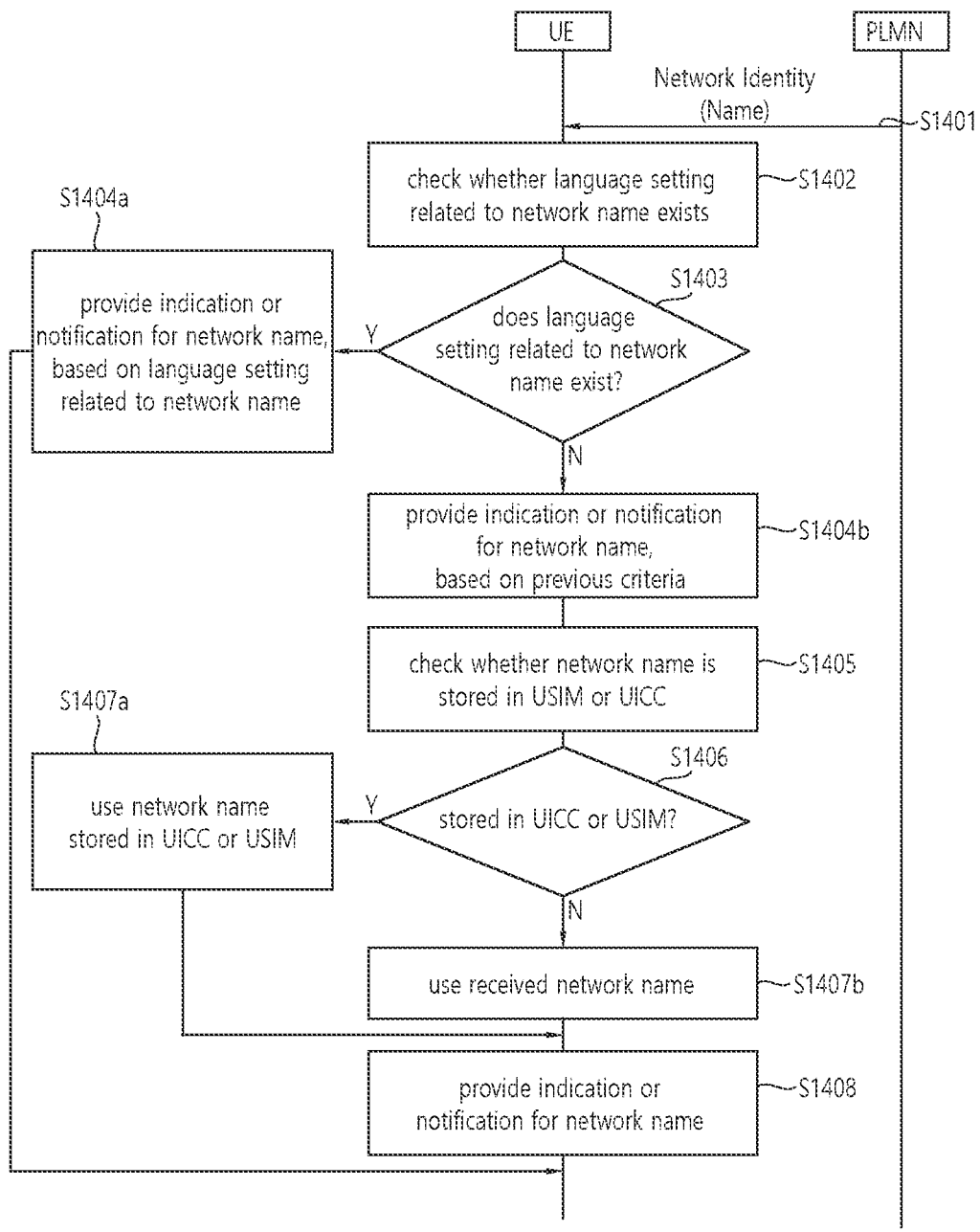
FIG. 14 is an exemplary diagram illustrating a fourth example in which the terminal displays the name of the network according to the disclosure of the present specification.

FIG. 14 is an exemplary diagram illustrating a fourth example in which the terminal displays the name of the network according to the disclosure of the present specification.

Step S1401 may be performed in the same manner as step S1101 of FIG. 11.

In step S1402, the terminal may check whether a language setting related to the network name exists. For example, the terminal may check whether a language setting related to a network name based on information input by the user is stored.

In step S1403, the terminal may determine whether to perform step S1404a or step S1404b according to whether a language setting related to the network name exists.

In step S1404a, the terminal may provide an indication or notification for the network name (or network ID or NITZ) based on the language setting related to the network name. Here, the indication or notification may be provided based on a visual display. Alternatively, the indication or notification may be provided based on an audio and/or visual display. For example, the terminal may provide an indication or notification to the user based on sound, vibration, beeping, and/or alarm, etc.

For example, if the language setting related to the network name includes a setting not to display non-Latin characters or specific languages (eg, Chinese, Korean and/or Vietnamese, etc.) the terminal may not display a specific language or non-Latin characters, and the terminal may only Latin characters.

In addition, when the PLMN of FIG. 14 is the visited PLMN, the terminal may also provide an indication or notification for the roaming state. For example, the terminal may display an indication or notification such as "roaming into country AAA" on the display. AAA may indicate the country of the PLMN of FIG. 14. For example, AAA may be China, Japan, or the like.

In step S1404b, the terminal may determine the network name (or network ID or NITZ) to be used in the following steps S1405 to S1406 based on the previous criteria.

For example, the terminal may use the received network name as it is. Alternatively, even if the terminal does not currently store the language setting related to the network name, if the language setting related to the network name has been previously stored and the terminal has displayed the network name based on this setting, the terminal may decide to use the network name based on the previous setting.

In step S1405, the terminal may check whether the network name determined to be used in step S1404b or a network name related to network ID information is stored in the USIM or UICC of the terminal. As an example, the terminal may check whether a network name corresponding to the network name or network ID information (eg, a combination of MCC and MNC) determined to be used in step S1404b is stored in the USIM or UICC. As another example, the terminal may check whether the network name determined to be used in step S1404b or the network name corresponding to the information on the network name included in the network ID information is stored in the USIM or the UICC.

In step S1406, the terminal may determine to perform step S1407a or step S1407b according to whether the network name or network name related to the network ID information determined to be used in step S1404b is stored in the USIM or UICC.

If the network name is stored in the USIM or UICC, the terminal may perform step S1407a. If the network name is not stored in the USIM or UICC, the terminal may perform step S1407b.

In step S1407a, the terminal may use the network name stored in the USIM or UICC. For example, the terminal may perform the operations described below based on the network name related to the network ID information stored in the USIM or UICC.

In step S1407b, the terminal may use the received network name or the network name determined to be used in step S1404b. For example, the terminal may identify the network name of the serving network (PLMN in FIG. 14) based on the received network ID information. As another example, when the terminal receives the information on the network name, the terminal may identify the network name of the serving network (PLMN in FIG. 14) based on the information on the network name. When the terminal does not receive the information on the network name, the terminal can use the network name if the network name related to the network ID information is stored in a part except for the USIM or UICC in the terminal. The terminal may perform step S1408 based on the received network name or the network name determined to be used in step S1404b.

In step S1408, the terminal may provide an indication or notification of the network name determined to be used in step S1407a or the network name determined to be used in step S1407b. Here, the indication or notification may be provided based on a visual display. Alternatively, the indication or notification may be provided based on an audio and/or visual display. For example, the terminal may provide an indication or notification to the user based on sound, vibration, beeping, and/or alarm, etc.

For example, when it is determined to use the received network name in step S1407b, the terminal may display the received network name as it is. Alternatively, if it is determined to use the network name determined to be used in step S1404b, even if the language setting related to the current network name is not stored, when the terminal has previously stored the language setting related to the network name, and the terminal have previously displayed network names based on this setting, the terminal may display network names based on previous settings.

In addition, when the PLMN of FIG. 14 is the visited PLMN, the terminal may also provide an indication or notification for the roaming state. For example, the terminal may display an indication or notification such as "roaming into country AAA" on the display. AAA may indicate the country of the PLMN of FIG. 14. For example, AAA may be China, Japan, or the like.

Hereinafter, an operation related to the "language setting related to the network name" described above will be described.

2. A Second Example of the Disclosure of the Present Specification (an Example of an Operation Related to "Setting a Language Related to a Network Name")

When displaying the network name (or ID) on the display, the terminal may store "language setting related to the network name" for which language to display or which language to not display. The terminal may display the network name (or ID) based on the "language setting related to the network name".

The terminal may display on the display of the terminal a setting screen in which language setting information related to a network name may be input. For reference, the display of the terminal may refer to the display 1041 of the terminal 100 of FIGS. 7 and 8. For reference, reference numerals of the display 1041 and reference numerals of the terminal 100 may be omitted throughout this specification. When the user inputs information using the setting screen, the terminal may store language setting information related to the network name based on the input information.

Hereinafter, an example of a setting screen based on an Unstructured Supplementary Service Data (USSD) code and an example of a setting screen based on a setting menu will be described. For reference, in the disclosure of this specification, the scope of the setting screen is not limited by two examples. In the disclosure of the present specification, the scope of the setting screen includes any type of setting screen in which language setting information related to a network name can be input. For example, the setting screen may be a screen that requests the user to input information based on voice recognition.

First, an example of a setting screen based on an Unstructured Supplementary Service Data (USSD) code will be described. The USSD may be a protocol (eg, ancillary service protocol) designed to communicate with a computer of a service provider (eg, the user's subscribed PLMN) to which a user of a terminal (eg, UE) is subscribed. For example, when the terminal roams, if user A joins operator X and then travels internationally to enter operator Y's network and executes USSD, this communication becomes communication between user A's terminal and operator X. However, the terminal of user A uses the network of operator Y only as a serving network.

For reference, the description of the USSD code to be described below may be an example of a setting screen based on a Man Machine Interface (MMI). For example, the description of the USSD code may be applied to the MMI code in the same manner.

The terminal may display a setting screen for inputting a USSD code on the display so that language setting information related to a network name can be input.

Figure 15:
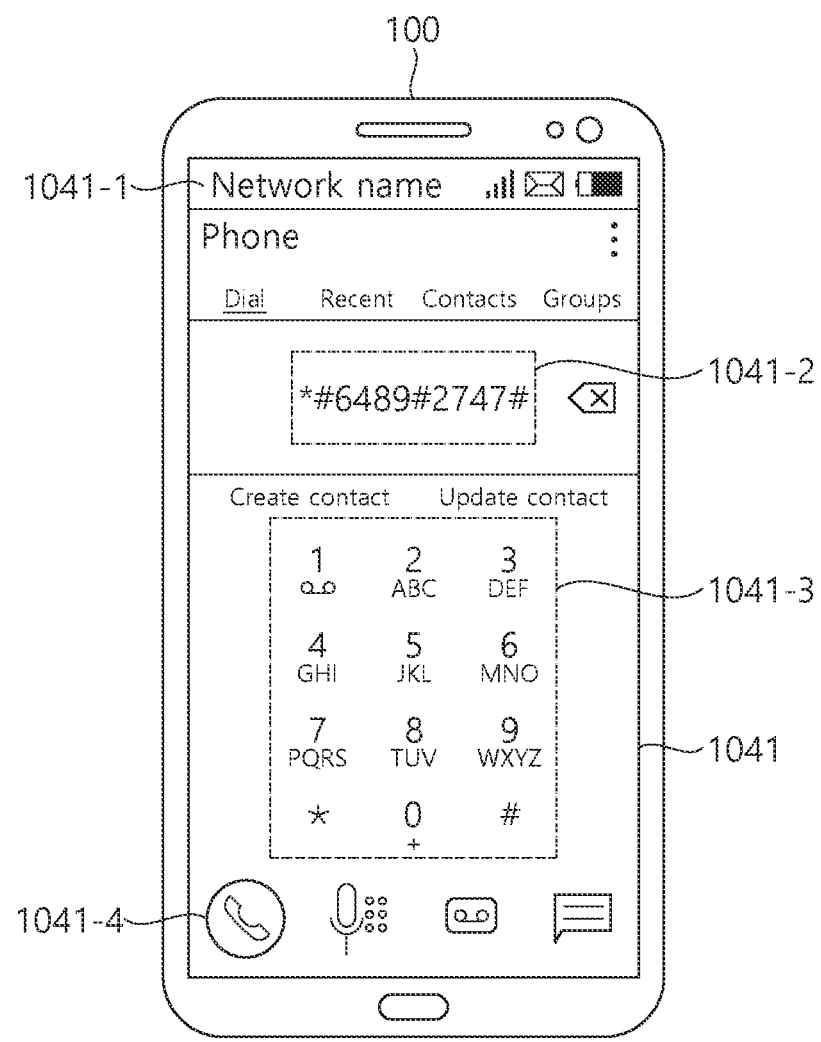
FIG. 15 is a diagram illustrating a first example of a setting screen according to the disclosure of the present specification.
Figure 16:
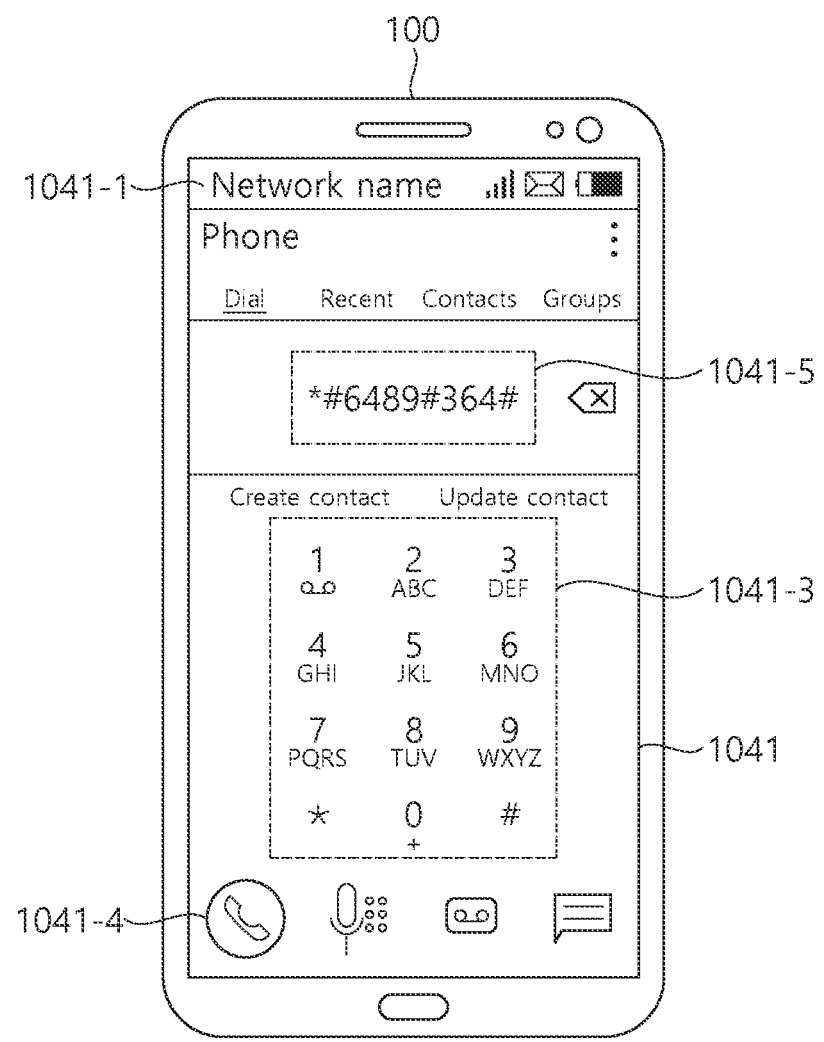
FIG. 16 is a diagram illustrating a second example of a setting screen according to the disclosure of the present specification.

For example, the setting screen may include a plurality of numbers (eg, 0-9) and special characters (eg, * and #) (eg, refer to 1041-3 of FIG. 15 and 1041-3 of FIG. 16). Here, each of the plurality of numbers may be related to at least one alphabet. For example, as in the example of 1041-3 of FIG. 15 and 1041-3 of FIG. 16, 2 relates to A, B, C, 3 relates to D, E, F, 4 relates to G, H, may relate to I, and 5 may relate to J, K, L. Also, the setting screen may include an object (eg, 1041-4 of FIG. 15 or 1041-4 of FIG. 16) related to confirmation, transmission, and/or storage of the input USSD code.

Based on the setting screen, when the user inputs language setting information related to a network name, the terminal may transmit language setting information related to the input network name to the network. The network may store language setting information related to the network name received from the terminal. For example, language setting information related to the network name transmitted to the network may be stored in the cloud. For example, the cloud may be a server of a Mobile Network Operator (MNO).

The network may transmit language setting information related to the network name to the terminal. For example, when the UE moves to a coverage area of another PLMN, the UE may perform an attach procedure, a registration procedure, or an initial access procedure in a new PLMN. In this case, the new PLMN may provide the terminal with language setting information related to the network name.

As in the above example, the terminal may receive the language setting information related to the network name from the network. Accordingly, when the user uses the same UICC or USIM but replaces a terminal (eg, UE or ME), the user does not need to newly set the language setting information related to the network name. The terminal may use the language setting information related to the network name received from the network even if the user does not newly input the language setting information related to the network name. That is, the user does not need to newly set the language setting information related to the network name unless it is necessary.

The terminal may identify the USSD code based on a combination of numbers and/or special characters selected by the user. For example, the user may input a combination of numbers and/or special characters based on a setting screen displayed on the terminal. Then, the terminal may set the language setting information related to the network name based on the combination of the input numbers and/or special characters.

For example, the user may input a combination of numbers and/or special characters in the order of prefix, code (command category: command category), mid-fix, code (command: command), and postfix. Then, the terminal may set the language setting information related to the network name based on the combination of numbers and/or special characters.

Table 6 shows examples of combinations of numbers and/or special characters.

TABLE 6

| Prefix | Code (command category) | Mid-fix | Code (command) | Postfix |
|---|---|---|---|---|
| 1 * | | | | |
| 2 ** | | | | |
| 3 *# | | | | |
| 4 # | | | | |
| 1 | 6489 (NITZ) | | | |
| 2 | 64 (Network Identity) | | | |
| 3 | 66 (Network Name) | | | |
| 1 | | * | | |
| 2 | | | | |
| 3 | | (none) | | |
| 1 | | | 2747 (ASIS) | |
| 2 | | | 7373 (RESEt) | |
| | | | 333 (DEFault) | |
| 3 | | | 364 (ENGlish) | |
| 4 | | | 6684 (NOTIfication) | |
| 1 | | | | # |
| 2 | | | | *# |

The example in Table 6 shows an example of a list of possible USSD formats and USSD codes. Examples of Table 6 include prefix, mid-fix, and postfix, and include command category codes and command codes. Various combinations of prefix, mid-fix, and postfix, category codes, and command codes shown in the examples in Table 6 may be used for language setting information related to network names. Various combinations of prefix, mid-fix, and postfix and category codes and command codes may be entered in the order of "prefix—command category code—mid-fix—command code—postfix". That is, the example of Table 6 shows the USSD format and USSD code that can be used to set the language setting information related to the network name. In the example of Table 6, the numbers may be numbers related to the alphabet written in capital letters in each item.

Specifically, as in 1041-3 of FIG. 15 and 1041-3 of FIG. 16, 2 relates to A, B, C, 3 relates to D, E, F, and 4 relates to G, H, I 5 relates to J, K, L, 6 relates to M, N, O, 7 relates to P, Q, R, S, 8 relates to T, U, V, and 9 relates to It can relate to W, X, Y, Z.

For example, referring to the example of command category codes in Table 6, 6489 is a code related to NITZ. Because the number associated with N is 6, the number associated with I is 4, the number associated with T is 8, and the number associated with Z is 9.

As another example, referring to the example of the command code, 6684 is a code related to "NOTI" in NOTIfication. Because the number associated with N and O is 6, the number associated with T is 8, and the number associated with I is 4.

In the example of Table 6, one of *, **, *#, and # may be used as a prefix. One of 6489, 64, and 66 may be used as the command category code. The command category code may be a code indicating which command category the command code is applied to. 6489, 64, and 66 may mean that the command category is a command category for a name of a network (eg, NITZ, network ID, network name).

A mid-fix may be placed between the command category code and the command code. * or # may be used as the mid-fix, or the mid-fix may be omitted ((none) in Table 6).

The command code may be a code indicating which command is to be applied with respect to the command category. One of 2747, 7373, 333, 364, and 6684 may be used as the command code. 2747 may be a code to display the network name as it is. 7373 may be a code for resetting the language setting information related to the network name stored in the terminal. 333 may be a code for setting the language setting information related to the network name as the default setting information of the terminal. 364 may be a code for displaying only English-based characters from among the characters included in the network name. 6684 may be a code requesting the terminal to notify the user of information about the network name or the update of the information in a manner such as sound or vibration.

postfix can be placed after the command code. For postfix, # or *# can be used.

An example in which various combinations of prefix, mid-fix, and postfix, and category code and command code are used for language setting information related to a network name in the example of Table 6 will be described with reference to FIGS. 15 and 16.

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 15 is a diagram illustrating a first example of a setting screen according to the disclosure of the present specification.

The terminal 100 may display a first example of the setting screen shown in FIG. 15 on the display 1041. For reference, reference numerals of the display 1041 and reference numerals of the terminal 100 may be omitted. Reference numerals of the display 1041 and reference numerals of the terminal 100 may be omitted. A first example of the setting screen shown in FIG. 15 is an example of a setting screen in which language setting information related to a network name can be input.

The object 1041-1 may be an object representing the name of a network. Although "Network name" is shown in FIG. 15, this is only an example, and the object 1041-1 may represent a serving network of the terminal. For example, AT&T may be displayed on the object 1041-1.

The object 1041-2 may be an object representing a USSD code input by a user. The user may select a plurality of numbers and a plurality of special characters displayed on the object 1041-3. For example, the user may touch the object 1041-3 to select a plurality of numbers and a plurality of special characters displayed on the object 1041-3. For another example, the terminal 100 may recognize a user's voice to recognize a plurality of numbers and a plurality of special characters selected by the user, and display the USSD code displayed on the object 1041-2.

The USSD code "*#6489#2727#" displayed on the object 1041-2 of FIG. 15 is prefix (*#), command category code (6489), mid-fix (#), command code (2727), and postfix (#) may mean a combination according to the example of Table 6.

The object 1041-4 may be an object related to verification, transmission, and/or storage of the entered USSD code. As indicated by the object 1041-2, the user may touch the object 1041-4 after inputting *#6489#2727#. Then, the terminal can identify information about a combination of prefix, mid-fix, and postfix, and category code and command code. Then, the terminal may store "setting to display the network name (eg, NITZ) as it is" as language setting information related to the network name.

Figure 17A:
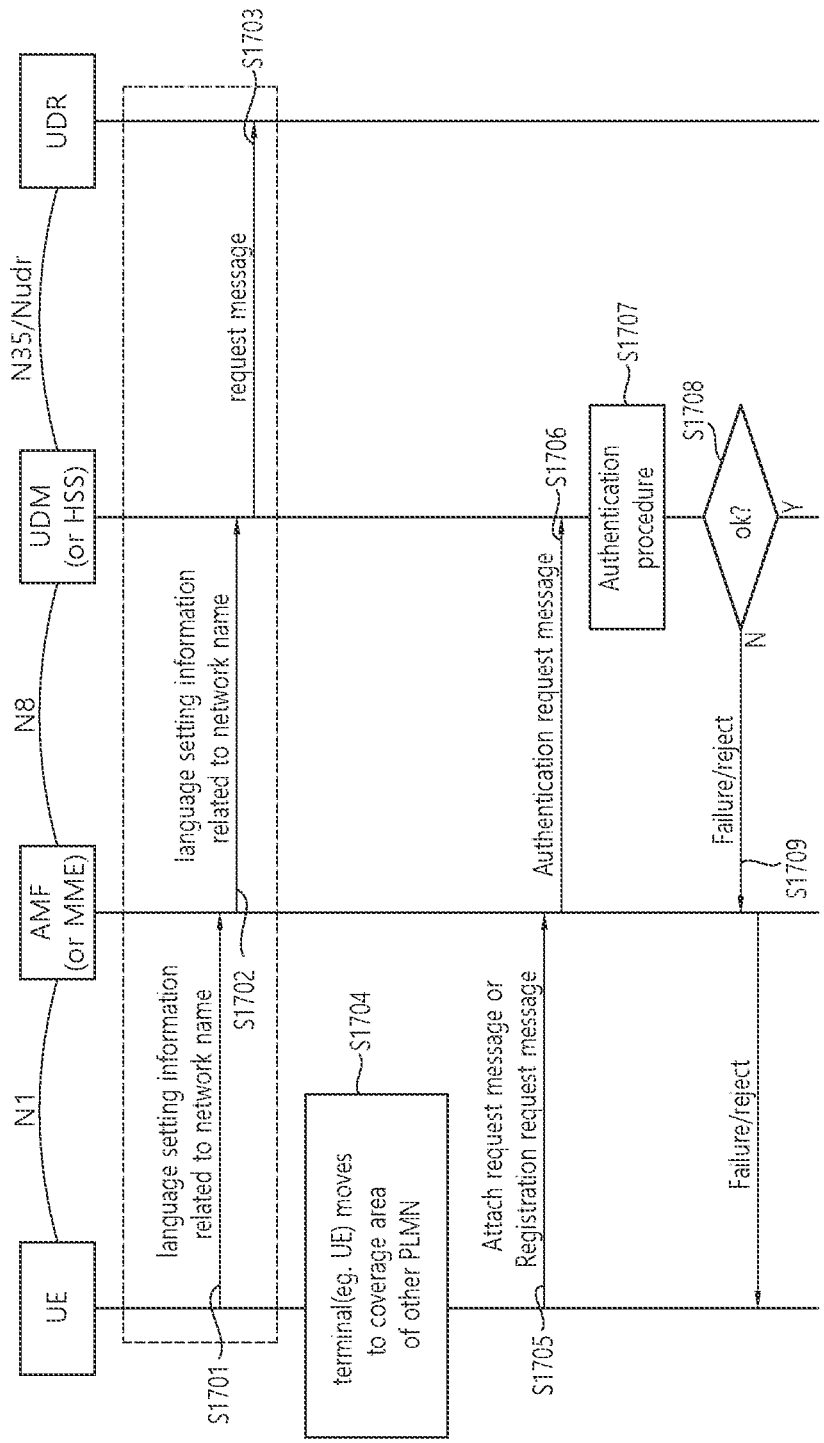
FIGS. 17A and 17B are diagrams illustrating an example in which a terminal performs communication related to language setting information related to a network name according to the disclosure of the present specification.
Figure 17B:
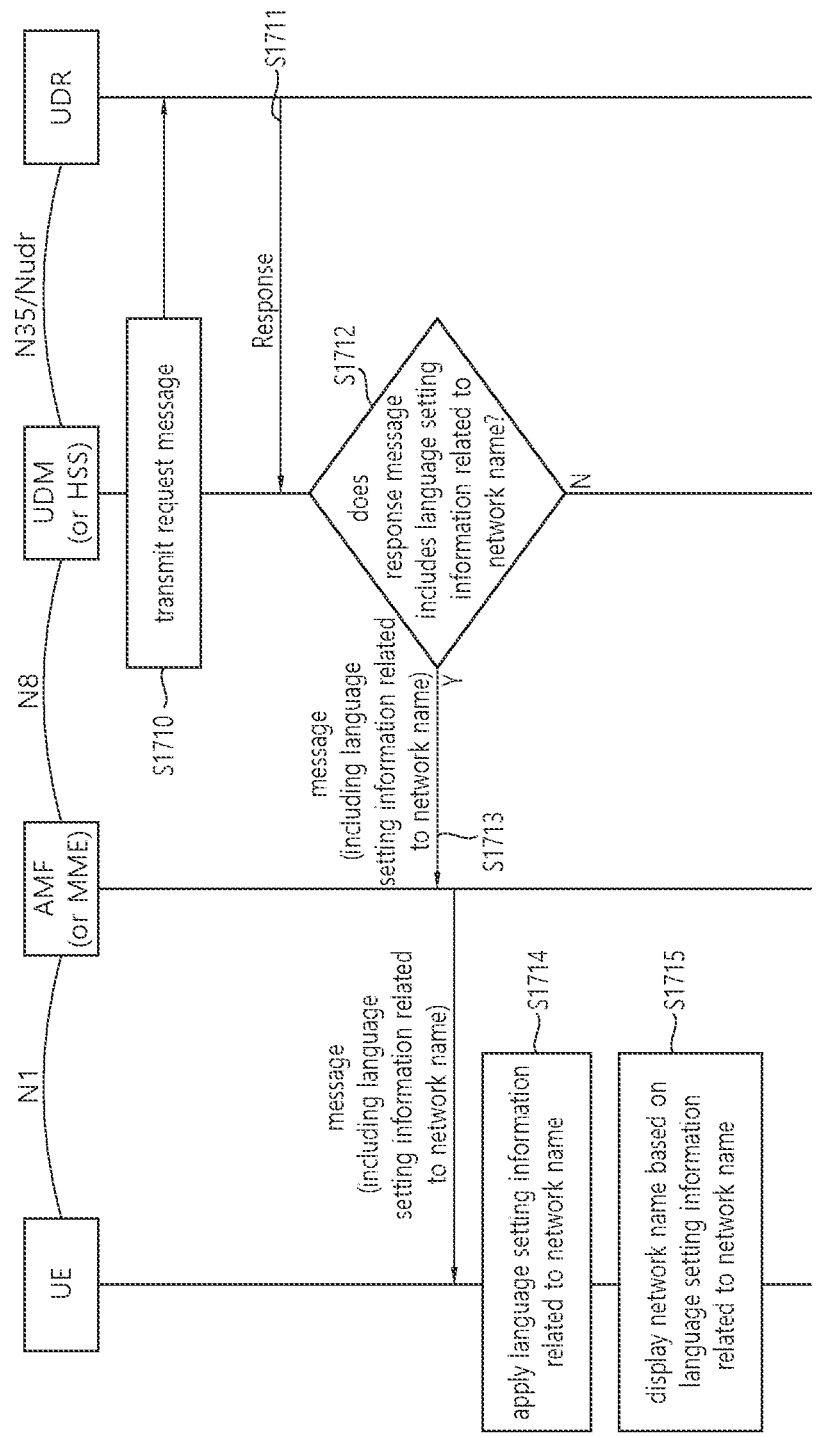
Figure 18:
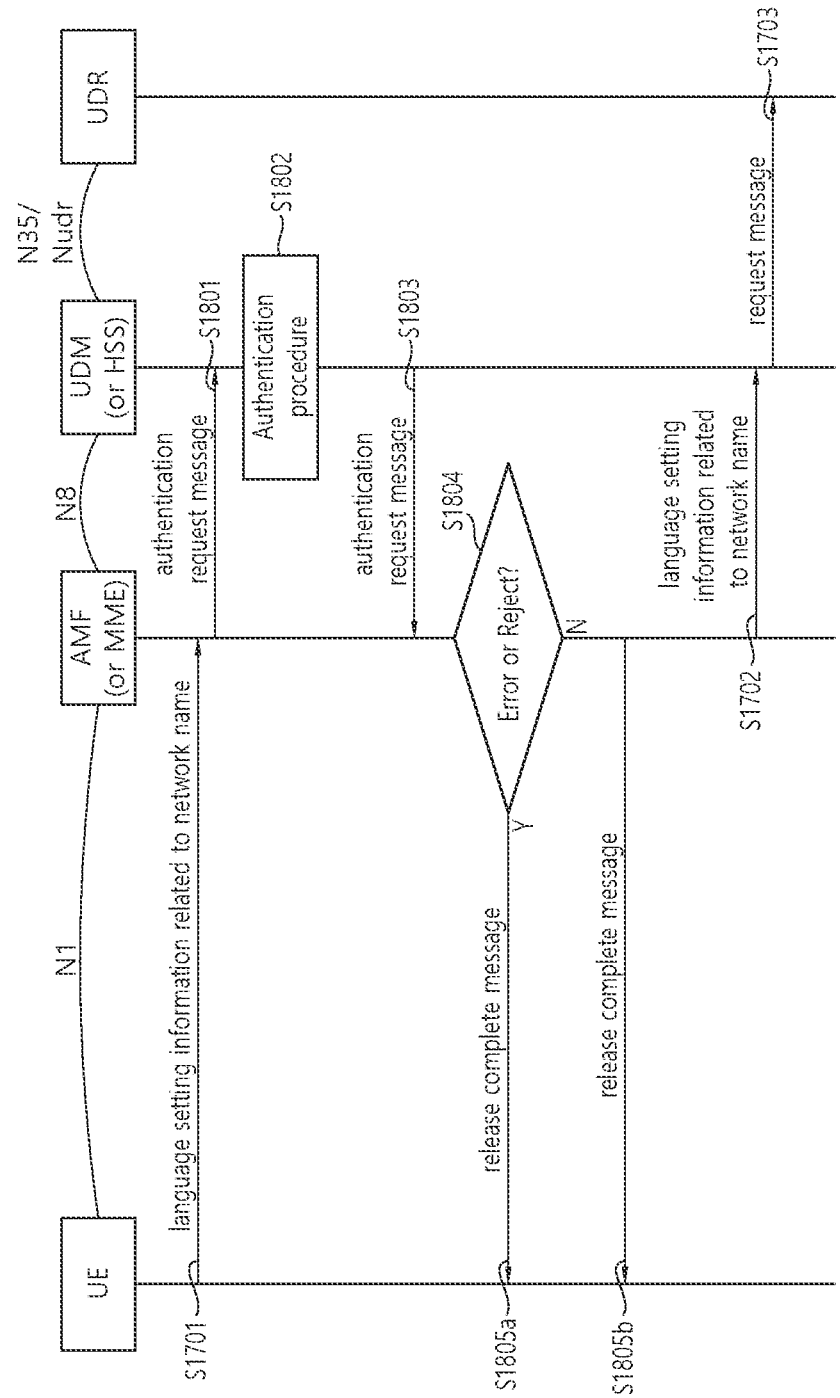
FIG. 18 is a diagram illustrating a specific example of an operation according to steps S1701 to S1703 of FIGS. 17A and 17B.

In addition, when the user touches the object 1041-4 after inputting the USSD code, the terminal may perform operations for transmitting the USSD code as in the example step S1701 of FIGS. 17A and 17B and the step S1701 of FIG. 18.

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 16 is a diagram illustrating a second example of a setting screen according to the disclosure of the present specification.

The terminal 100 may display a second example of the setting screen shown in FIG. 16 on the display 1041-1. Reference numerals of the display 1041 and reference numerals of the terminal 100 may be omitted. A second example of the setting screen shown in FIG. 16 is an example of a setting screen in which language setting information related to a network name can be input.

The object 1041-1 may be an object representing the name of a network. Although "Network name" is shown in FIG. 16, this is only an example, and the object 1041-1 may represent a serving network of the terminal. For example, AT&T may be displayed on the object 1041-1.

The object 1041-2 may be an object representing a USSD code input by a user. The user may select a plurality of numbers and a plurality of special characters displayed on the object 1041-3. For example, the user may touch the object 1041-3 to select a plurality of numbers and a plurality of special characters displayed on the object 1041-3. For another example, the terminal 100 may recognize a user's voice to recognize a plurality of numbers and a plurality of special characters selected by the user, and display the USSD code displayed on the object 1041-2.

The USSD code "*#6489#364#" displayed in the object 1041-2 of FIG. 16 is may mean a combination of prefix (*#), command category code 6489, mid-fix (#), command code (364), and postfix (#) according to the example of Table 6

The object 1041-4 may be an object related to the identification, transmission, and/or storage of the entered USSD code. As indicated in the object 1041-2, after the user inputs *#6489#364#, the user may touch the object 1041-4. Then, the terminal may identify information about a combination of prefix, mid-fix, and postfix, and category code and command code. Then, the terminal may store "setting to display only English-based characters among the characters included in the network name (eg, NITZ)" as language setting information related to the network name.

In addition, when the user touches the object 1041-4 after inputting the USSD code, the terminal may perform operations for transmitting the USSD code as shown in the example step S1701 of FIGS. 17A and 17B and the step S1701 of FIG. 18.

Hereinafter, an operation in which the terminal performs communication related to language setting information related to a network name will be described. For example, an operation in which the terminal performs communication, which is related to language setting information related to a network name, with a network (eg, a network node such as AMF (or MME), UDM (or HSS), UDR, etc.) will be described.

For example, the terminal may perform an operation of transmitting language setting information related to a network name and/or an operation of receiving the language setting information related to the network name by the terminal.

For example, the terminal may transmit language setting information related to a network name set by the user to the network. Then, the network may store the language setting information related to the network name in the cloud node such as UDR. The UE may transmit a message such as an attach request message or a registration request message to the network in a specific situation (eg, the UE moves to a coverage area of another PLMN). Then, the network may transmit language setting information related to the network name stored in the cloud node such as UDR to the terminal. Accordingly, even if the user changes the terminal (eg, ME, UE), if the user maintains the same subscription information (eg, when the user uses the same UICC or the same UICC), the terminal may use the language setting information, previously set by the user, related to network name as it is.

A specific example of an operation in which the terminal performs communication related to language setting information related to a network name will be described with reference to FIGS. 17A, 17B and 18.

The following drawings were created to explain a specific example of the present specification. Since the names of specific devices described in the drawings or the names of specific signals/messages/fields are presented by way of example, the technical features of the present specification are not limited to the specific names used in the following drawings.

FIGS. 17A and 17B are diagrams illustrating an example in which a terminal performs communication related to language setting information related to a network name according to the disclosure of the present specification.

Refer to FIGS. 17A and 17B, terminal (eg, UE), AMF (or MME), UDM (or HSS), and UDR are illustrated. For reference, communication performed by the UE and the AMF (or MME) may be performed between the UE and the AMF (or MME) through a base station (eg, eNB or gNB).

For reference, while steps (S1701) to (S1703) are performed, the AMF (or MME) may be an AMF (or MME) included in the terminal's serving PLMN (eg, VPLMN or HPLMN). According to step S1704, the AMF (or MME) in steps S1705 to S1713, which are performed after the terminal moves to another PLMN coverage area, may be the AMF (or MME) of the serving PLMN or the HPLMN to which the UE is subscribed during steps S1701 to S1703 are performed. For example, if the serving PLMN in steps S1701 to S1703 was an HPLMN, the AMF (or MME) in steps S1705 to S1713 may be the AMF (or MME) of the VPLMN. Meanwhile, UDM (or HSS) and UDR may be UDM (or HSS) and UDR of HPLMN.

In step S1701, the terminal may transmit the language setting information related to the network name to the AMF (or MME). For example, the language setting information related to the network name may be information configured in a USSD code format.

In step S1702, the AMF (or MME) may transmit language setting information related to the network name to the UDM (or HSS). For example, the language setting information related to the network name may be information configured in a USSD code format.

In step S1703, the UDM (or HSS) may transmit a request message for requesting to store the USSD code. For example, the UDM (or HSS) may request the UDR to store the language setting information related to the network name by using the request message. Then, the UDR may store the USSD code (including the language setting information related to the network name).

In step S1704, the terminal may move to a coverage area of another PLMN. For example, the terminal may move to another country, and the terminal may roam to a PLMN in another country.

In step S1705, the terminal may transmit an attach request message or a registration request message to the AMF (or MME) of the new PLMN in order to attach or register to the new PLMN.

In step S1706, the AMF (or MME) may transmit an authentication (Authentication) request message to the UDM (or HSS). For example, the AMF (or MME) may request the UDM (or HSS) to authenticate the terminal based on information included in the attach request message or information included in the registration request message.

In step S1707, the UDM (or HSS) may perform an authentication procedure. For example, the UDM (or HSS) may perform an authentication procedure based on information included in the request message transmitted by the AMF (or MME).

In step S1708, the UDM (or HSS) may check whether the authentication procedure is successful. When the authentication procedure is successful, the UDM (or HSS) may perform step S1710. When the UDM (or HSS) fails in the authentication procedure, step S1709 may be performed.

In step S1709, the UDM (or HSS) may transmit a failure message or a rejection message to the AMF (or MME). Then, the AMF (or MME) may transmit a failure message or a rejection message to the terminal. When the terminal receives a failure message or a rejection message, the terminal may know that it has failed to attach or register to a new PLMN.

In step S1710, the UDM (or HSS) may transmit a request message to the UDR. The request message may include information for requesting language setting information related to a network name. That is, the UDM (or HSS) may transmit a request message to the UDR to request the language setting information related to the network name.

In step S1711, the UDR may transmit a response message to the UDM (or HSS). Here, the response message may be a response to the request message received by the UDR in step S1710.

In step S1712, the UDM (or HSS) may check whether the response message includes language setting information related to the network name. When the response message includes language setting information related to the network name, step S1713 may be performed.

In step S1713, the UDM (or HSS) may transmit a message including language setting information related to the network name to the AFM (or MME). Then, the AMF (or MME) may transmit a message including language setting information related to the network name to the terminal. That is, the terminal may receive the language setting information related to the network name. Here, the message including the language setting information related to the network name may be, for example, a message based on Mobile Terminating Short Message Service (MT SMS).

In step S1714, the terminal may apply the language setting information related to the received network name. For example, the terminal may interpret the received language setting information related to the network name and apply a setting (eg, user preference setting) included in the language setting information related to the network name.

In step S1715, the terminal may display the network name (or ID) on the display based on the language setting information related to the network name. For reference, the terminal may display the network name (or ID) on the display based on language setting information related to the network name as described with reference to FIGS. 9 to 14. For example, the terminal may display the name of the network including letters based on a plurality of languages as it is, or display the network name except for a specific language.

In addition, the terminal may provide an indication (or notification) for a new PLMN or an indication (or notification) for a network name to the user (eg, sound, vibration, beeping, and/or alarm, etc.).

With reference to FIG. 18, specific examples of steps S1701 to S1703 will be described.

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 18 is a diagram illustrating a specific example of an operation according to steps S1701 to S1703 of FIGS. 17A and 17B.

Referring to FIG. 18, a UE (eg, UE), AMF (or MME), UDM (or HSS), and UDR are illustrated. For reference, communication performed by the UE and the AMF (or MME) may be performed between the UE and the AMF (or MME) through a base station (eg, eNB or gNB).

In step S1701, the terminal may transmit the language setting information related to the network name to the AMF (or MME). For example, the language setting information related to the network name may be information configured in a USSD code format. The language setting information related to the network name may be transmitted while being included in a registration request message related to the USSD. For example, the terminal may transmit a registration request message including language setting information related to a network name by invoking ProcessUnstructuredSS-Request.

ProcessUnstructuredSS-Request may be a function (Facility) for requesting processing related to USSD. ProcessUnstructuredSS-Request may include ussd-DataCodingScheme and ussd-String. ussd-DataCodingScheme may mean coding scheme information related to USSD. ussd-String may mean string information related to USSD.

In step S1801, the AMF (or MME) may transmit an authentication request message for requesting authentication related to the USSD to the UDM (or HSS).

In step S1802, the UDM (or HSS) may perform an authentication procedure related to the USSD based on the authentication request message.

In step S1803, the UDM (or HSS) may transmit an authentication response message including information on the result of the authentication procedure performed in step S1802 to the AMF (or MME).

In step S1804, the AMF (or MME) may determine whether there is an error in the authentication related to the USSD or whether the authentication related to the USSD is rejected, based on the authentication response message. If there is an error in the authentication related to the USSD, or the authentication related to the USSD is rejected, the AMF (or MME) may perform step S1805a. If there is no error in the authentication related to the USSD and the authentication related to the USSD is successful, the AMF (or MME) may perform step S1805b.

In step S1805a, the AMF (or MME) may transmit a release complete message to the terminal. The release complete message may include information about an error related to authentication (eg, error(ERROR)) or information about a rejection related to authentication (eg, Reject(Invoke_problem)).

In step S1805b, the AMF (or MME) may transmit a release complete message to the terminal. The release completion message may include information indicating that authentication related to the USSD has been successfully performed. The release completion message may include information on a result of performing USSD-related processing (eg, Return result=ProcessUnstructuredSS-Request (including ussd-DataCoding Scheme, ussd-String)).

In step S1702, the AMF (or MME) may transmit the language setting information related to the network name to the UDM (or HSS). For example, the language setting information related to the network name may be information configured in a USSD code format.

In step S1703, the UDM (or HSS) may transmit a request message for requesting to store the USSD code. For example, the UDM (or HSS) may request the UDR to store the language setting information related to the network name by using the request message. Then, the UDR can store the USSD code (including the language setting information related to the network name).

For reference, in FIGS. 17A and 17B and 18, the interface between the terminal and the network node (eg, reference point N1) and the interface between the network nodes (eg, reference point N3, reference point N35/Nudr) are shown as a reference based on 5GC (5G Core network), although, this is only an example. The names of LTE/EPC (Evolved Packet Core) interfaces and network nodes may also be applied to the descriptions of FIGS. 17A and 17B and 18.

Hereinafter, the UDR described with reference to FIGS. 17A and 17B and 18 will be described in more detail.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 19:
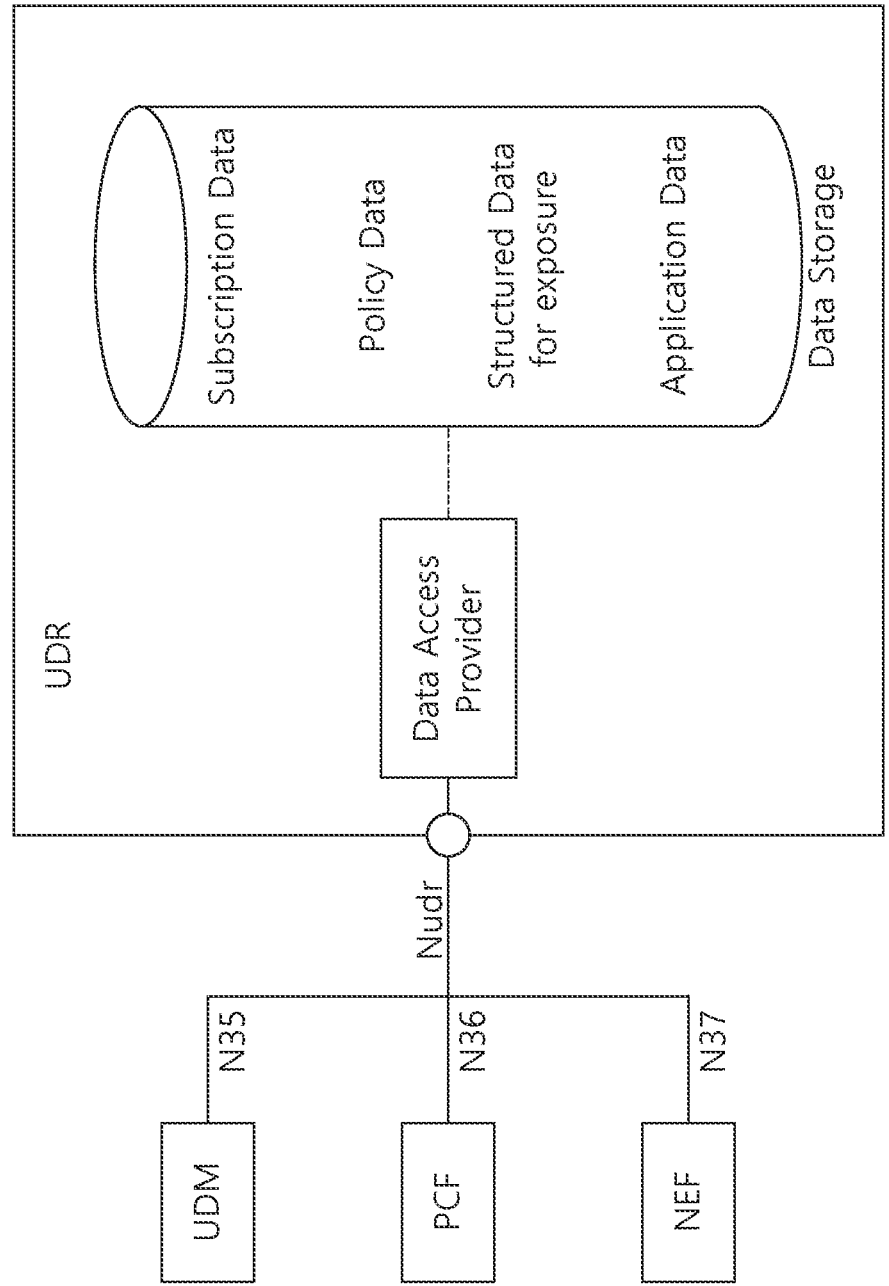
FIG. 19 is a diagram illustrating an example of a network structure related to UDR.

FIG. 19 is a diagram illustrating an example of a network structure related to UDR.

Referring to FIG. 19, UDM, PCF, NEF and UDR are shown. The interface between UDM and UDR may be N35/Nudr. The interface between UDR and PCF may be N36/Nudr. The interface between UDR and NEF may be N37/Nudr.

The UDR may include a data access provider (Data Access Provider) and data storage (Data Storage) that provide data access to network nodes such as UDM, PCF, NEF, and the like. The UDR may store various data such as subscription data, policy data, structured data for exposure, and application data in the data storage.

As can be seen in the example of FIG. 19, the 5G system structure allows network nodes (UDM, PCF and NEF) to store data in UDR. For example, UDMs and PCFs may store subscription data, policy data, and user data (eg, user preference settings such as language settings associated with network names) in UDRs. The NEF may store structured data and application data (including Packet Flow Descriptions (PFDs) for application detection, AF request information for a plurality of UEs) for exposure in the UDR.

A UDR may be deployed in each PLMN, and the UDR may perform various functions, such as:
- The UDR accessed by the NEF belongs to the same PLMN as the PLMN in which the NEF is located.
- If the UDM supports the split architecture, the UDR accessed by the UDM belongs to the same PLMN as the PLMN in which the UDM is located.
- The UDR accessed by the PCF belongs to the same PLMN as the PLMN in which the PCF is located.
- A UDR deployed in each PLMN may store application data for roaming subscribers.

A plurality of UDRs may be deployed in the network. Each UDR can accommodate a different data set or data subset. And, each UDR may serve a different set of NFs. A UDR may serve one NF and store data of one NF, and a deployment in which the UDR is integrated with this one NF may also be possible.

The Nudr interface may be defined for network functions (NFs) (eg, NF service consumers). NFs may be, for example, UDM, PCF and NEF. NFs can access a specific set of data stored in the UDR using the Nudr interface. For example, NFs may update (including addition and modification of data) or delete data stored in the UDR by using the Nudr interface. NFs may subscribe to notifications of changes in relevant data within the UDR, using the Nudr interface.

Each NF service consumer accessing a UDR through Nudr can add, modify, update or delete data stored in the UDR only if the NF service consumer is authorized to change the data. The UDR may determine whether the NF service consumer is authorized to change data per data set, based on the NF service consumer, and potentially on a per-UE subscription granularity.

The following data exposed to NF service consumers through Nudr and stored in UDR can be standardized:
  subscription data
  Policy data
  Structured data for exposure
  User data (e.g. user data related to user preference settings, such as language settings related to network names, or user data related to operations, other than general user data)
  Application data: Packet Flow Descriptions (PFDs) for application detection, AF request information for multiple UEs The service-based Nudr interface may define the content and format/encoding of the 3GPP defined information element exposed by the data set.

In addition, the NF service consumer may access operator-specific data and operator-specific data sets for each data set in the UDR.

Hereinafter, the NF service that the UDR can provide will be described in detail.

Data Set Identifiers such as subscription data, policy data, application data, data for exposure, user data, etc, may be considered in the NF service that the UDR may provide.

The set of data set identifiers may be extensible so that new identifiers as well as operator specific identifiers and associated data are consumed.

Table 7 below shows examples of UDR services.

TABLE 7

| NF service | Service Operations | Operation Semantics | Example Consumer(s) |
| --- | --- | --- | --- |
| Data Management (DM) | Query | Request/Response | UDM, PCF, NEF |
|  | Create | Request/Response | NEF |
|  | Delete | Request/Response | NEF |
|  | Update | Request/Response | UDM, PCF, NEF |
|  | Subscribe | Subscribe/Notify | UDM, PCF, NEF |
|  | Unsubscribe |  | UDM, PCF, NEF |
|  | Notify |  | UDM, PCF, NEF |
| GroupIDmap | Query | Request/Response | NRF, SCP |

Table 7 shows examples of NF services (eg, DM, GroupIdmap) and service operations, operation semantics, and consumers that can be provided by UDR. DM may mean data management. The GroupIDmap may be used to retrieve an NF group ID corresponding to a subscriber identifier. An example of an operation using the NF service of Table 7 will be described as follows. For example, the UDM may request the UDR to store the language setting information related to the network name by using the Query or Update service operation of Table 7. Then, the UDR may provide a response to the UDM's request to the UDM.

Hereinafter, an example of a setting screen based on the setting menu will be described.

The terminal may display a setting screen, in which language setting information related to a network name may be input, on the display of the terminal. Here, the setting screen may be a setting screen based on a setting menu.

For example, the setting screen based on the setting menu may include an object indicating a category of settings (eg, 1041-7 in FIGS. 20 to 22) and an object indicating a language setting related to a network name (eg, in FIGS. 20 to 22). 1041-6) and objects (eg, 1041-8 to 1041-14 in FIGS. 21 and 22) representing various options for language setting related to the network name.

Based on the setting screen based on the setting menu, the user may input language setting information related to the network name. The language setting information related to the input network name may include a setting to display the network name including a specific language or a setting to display the network name by excluding the specific language.

The terminal may display the name (or ID) of the network based on the input language setting information related to the network name. For example, the terminal may display the received network name or the network name (or ID) stored in the USIM (or UICC) or the terminal (eg, ME, UE) as it is. For another example, the terminal may display only Latin letters in the received network name or the network name (or ID) stored in the USIM (or UICC).

Hereinafter, an example of a setting screen based on a setting menu will be described in detail with reference to FIGS. 20 to 23.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 20:
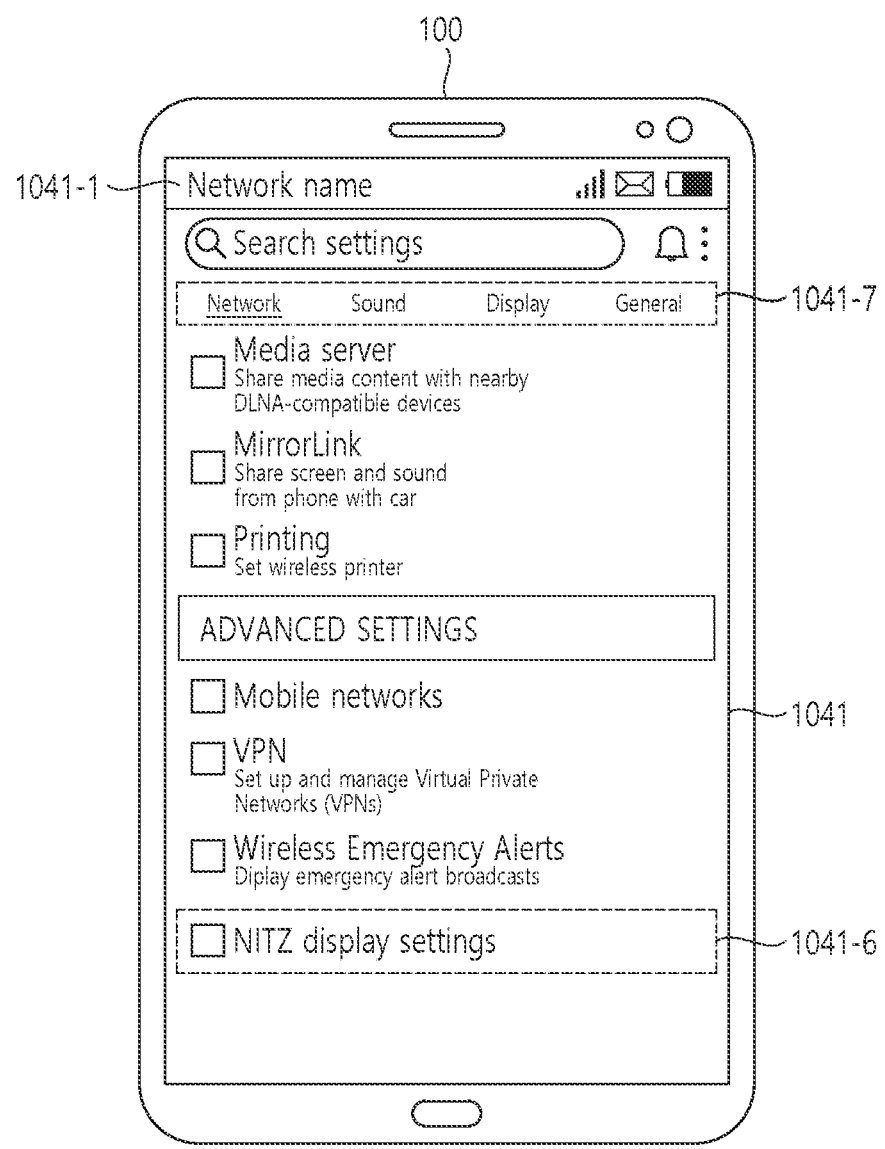
FIG. 20 is a diagram illustrating a third example of a setting screen according to the disclosure of the present specification.

FIG. 20 is a diagram illustrating a third example of a setting screen according to the disclosure of the present specification.

The terminal 100 may display a third example of the setting screen shown in FIG. 20 on the display 1041-1. Reference numerals of the display 1041 and reference numerals of the terminal 100 may be omitted. A third example of the setting screen shown in FIG. 20 is an example of a setting screen (setting screen based on a setting menu) in which language setting information related to a network name can be input.

The object 1041-1 may be an object representing the name of a network. Although "Network name" is shown in FIG. 20, this is only an example, and the object 1041-1 may represent a serving network of the terminal. For example, AT&T may be displayed on the object 1041-1.

The object 1041-7 may be an object representing a category of settings in the setting menu. In the example of FIG. 20, Network, Sound, Display, and General may be included in a category of settings. In the object 1041-7 of FIG. 20, when the user selects "Network", the terminal may display the object 1041-6 on the display 1041. In the example of FIG. 20, the object 1041-6 is displayed on the terminal when the user selects "Network", but this is only an example, and even when the user selects "Display" or "General", the terminal displays the object 1041-6 may be displayed on the display 1041.

The object 1041-6 may be an object representing a language setting related to a network name. In the example of FIG. 20, "Network name display setting" is displayed in the object 1041-6, but this is only an example, and "NITSZ display setting" or "Network ID setting" may be displayed in the object 1041-6. When the user selects the object 1041-6, the terminal may display a fourth example of the setting screen shown in FIG. 21 or a fifth example of the setting screen shown in FIG. 22 below.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 21:
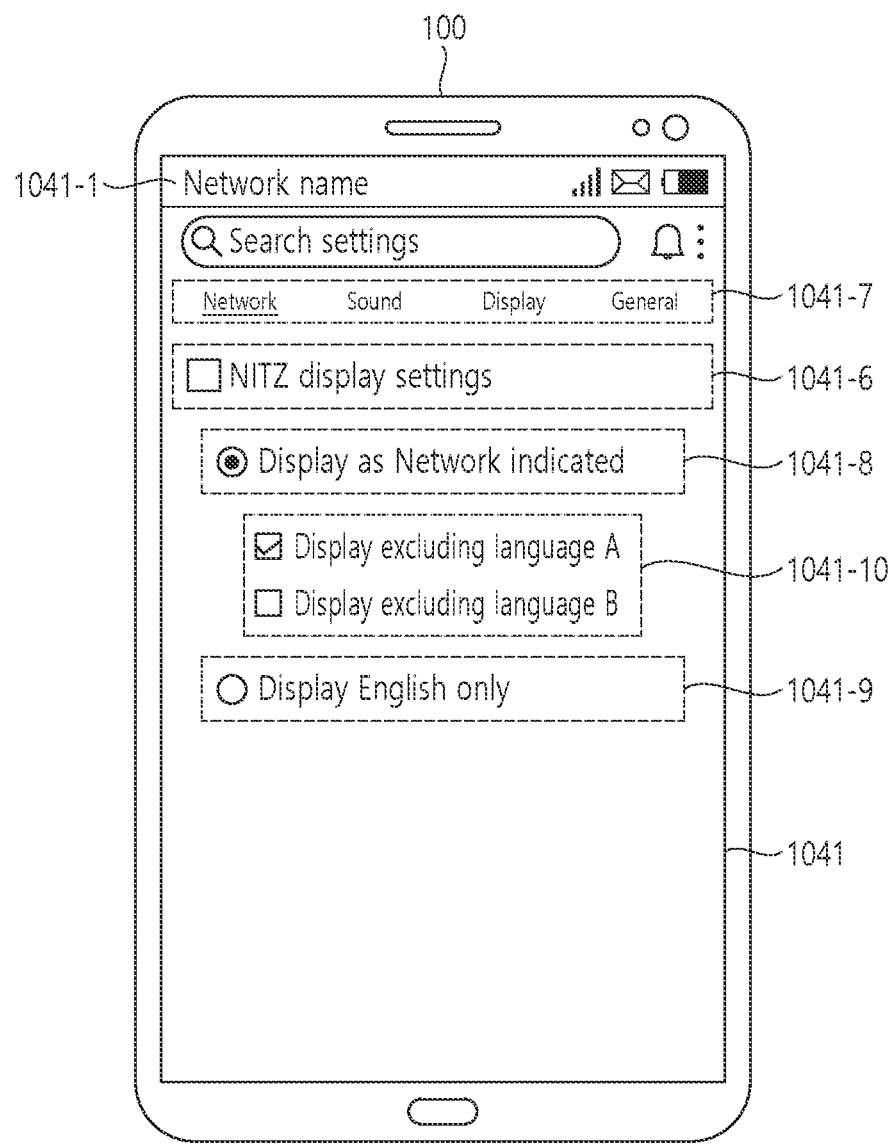
FIG. 21 is a diagram illustrating a fourth example of a setting screen according to the disclosure of the present specification.

FIG. 21 is a diagram illustrating a fourth example of a setting screen according to the disclosure of the present specification.

The terminal 100 may display a fourth example of the setting screen shown in FIG. 21 on the display 1041. A fourth example of the setting screen shown in FIG. 21 may be a setting screen displayed when the user selects the object 1041-6 in FIG. 20. A fourth example of the setting screen shown in FIG. 21 is a specific example of a setting screen (setting screen based on a setting menu) in which language setting information related to a network name can be input.

The object 1041-1, the object 1041-7, and the object 1041-6 are the same as in FIG. 20.

In FIG. 21, objects 1041-8 to 1041-10 are objects representing various options for language setting related to a network name.

The user may select an object 1041-8 or an object 1041-9. When the user selects one of the two, the terminal may identify information about the object selected by the user.

The object 1041-8 is an object related to the setting of displaying the network name as indicated by the network. Although "Display as Network indicated" is displayed in FIG. 21, this is only an example, and "Display as received network name" or "Display as stored name" may be displayed on the object 1041-8. When the user selects the object 1041-8, the terminal may store setting to use the received network name or to use the network name stored in the UICC or USIM.

When the user selects the object 1041-8, the terminal may additionally receive an input for the object 1041-10 from the user. The object 1041-10 is an object related to the setting of the language to be excluded when the terminal displays the network name. "Display excluding language A" may mean the setting to display the network name except for the language A. "Display excluding language B" may mean setting to display network names excluding language B. The user can select one or more of "Display excluding language A" and "Display excluding language B", or none of them. Although only settings for two languages are displayed on the object 1041-10, this is only an example, and settings for one language or three or more languages may be displayed on the object 1041-10.

For example, language A and language B may mean non-Latin languages (eg, Chinese, Korean, Japanese, Vietnamese, etc). Language A may be Japanese and language B may be Chinese.

User can select "Display excluding language A" and "Display excluding language B". In this case, the terminal may identify that the language setting related to the network name includes a setting to display the network name as indicated by the network and a setting not to display Japanese and Chinese. That is, the terminal may not display Japanese and Chinese in the received network name or the network name stored in the UICC or USIM.

The user may not select any of "Display excluding language A" and "Display excluding language B". In this case, the terminal may identify that the language setting related to the network name includes the setting to display the network name as it is. That is, the terminal may display the received network name or the network name stored in the UICC or USIM as it is.

The object 1041-9 is an object related to the setting to display only English. When the user selects the object 1041-9, the terminal may identify that the language setting related to the network name includes the setting to display only English in the network name. That is, the terminal may display only English, without displaying words based on languages other than English in the received network name or the network name stored in the UICC or USIM.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 22:
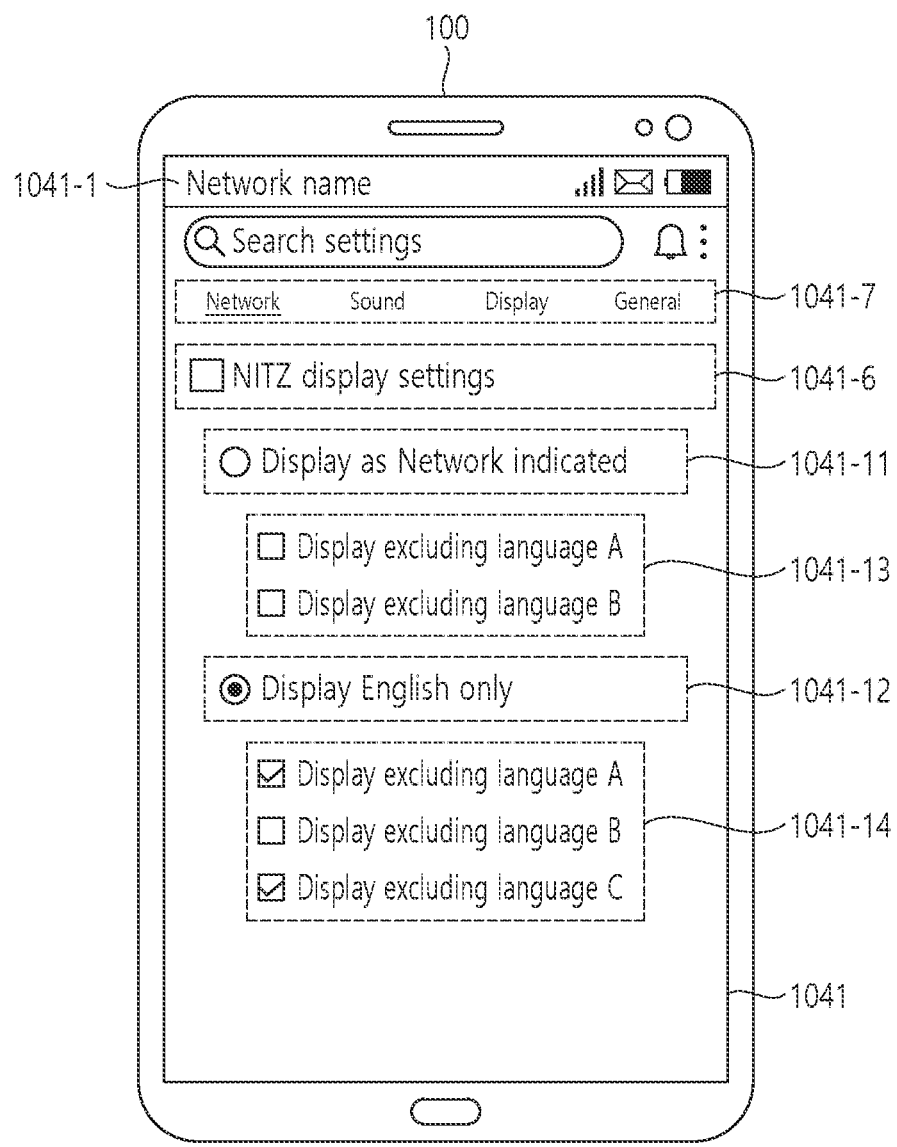
FIG. 22 is a diagram illustrating a fifth example of a setting screen according to the disclosure of the present specification.

FIG. 22 is a diagram illustrating a fifth example of a setting screen according to the disclosure of the present specification.

The terminal 100 may display a fifth example of the setting screen shown in FIG. 22 on the display 1041. Reference numerals of the display 1041 and reference numerals of the terminal 100 may be omitted. A fifth example of the setting screen shown in FIG. 22 may be a setting screen displayed when the user selects the object 1041-6 in FIG. 20. A fifth example of the setting screen shown in FIG. 22 is a specific example of a setting screen (setting screen based on a setting menu) in which language setting information related to a network name can be input.

The object 1041-1, the object 1041-7, and the object 1041-6 are the same as in FIG. 20.

In FIG. 21, objects 1041-11 to 1041-14 are objects representing various options for language setting related to a network name.

The user may select an object 1041-11 or an object 1041-12. When the user selects one of the two, the terminal may identify information about the object selected by the user.

The object 1041-11, like the object 1041-8 of FIG. 21, is an object related to the setting to display the network name as indicated by the network. The same description as for the object 1041-8 of FIG. 21 may be applied to the object 1041-11.

When the user selects the object 1041-11, the terminal may additionally receive an input for the object 1041-13 from the user. The object 1041-13 is the same as the object 1041-10 of FIG. 21. For the object 1041-13, the same description as the object 1041-10 of FIG. 21 may be applied.

The object 1041-12 is an object related to setting of a language to be displayed. When the user selects the object 1041-12, the terminal may additionally receive an input for the object 1041-14 from the user. The object 1041-14 is an object related to the setting of the language to be excluded when the terminal displays the network name. "Display excluding language A" may mean a setting to display the network name excluding language A. "Display excluding language B" may mean setting to display network names excluding language B. "Display excluding language C" may mean setting to display network names excluding language C. The user can select one or more of "Display excluding language A", "Display excluding language B", and "Display excluding language C", or nothing. Although only settings for three languages are displayed on the object 1041-14, this is only an example, and settings for two or less languages or three or more languages may be displayed on the object 1041-14.

For example, language A, language B, and language C may mean non-Latin languages (eg, Chinese, Korean, Japanese, Vietnamese, etc.). Language A may be Japanese, language B may be Chinese, and language C may be Korean.

User can select "Display excluding language A" and "Display excluding language C". In this case, the terminal may identify that the language setting related to the network name includes the setting not to display Japanese and Korean. That is, the terminal may not display Japanese and Korean.

The user may not select any of "Display excluding language A" and "Display excluding language C". In this case, the terminal may identify that the language setting related to the network name includes the setting to display all languages. That is, the terminal may display the network name as it is.

Hereinafter, according to the contents described in the disclosure of the present specification, a specific example of a screen on which the terminal displays a network name will be described. It will be described in detail with reference to FIGS. 23 and 24. For reference, an example in which the network name of the terminal's serving network is "China mobile" including Chinese characters is illustrated in FIGS. 23 and 24, but this is only an example, and the network name including characters based on other languages may also be displayed.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 23:
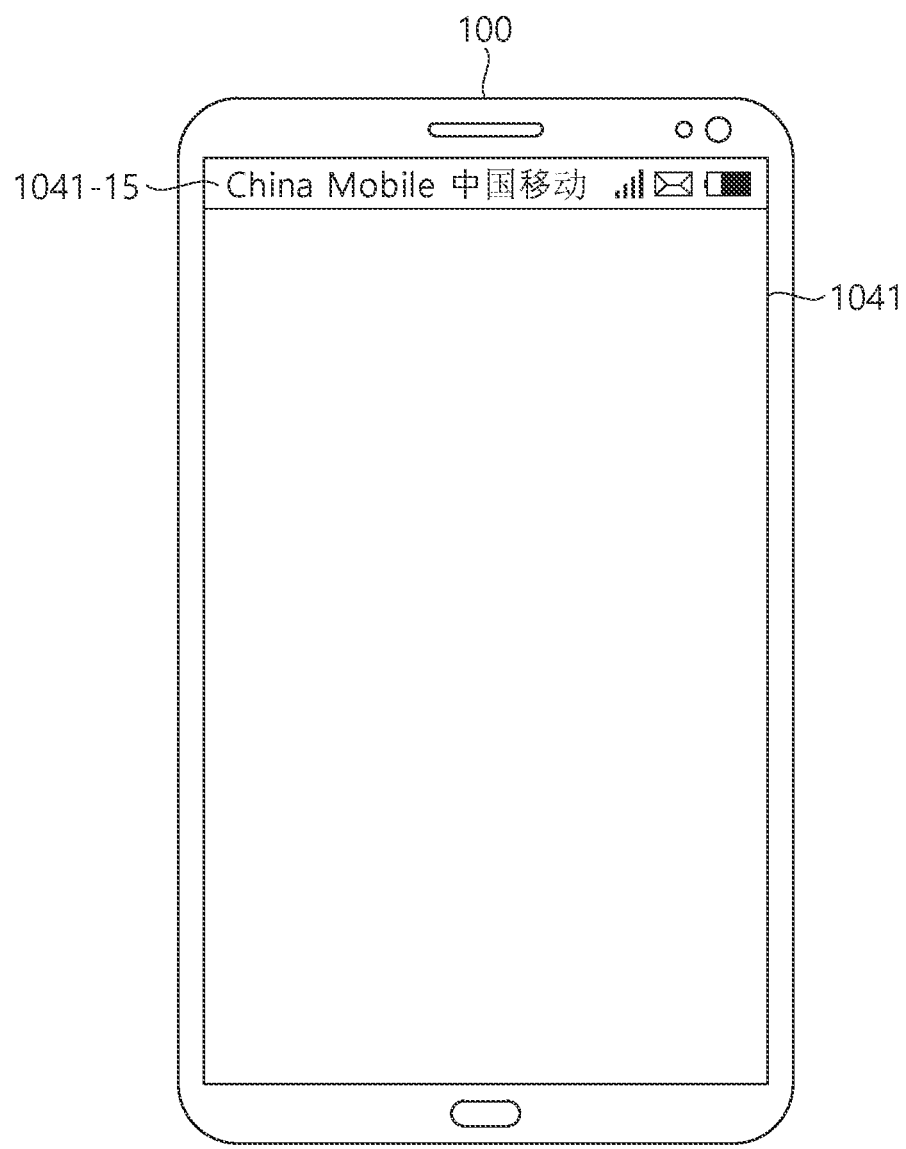
FIG. 23 is a diagram illustrating a first example of a screen on which a terminal displays a network name according to the disclosure of the present specification.
Figure 24:
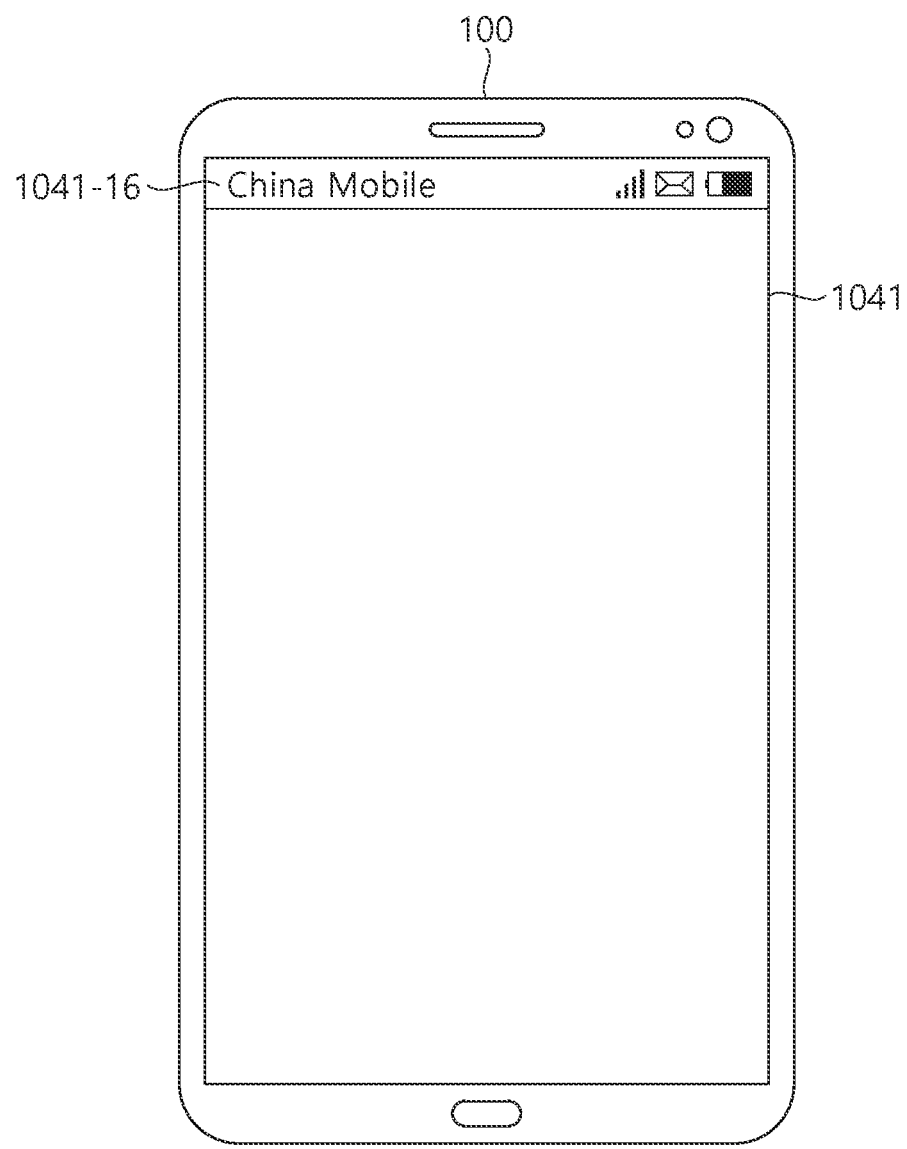
FIG. 24 is a diagram illustrating a second example of a screen on which a terminal displays a network name according to the disclosure of the present specification.

FIG. 23 is a diagram illustrating a first example of a screen on which a terminal displays a network name according to the disclosure of the present specification.

The terminal 100 may display the network name on the object 1041-15 on the display 1041. Reference numerals of the display 1041 and reference numerals of the terminal 100 may be omitted. For example, the terminal 100 may display the network name based on a language setting related to the network name, a network name stored in UICC or USIM, a received network name, or a network name selected according to a previous criterion.

In the example of FIG. 23, the object 1041-15 includes "China Mobile 中国移动". That is, the terminal may display both English-based characters (China Mobile) and Chinese-based characters (中国移动) on the object 1041-15.

For example, when the language setting related to the network name includes a setting to display the network name as it is, the terminal may display the received network name or the network name stored in the UICC or USIM as it is. That is, the terminal may display both English-based characters (China Mobile) and Chinese-based characters (中国移动) among the network names in the object 1041-15.

For another example, if the language setting related to the network name includes a setting not to display words based on Japanese, the terminal may not include all characters based on a language other than Japanese in the received network name or the network name stored in UICC or USIM. can be displayed That is, the terminal may display both English-based characters (China Mobile) and Chinese-based characters (中国移动) on the object 1041-15.

For another example, when there is no language setting related to the network name, the terminal may display the received network name or the network name stored in the UICC or USIM as it is. That is, the terminal may display both English-based characters (China Mobile) and Chinese-based characters (中国移动) among the network names in the object 1041-15.

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 24 is a diagram illustrating a second example of a screen on which a terminal displays a network name according to the disclosure of the present specification.

The terminal 100 may display the network name on the object 1041-16. Reference numerals of the display 1041 and reference numerals of the terminal 100 may be omitted. For example, the terminal 100 may display the network name based on a language setting related to the network name, a network name stored in UICC or USIM, a received network name, or a network name selected according to a previous criterion.

In the example of FIG. 24, the object 1041-16 includes "China Mobile". That is, the terminal may display English-based characters (China Mobile) among the network names on the object 1041-16.

For example, when the language setting related to the network name includes a setting to display only English-based characters, the terminal may display only English among the received network name or the network name stored in the UICC or USIM. That is, the terminal may display English-based characters (China Mobile) on the object 1041-16.

For another example, if the language setting related to the network name includes a setting not to display words based on Chinese, the terminal may display all characters based on languages other than Chinese in the received network name or the network name stored in UICC or USIM. That is, the terminal may display English-based characters (China Mobile) on the object 1041-16.

For another example, if the language setting related to the network name does not exist and the network name stored in the UICC or USIM is "China Mobile", even if the received network name is "China Mobile 中国移动", the terminal is an object (1041-16) may display English-based characters (China Mobile).

For reference, when the terminal displays character strings corresponding to the network name, the terminal may display a separator (eg, a symbol) between two consecutive strings. For example, based on the examples of FIGS. 20 to 22, when the language setting related to the input network name includes a setting not to display one or more specific languages (eg, Chinese) (eg, when one or more is selected in 1041-10 in FIG. 21, when one or more is selected in 1041-14 of FIG. 22, or when the user inputs *#6489#364# as indicated in object 1041-5 of FIG. 16), a separator (eg a symbol) may be displayed between two consecutive strings displayed on the display.

For example, if the received network name or the network name (or ID) stored in the USIM (or UICC) or terminal (eg, ME, UE) is "China Mobile 中国移动 P.R. China", "Space symbol" is includeed between "China Mobile" and "中国移动", and "Space symbol" is included between "中国移动" and "P.R.China". For reference, P.R.China may mean People's Republic of China. If the language setting related to the input network name includes a setting not to display Chinese or Chinese-based characters, the network name (or network ID) may be displayed as follows:

The terminal may display "China Mobile P.R.China" on the display. For example, the terminal may display "China Mobile P.R. China" in 1041-16 of FIG. 24; or The terminal may display a separator symbol between "China Mobile" and "P.R.China". For example, the terminal may display "China Mobile/P.R.China" on the display. "/" is an example of a separator symbol, and other separator symbols (eg, "|") may be displayed. As an example, the terminal may display "China Mobile/P.R.China" in 1041-16 of FIG. 24.

For reference, the operation of the terminal (eg, UE) described in this specification may be implemented by the apparatus of FIGS. 25 to 30 and the apparatus of FIGS. 7 and 8, which will be described below. For example, (eg, UE) may be the first wireless device 100 or the second wireless device 200 of FIG. 26. For example, an operation of a terminal (eg, UE) described herein may be processed by one or more processors 102 or 202. The operations of a terminal (eg, UE) described herein may be stored in one or more memories 104 or 204 in the form of instructions/executable code (eg instruction, executable code) executable by one or more processors 102 or 202. One or more processors 102 or 202 may control one or more memories 104 or 204 and one or more transceivers 106 or 206, and execute instructions/programs stored in one or more memories 104 or 204 to be used in the present specification. The operation of the UE described in the disclosure may be performed.

In addition, instructions for performing an operation of a terminal (eg, UE) described in the disclosure of the present specification may be stored in a non-volatile computer-readable storage medium in which it is recorded. The storage medium may be included in one or more memories 104 or 204. In addition, the instructions recorded in the storage medium may be executed by one or more processors 102 or 202 to perform the operation of the UE described in the disclosure of the present specification.

For reference, the operation of the network node (eg, AMF (or MME), UDM (or HSS), UDR) described in this specification may be implemented by the apparatus of FIGS. 25 to 27 to be described below. For example, the network node may be the first wireless device 100 or the second wireless device 200 of FIG. 26. For example, the operations of the network nodes described herein may be processed by one or more processors 102 or 202. The operations of the network nodes described herein may be stored in one or more memories 104 or 204 in the form of instructions/programs (e.g. instruction, executable code) executable by one or more processors 102 or 202. One or more processors 102 or 202 control one or more memories 104 or 204 and one or more transceivers 106 or 206, and execute instructions/programs stored in one or more memories 104 or 204 to be used in the present specification. The operation of the network node described in the disclosure may be performed.

III. Examples to which the Disclosure of this Specification is to be Applied

While not limited to thereto, the various descriptions, functions, procedures, suggestions, methods, and/or operational flowcharts of the present specification disclosed herein may be applied to in various fields requiring wireless communication/connection (e.g., 5G) between devices.

Hereinafter, a communication system to which the present specification can be applied is described in more detail with reference to the drawings. The same reference numerals in the following drawings/descriptions may illustrate the same or corresponding hardware blocks, software blocks, or functional blocks unless otherwise indicated.

Figure 25:
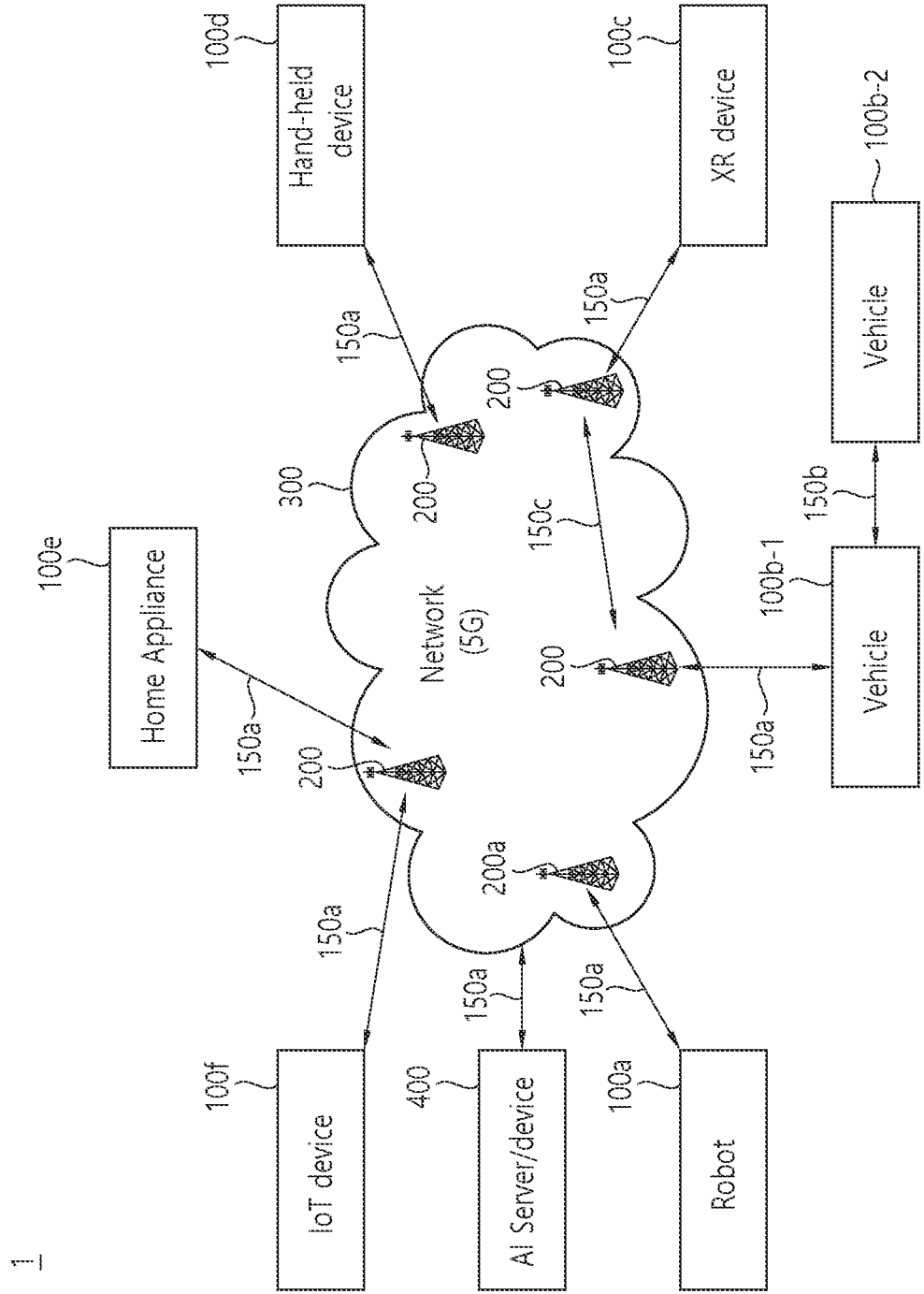
FIG. 25 illustrates a communication system 1 that can be applied to the present specification.

FIG. 25 illustrates a communication system 1 that can be applied to the present specification.

Referring to FIG. 25, a communication system 1 applied to the present specification includes a wireless device, a base station, and a network. Here, the wireless device means a device that performs communication using a wireless access technology (e.g., 5G New RAT (Long Term), Long Term Evolution (LTE)), and may be referred to as a communication/wireless/5G device. Although not limited thereto, the wireless device may include a robot 100*a*, a vehicle 100*b*-1, 100*b*-2, an eXtended Reality (XR) device 100*c*, a hand-held device 100*d*, a home appliance 100*e*, an Internet of Thing (IoT) device 100*f*, and the AI device/server 400. For example, the vehicle may include a vehicle having a wireless communication function, an autonomous vehicle, a vehicle capable of performing inter-vehicle communication, and the like. Here, the vehicle may include an unmanned aerial vehicle (UAV) (e.g., a drone). XR device may include AR (Augmented Reality)/VR (Virtual Reality)/MR (Mixed Reality) device. XR device may be implemented in the form of Head-Mounted Device (HMD), Head-Up Display (HUD), television, smartphone, a computer, a wearable device, a home appliance, a digital signage, a vehicle, a robot, and the like. The mobile device may include a smartphone, a smart pad, a wearable device (e.g., smart watch, smart glasses), and a computer (e.g., a laptop, etc.). The home appliance may include a TV, a refrigerator, a washing machine, and the like. IoT devices may include sensors, smart meters, and the like. For example, the base station and the network may be implemented as a wireless device, and the specific wireless device 200a may operate as a base station/network node to other wireless devices.

The wireless devices 100a to 100f may be connected to the network 300 through the base station 200. AI (Artificial Intelligence) technology may be applied to the wireless devices 100a to 100f, and the wireless devices 100a to 100f may be connected to the AI server 400 through the network 300. The network 300 may be configured using a 3G network, a 4G (e.g. LTE) network, a 5G (e.g. NR) network, or the like. The wireless devices 100a-100f may communicate with each other via the base station 200/network 300, but may also communicate directly (e.g. sidelink communication) without passing through the base station/network. For example, the vehicles 100b-1 and 100b-2 may perform direct communication (e.g. vehicle to vehicle (V2V)/vehicle to everything (V2X) communication). In addition, the IoT device (e.g. sensor) may directly communicate with another IoT device (e.g. sensor) or another wireless device 100a to 100f.

A wireless communication/connection 150a, 150b, 150c may be performed between the wireless devices 100a-100f/ base station 200 and base station 200/base station 200. Here, the wireless communication/connection is implemented based on various wireless connections (e.g., 5G NR) such as uplink/downlink communication 150a, sidelink communication 150b (or D2D communication), inter-base station communication 150c (e.g. relay, integrated access backhaul), and the like. The wireless device and the base station/ wireless device, the base station, and the base station may transmit/receive radio signals to each other through the wireless communication/connections 150a, 150b, and 150c. For example, wireless communications/connections 150a, 150b, 150c may transmit/receive signals over various physical channels. To this end, based on various proposals of the present specification, At least some of various configuration information setting processes for transmitting/receiving a wireless signal, various signal processing processes (e.g., channel encoding/decoding, modulation/demodulation, resource mapping/demapping, etc.) may be performed.

Figure 26:
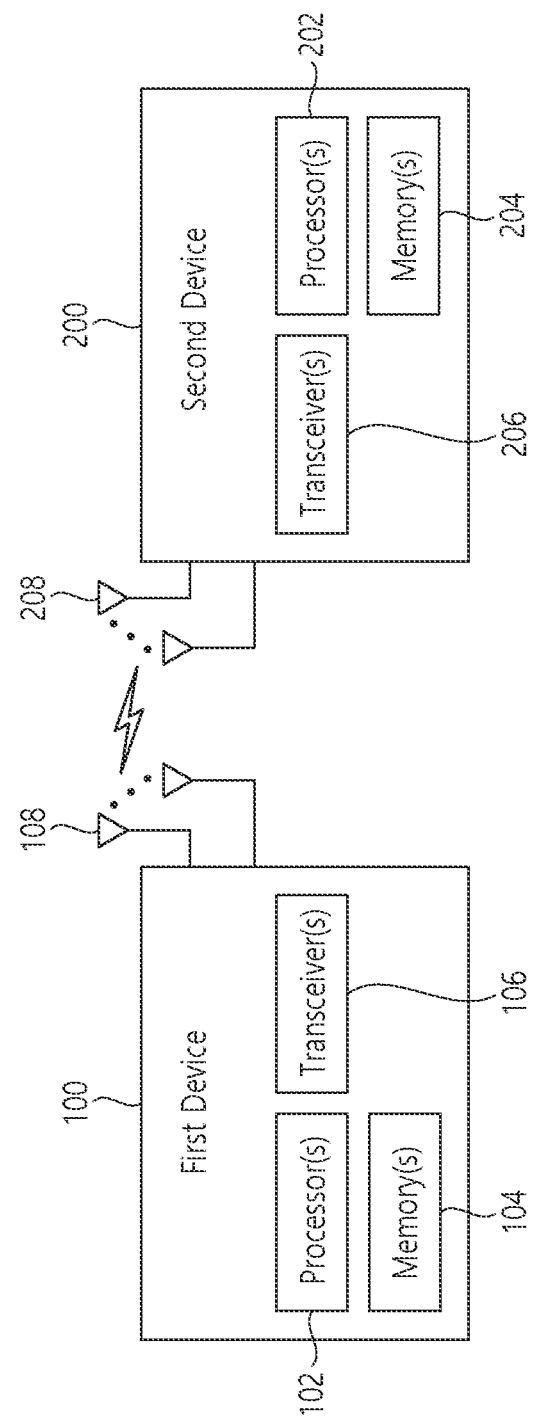
FIG. 26 illustrates an example of a wireless device that can be applied to the present specification.

FIG. 26 illustrates an example of a wireless device that can be applied to the present specification.

Referring to FIG. 26, the first wireless device 100 and the second wireless device 200 may transmit and receive wireless signals through various wireless access technologies (eg, LTE, NR). Here, {first wireless device 100, second wireless device 200} may refer to {wireless device 100x, base station 200} and/or {wireless device 100x, wireless device 100x} of FIG. 25. Alternatively, it may correspond to the first wireless device 100 and a terminal (eg, a wireless communication device such as UE or ME) described in the disclosure of the present specification, AMF (or MME), UDM (or HSS), UDR, and the like. In addition, the second wireless device 200 may correspond to a terminal (eg, a wireless communication device such as UE or ME) that communicates with the first wireless device 100, AMF (or MME), UDM (or HSS), UDR, etc.

The first wireless device 100 includes one or more processors 102 and one or more memories 104, and may further include one or more transceivers 106 and/or one or more antennas 108. The processor 102 controls the memory 104 and/or the transceiver 106 and may be configured to implement the descriptions, functions, procedures, suggestions, methods and/or operational flowcharts disclosed herein. For example, the processor 102 may process the information in the memory 104 to generate a first information/signal, and then transmit the wireless signal including the first information/signal through the transceiver 106. In addition, the processor 102 may receive the radio signal including a second information/signal through the transceiver 106 and store the information obtained from the signal processing of the second information/signal in the memory 104. The memory 104 may be connected to the processor 102 and may store various information related to the operation of the processor 102. For example, the memory 104 may store software code that includes instructions to perform some or all of the processes controlled by the processor 102 or to perform descriptions, functions, procedures, suggestions, methods and/or operational flowcharts disclosed herein. Here, the processor 102 and memory 104 may be part of a communication modem/circuit/chip designed to implement wireless communication technology (e.g., LTE, NR). The transceiver 106 may be coupled with the processor 102 and may transmit and/or receive wireless signals via one or more antennas 108. The transceiver 106 may include a transmitter and/or a receiver. The transceiver 106 may be described as being mixed with a radio frequency (RF) unit. In the present specification, a wireless device may mean a communication modem/circuit/chip.

The second wireless device 200 may include one or more processors 202, one or more memories 204, and may further include one or more transceivers 206 and/or one or more antennas 208. The processor 202 controls the memory 204 and/or the transceiver 206 and may be configured to implement the descriptions, functions, procedures, suggestions, methods and/or operational flowcharts disclosed herein. For example, the processor 202 may process the information in the memory 204 to generate third information/signal, and then transmit a wireless signal including the third information/signal through the transceiver 206. In addition, the processor 202 may receive the radio signal including the fourth information/signal through the transceiver 206 and then store the information obtained from the signal processing of the fourth information/signal in the memory 204. The memory 204 may be connected to the processor 202 and store various information related to the operation of the processor 202. For example, the memory 204 may store software code that include instructions to perform some or all of the processes controlled by the processor 202 or to perform descriptions, functions, procedures, suggestions, methods and/or operational flowcharts disclosed herein. Here, processor 202 and memory 204 may be part of a communication modem/circuit/chip designed to implement wireless communication technology (e.g., LTE, NR). The transceiver 206 may be coupled with the processor 202 and may transmit and/or receive wireless signals via one or more antennas 208. The transceiver 206 may include a transmitter and/or a receiver. The transceiver 206 may be described being mixed with an RF unit. In the present specification, a wireless device may mean a communication modem/circuit/ chip.

Hereinafter, hardware elements of the wireless devices 100 and 200 will be described in more detail. One or more protocol layers may be implemented by one or more processors 102, 202. The hardware elements of the wireless devices 100 and 200 are not limited thereto. For example, one or more processors 102 and 202 may implement one or more layers (e.g., functional layers such as PHY, MAC, RLC, PDCP, RRC, SDAP). One or more processors 102, 202 may generate one or more Protocol Data Units (PDUs) and/or one or more Service Data Units (SDUs) based on the descriptions, functions, procedures, suggestions, methods and/or operational flowcharts disclosed herein. One or more processors 102, 202 may generate messages, control information, data or information in accordance with the descriptions, functions, procedures, suggestions, methods and/or operational flowcharts disclosed herein. One or more processors 102, 202 may generate signals (e.g., baseband signals) including PDUs, SDUs, messages, control information, data or information in accordance with the functions, procedures, suggestions and/or methods disclosed herein, and may provide the signals to one or more transceivers 106 and 206. One or more processors 102, 202 may receive signals (e.g., baseband signals) from one or more transceivers 106, 206 and may obtain the PDU, the SDU, the message, the control information, the data, or the information based on a description, functions, procedures, suggestions, methods, and/or operational flowcharts disclosed herein.

The descriptions, functions, procedures, suggestions, methods, and/or operational flowcharts disclosed herein may be implemented using firmware or software, and the firmware or software may be implemented to include modules, procedures, functions, and the like. Firmware or software configured to perform the descriptions, functions, procedures, suggestions, methods, and/or operational flowcharts disclosed herein may be included in one or more processors (102, 202), or may be stored in one or more memories (104, 204) and be executed by the processor (102, 202). The descriptions, functions, procedures, suggestions, methods, and/or operational flowcharts disclosed herein may be implemented using firmware or software in the form of code, instructions, and/or a set of instructions.

One or more memories 104, 204 may be coupled with one or more processors 102, 202 and may store various forms of data, signals, messages, information, programs, codes, instructions, and/or instructions. One or more memories 104, 204 may be comprised of ROM, RAM, EPROM, flash memory, hard drive, registers, cache memory, computer readable storage medium, and/or combinations thereof. One or more memories 104, 204 may be located inside and/or outside one or more processors 102, 202. In addition, one or more memories 104, 204 may be coupled with one or more processors 102, 202 through various techniques, such as a wired or wireless connection.

One or more transceivers 106 and 206 may transmit user data, control information, wireless signals/channels, etc., as mentioned in the methods and/or operational flowcharts of this document, to one or more other devices. One or more transceivers 106 and 206 may receive, from one or more other devices, user data, control information, wireless signals/channels, etc., as mentioned in the descriptions, functions, procedures, suggestions, methods and/or operational flowcharts disclosed herein. For example, one or more transceivers 106 and 206 may be coupled with one or more processors 102 and 202 and may transmit and receive wireless signals. For example, one or more processors 102 and 202 may control one or more transceivers 106 and 206 to transmit user data, control information or wireless signals to one or more other devices. In addition, one or more processors 102 and 202 may control one or more transceivers 106 and 206 to receive user data, control information or wireless signals from one or more other devices. In addition, one or more transceivers 106, 206 may be coupled with one or more antennas 108, 208. One or more transceivers 106, 206 may be configured to transmit and receive user data, control information, wireless signals/channels, etc., which are mentioned in the procedures, functions, descriptions, suggestions, methods and/or operational flowcharts, and the like via one or more antennas 108, 208. In the present disclosure, one or more antennas may be a plurality of physical antennas or a plurality of logical antennas (e.g., antenna ports). One or more transceivers 106, 206 may convert the received wireless signal/channel or the like from RF band signal to a baseband signal to process user data, control information, wireless signals/channels, etc. in an one or more processors 102, 202. One or more transceivers 106 and 206 may use the one or more processors 102 and 202 to convert processed user data, control information, wireless signals/channels, etc. from baseband signals to RF band signals. To this end, one or more transceivers 106 and 206 may include (analog) oscillators and/or filters.

For reference, the first wireless device 100 may be the terminal 100 of FIG. 7. The processor 102 may perform the same operation as the processor 1020 of FIG. 7. The transceiver 106 may perform the same operation as the transceiver 1031 of FIG. 7. The memory 104 may perform the same operation as the memory 1010 of FIG. 7.

Figure 27:
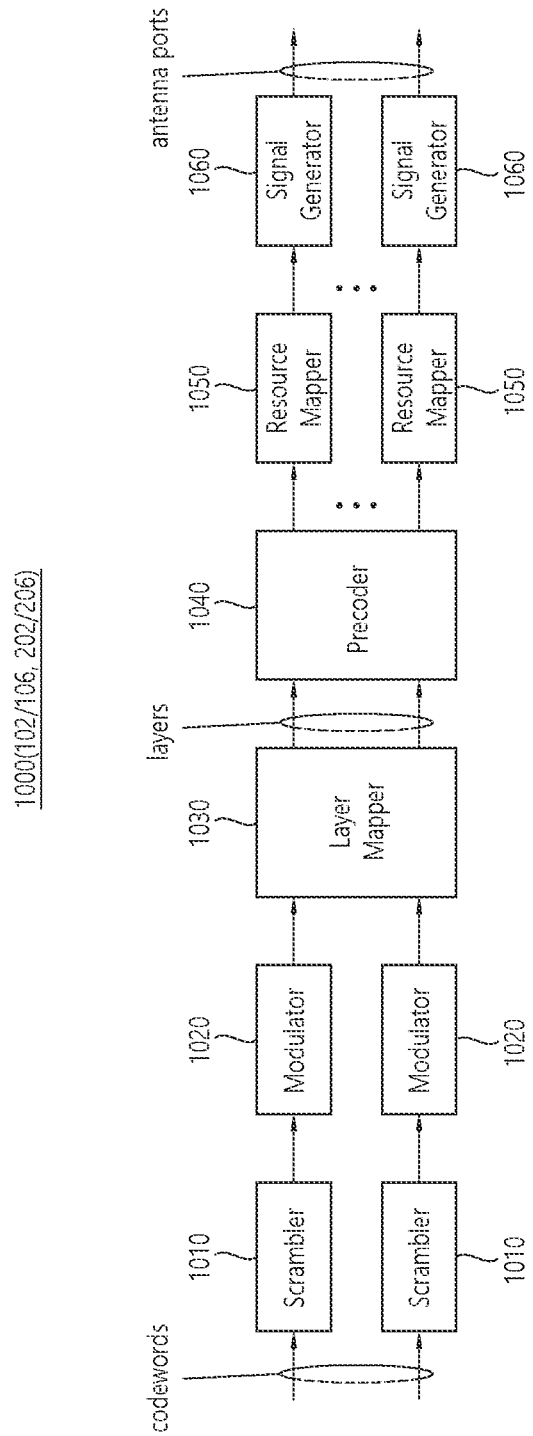
FIG. 27 illustrates an example of a signal processing circuit for a transmission signal.

FIG. 27 illustrates an example of a signal processing circuit for a transmission signal.

Referring to FIG. 27, the signal processing circuit 1000 may include a scrambler 1010, a modulator 1020, a layer mapper 1030, a precoder 1040, a resource mapper 1050, and a signal generator 1060. Although not limited thereto, the operations/functions of FIG. 27 may be performed in the processor (102, 202), the memory (104, 204) and/or transceiver (106, 206) of FIG. 26. The hardware element of FIG. 27 may be implemented in the processors 102 and 202 and/or the transceivers 106 and 206 of FIG. 26. For example, blocks 1010-1060 may be implemented in the processors 102, 202 of FIG. 26. Also, blocks 1010-1050 may be implemented in the processors 102 and 202 of FIG. 26, and block 1060 may be implemented in the transceivers 106 and 206 of FIG. 26.

The codeword may be converted into a wireless signal through the signal processing circuit 1000 of FIG. 27. Here, the codeword is an encoded bit sequence of the information block. The information block may include a transport block (e.g., a UL-SCH transport block and a DL-SCH transport block). The wireless signal may be transmitted through various physical channels (e.g., PUSCH, PDSCH).

In detail, the codeword may be converted into a scrambled bit sequence by the scrambler 1010. The scramble sequence used for scramble is generated based on the initialization value, and the initialization value may include ID information of the wireless device. The scrambled bit sequence may be modulated into a modulation symbol sequence by the modulator 1020. The modulation scheme may include pi/2-Binary Phase Shift Keying (pi/2-BPSK), m-Phase Shift Keying (m-PSK), m-Quadrature Amplitude Modulation (m-QAM), and the like. The complex modulation symbol sequence may be mapped to one or more transport layers by the layer mapper 1030. The modulation symbols of each transport layer may be mapped (precoding) to the corresponding antenna port (s) by the precoder 1040. The output z of the precoder 1040 may be obtained by multiplying the output y of the layer mapper 1030 by the precoding matrix W of N*M. Where N is the number of antenna ports and M is the number of transport layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to time-frequency resources. The time-frequency resource may include a plurality of symbols (e.g., CP-OFDMA symbols, DFT-s-OFDMA symbols) in the time domain, and may include a plurality of subcarriers in the frequency domain. The signal generator 1060 generates a radio signal from the mapped modulation symbols, and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

The signal processing procedure for the received signal in the wireless device may be configured in the reverse manner of the signal processing procedures 1010~1060 of FIG. 27. For example, a wireless device (e.g., 100 and 200 of FIG. 26) may receive a wireless signal from the outside through an antenna port/transceiver. The received wireless signal may be converted into a baseband signal through a signal recoverer. To this end, the signal recoverer may include a frequency downlink converter, an analog-to-digital converter (ADC), a CP canceller, and a fast fourier transform (FFT) module. Thereafter, the baseband signal may be restored to a codeword through a resource de-mapper process, a postcoding process, a demodulation process, and a de-scramble process. The codeword may be restored to the original information block through decoding. Thus, signal processing circuitry (not shown) for the received signal may include a signal recoverer, a resource de-mapper, a post-coder, a demodulator, a de-scrambler and a decoder.

Figure 28:
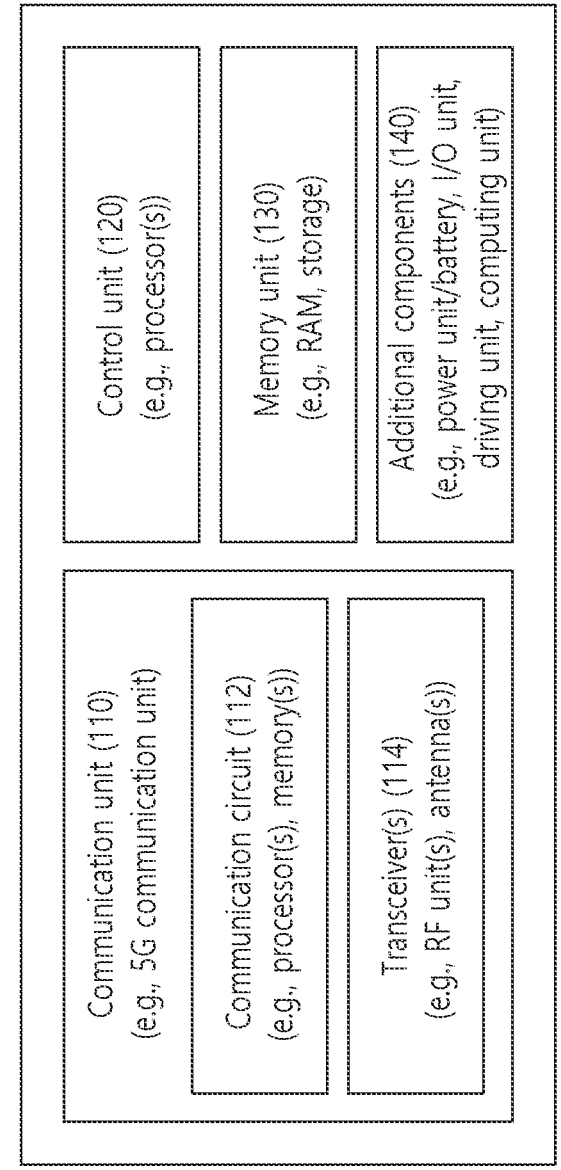
FIG. 28 illustrates another example of a wireless device that can be applied to the present specification.

FIG. 28 illustrates another example of a wireless device that can be applied to the present specification.

The wireless device may be implemented in various forms according to use-examples/services (refer to FIG. 25).

Referring to FIG. 28, the wireless devices 100 and 200 correspond to the wireless devices 100 and 200 of FIG. 26, and the wireless devices 100 and 200 may be configured with various elements, components, units, and/or modules. For example, the wireless device 100, 200 may include a communication unit 110, a control unit 120, a memory unit 130, and additional components 140. The communication unit may include communication circuit 112 and transceiver (s) 114. For example, the communication circuit 112 may include one or more processors 102, 202 and/or one or more memories 104, 204 of FIG. 26. For example, the transceiver (s) 114 may include one or more transceivers 106, 206 and/or one or more antennas 108, 208 of FIG. 26. The control unit 120 is electrically connected to the communication unit 110, the memory unit 130, and the additional components 140, and controls various operations of the wireless device. For example, the control unit 120 may control the electrical/mechanical operation of the wireless device based on the program/code/command/information stored in the memory unit 130. In addition, the control unit 120 may transmit information stored in the memory unit 130 to the outside (e.g., another communication device) through the communication unit 110 through a wireless/wired interface. The control unit 120 may store the information received through the wireless/wired interface from the outside (e.g., another communication device) through the communication unit 110 in the memory unit 130. For example, the control unit 120 may include one or more processors 102 and 202 and/or one or more memories 104 and 204 of FIG. 26. For example, the memory unit 130 may include one or more memories 104 and 204 of FIG. 26.

The additional components 140 may be variously configured according to the type of the wireless device. For example, the additional components 140 may include at least one of a power unit/battery, an input/output unit, a driving unit, and a computing unit. Although not limited thereto, the wireless device may be implemented in the form of a robot (FIG. 25, 100a), a vehicle (FIG. 25, 100b-1, 100b-2), an XR device (FIG. 25, 100c), a portable device (FIG. 25, 100d), a home appliance. (FIG. 25, 100e), IoT devices (FIG. 25, 1000, terminals for digital broadcasting, hologram devices, public safety devices, MTC devices, medical devices, fintech devices (or financial devices), security devices, climate/environment devices, an AI server/device (FIGS. 12 and 400), a base station (FIGS. 12 and 200), a network node, and the like. The wireless device may be used in a mobile or fixed location depending on the usage-example/service.

In FIG. 28, various elements, components, units/units, and/or modules in the wireless devices 100 and 200 may be entirely interconnected through a wired interface, or at least a part of them may be wirelessly connected through the communication unit 110. For example, the control unit 120 and the communication unit 110 are connected by wire in the wireless device 100 or 200, and the control unit 120 and the first unit (e.g., 130 and 140) are connected wirelessly through the communication unit 110. In addition, each element, component, unit/unit, and/or module in wireless device 100, 200 may further include one or more elements. For example, the control unit 120 may be composed of one or more processor sets. For example, the control unit 120 may be configured as a set of a communication control processor, an application processor, an electronic control unit (ECU), a graphics processing processor, a memory control processor, and the like. As another example, the memory unit 130 may include random access memory (RAM), dynamic RAM (DRAM), read only memory (ROM), flash memory, volatile memory, and non-volatile memory and/or combinations thereof.

Figure 29:
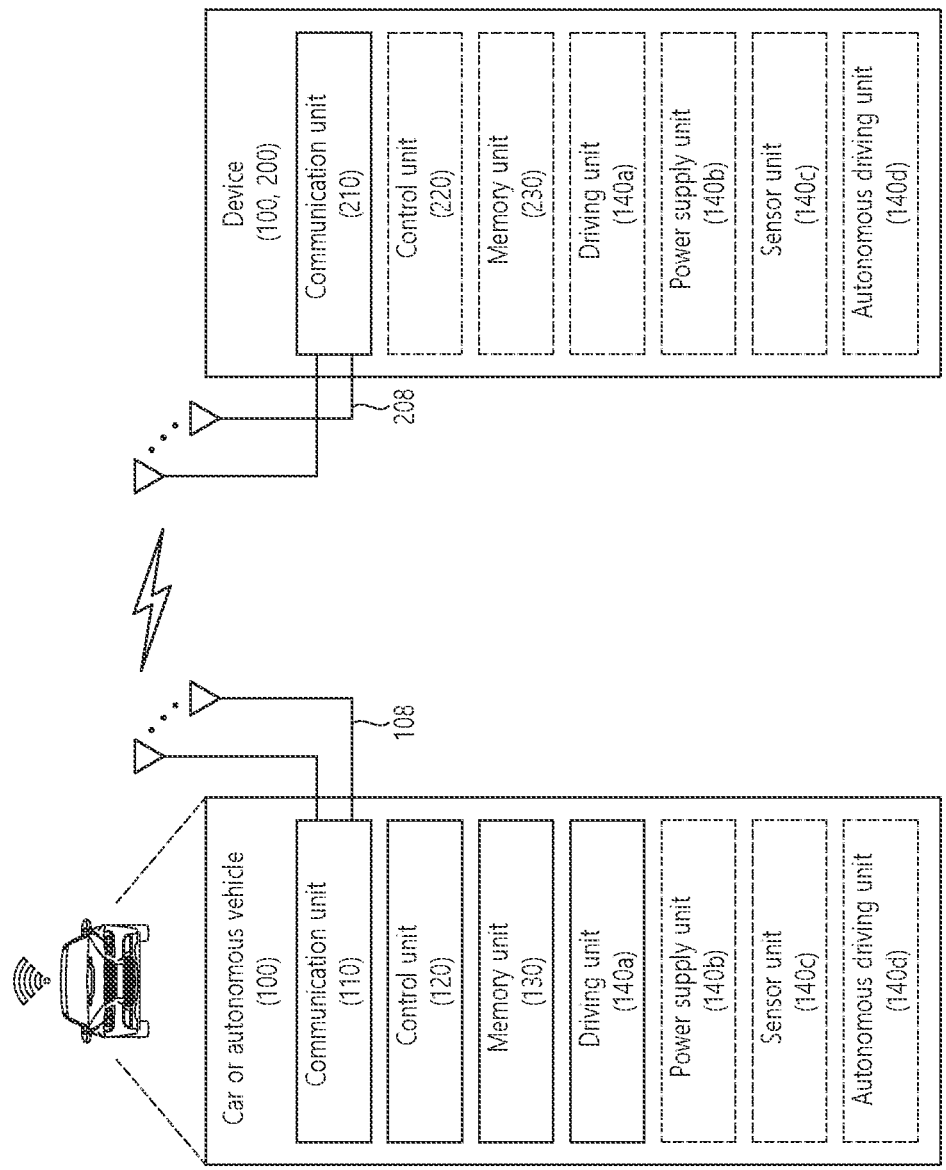
FIG. 29 illustrates an example of a vehicle or an autonomous vehicle that can be applied to the present specification.

FIG. 29 illustrates an example of a vehicle or an autonomous vehicle that can be applied to the present specification.

FIG. 29 illustrates a vehicle or autonomous vehicle applied to the disclosure of this specification. The vehicle or autonomous driving vehicle may be implemented as a mobile robot, a vehicle, a train, an aerial vehicle (AV), a ship, and the like.

Referring to FIG. 29, the vehicle or the autonomous vehicle 100 may include an antenna unit 108, a communication unit 110, a control unit 120, a driving unit 140a, a power supply unit 140b, a sensor unit 140c, and autonomous driving unit 140d. The antenna unit 108 may be configured as part of the communication unit 110. The blocks 110/130/140a to 140d may correspond to blocks 110/130/140 of FIG. 28, respectively.

The communication unit 110 may transmit or receive signals (e.g., data, control signals, etc.) with external devices, such as base stations (e.g. base stations, road side units, etc.), servers, and the like. The control unit 120 may control various elements of the vehicle or the autonomous vehicle 100 to perform various operations. The control unit 120 may include an ECU (Electronic Control Unit). The driving unit 140a may cause the vehicle or the autonomous vehicle 100 to drive on the ground. The driving unit 140a may include an engine, a motor, a power train, wheels, a brake, a steering device, and the like. The power supply unit 140b supplies power to the vehicle or the autonomous vehicle 100, and may include a wired/wireless charging circuit, a battery, and the like. The sensor unit 140c may obtain vehicle status, surrounding environment information, user information, and the like. The sensor unit 140c includes an inertial measurement unit (IMU) sensor, a collision sensor, a wheel sensor, a speed sensor, an inclination sensor, a weight sensor, a heading sensor, a position module, a position forward, and a vehicle forward/reverse sensors, battery sensors, fuel sensors, tire sensors, steering sensors, temperature sensors, humidity sensors, ultrasonic sensors, illuminance sensors, pedal position sensors, and the like. The autonomous driving unit 140d may implement a technology for maintaining a driving lane, a technology for automatically adjusting speed such as adaptive cruise control, a technology for automatically driving along a predetermined route, and automatically setting a route when a destination, and the like.

For example, the communication unit 110 may receive map data, traffic information data, and the like from an external server. The autonomous driving unit 140d may generate an autonomous driving route and a driving plan based on the obtained data. The control unit 120 may control the driving unit 140a to move the vehicle or the autonomous vehicle 100 along the autonomous driving path according to the driving plan (e.g., speed/direction adjustment). During autonomous driving, the communication unit 110 may acquire the latest traffic information data periodically or aperiodically from an external server and may obtain the surrounding traffic information data from the surrounding vehicles. In addition, during autonomous driving, the sensor unit 140c may acquire vehicle state and surrounding environment information. The autonomous driving unit 140d may update the autonomous driving route and the driving plan based on the newly obtained data/information. The communication unit 110 may transmit information regarding a vehicle location, an autonomous driving route, a driving plan, and the like to an external server. The external server may predict traffic information data in advance using AI technology or the like based on information collected from the vehicle or autonomous vehicles, and provide the predicted traffic information data to the vehicle or autonomous vehicles.

Figure 30:
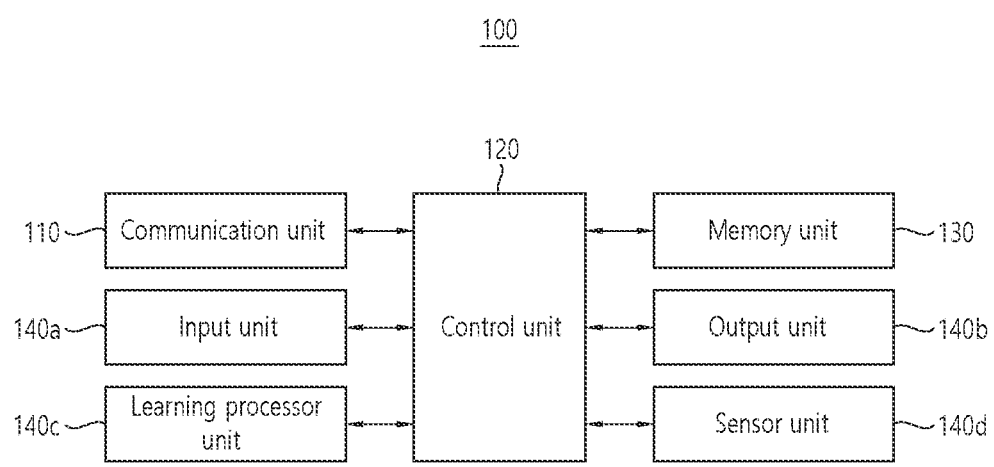
FIG. 30 illustrates an example of an AI device that can be applied to the disclosure of the present specification.

FIG. 30 illustrates an example of an AI device that can be applied to the disclosure of the present specification.

FIG. 30 illustrates an example of an AI device applied to the disclosure of the present specification. An AI device may be implemented as a fixed device or a mobile device, such as TVs, projectors, smartphones, PCs, laptops, digital broadcasting terminals, tablet PCs, wearable devices, set-top boxes (STBs), radios, washing machines, refrigerators, digital signage, robots, vehicles, and the like.

Referring to FIG. 30, the AI device 100 includes a communication unit 110, a control unit 120, a memory unit 130, an input/output unit 140a/140b, a learning processor unit 140c, and a sensor unit 140d. Blocks 110 to 130/140a to 140d respectively correspond to blocks 110 to 130/140 of FIG. 28.

The communication unit 110 communicates may transmit or receive wired signals and wireless signals (e.g., sensor information, user input, learning model, control signal, etc.) with external devices such as another AI device (e.g., FIG. 1, 100x, 200, 400) or an AI server (e.g., 400 of FIG. 25) by using a wired or wireless communication technology. To this end, the communication unit 110 may transmit information in the memory unit 130 to an external device, or may transmit a signal received from the external device to the memory unit 130.

The control unit 120 may determine at least one executable operation of the AI device 100 based on the information determined or generated using the data analysis algorithm or the machine learning algorithm. In addition, the control unit 120 may control the components of the AI device 100 to perform the determined operation. For example, the control unit 120 may request, search, receive, or utilize data of the running processor 140c or the memory 130. The control unit 120 may control the components of the AI device 100 to execute a predicted or desirable operation among at least one executable operation. In addition, the control unit 120 collects history information including the operation contents of the AI device 100 or the user's feedback on the operation, and stores the information in the memory unit 130 or the running processor unit 140c or transmits the information to an external device such as an AI server (FIG. 25, 400). The collected historical information can be used to update the learning model.

The memory unit 130 may store data supporting various functions of the AI device 100. For example, the memory unit 130 may store data obtained from the input unit 140a, data obtained from the communication unit 110, output data of the learning processor unit 140c, and data obtained from the sensing unit 140. In addition, the memory unit 130 may store control information and/or software code necessary for operation/execution of the control unit 120.

The input unit 140a may obtain various types of data from the outside of the AI device 100. For example, the input unit 140a may acquire training data for model learning, input data to which the training model is applied, and the like. The input unit 140a may include a camera, a microphone, and/or a user input unit. The output unit 140b may generate an output related to sight, hearing, or touch. The output unit 140b may include a display unit, a speaker, and/or a haptic module. The sensing unit 140 may obtain at least one of internal information of the AI device 100, environment information of the AI device 100, and user information using various sensors. The sensing unit 140 may include a proximity sensor, an illumination sensor, an acceleration sensor, a magnetic sensor, a gyro sensor, an inertial sensor, an RGB sensor, an IR sensor, a fingerprint sensor, an ultrasonic sensor, an optical sensor, a microphone, and/or a radar, and the like.

The learning processor unit 140c may train a model composed of artificial neural networks using the training data. The learning processor unit 140c may perform AI processing together with the learning processor unit of the AI server (FIGS. 12 and 400). The learning processor unit 140c may process information received from an external device through the communication unit 110 and/or information stored in the memory unit 130. In addition, the output value of the learning processor unit 140c may be transmitted to the external device through the communication unit 110 and/or stored in the memory unit 130.

As described above, although the embodiments have been described as examples, since the content and scope of this specification will not be limited only to a particular embodiment of this specification, this specification may be amended, modified, or enhanced to other various forms.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a User Equipment (UE) to process network identity (ID) information, the method comprising:
   receiving network ID information of a first network,
   wherein the network ID information includes information related to a name of the first network, and
   wherein the name of the first network includes a first character group based on a first language and a second character group based on a second language; and
   displaying, on a display of the UE, only the first character group or both of the first character group and the second character group as a network name,
   wherein displaying whether the first character group or both of the first character group and the second character group is determined based on language setting information,
   wherein the language setting information is configured based on displaying a setting screen on the display of the UE, and
   wherein the setting screen includes a first object related to displaying all character groups regardless of languages for the network name and a second object related to displaying a character group based on one or more languages among at least two languages for the network name.

2. The method of claim 1, further comprising:
   receiving the user's preferred language setting information for displaying the network name.

3. The method of claim 2,
   wherein the language setting information related to the network name includes an Unstructured Supplementary Service Data (USSD) code.

4. The method of claim 1, further comprising:
   transmitting a registration request message or an attach request message to the first network,
   wherein the language setting information related to the network name is received from the first network after the registration request message or the attach request message is transmitted.

5. The method of claim 1, further comprising:
   displaying a setting screen in which language setting information related to the network name can be input on a display of the UE.

6. The method of claim 5, further comprising:
   storing language setting information related to the network name input based on the setting screen.

7. The method of claim 6, further comprising:
   transmitting the language setting information related to the network name input based on the setting screen.

8. The method of claim 1, further comprising:
   based on the language setting information related to the network name not matching to the ID information of the first network, a network name related to the ID information of the first network stored in a Universal Integrated Circuit Card (UICC) or Universal Subscriber Identity Module (USIM) of the UE is displayed on the display of the UE.

9. The method of claim 1,
   wherein the language setting information related to the network name is information stored in the UE,
   based on the language setting related to the network name, a network name related to the ID information of the first network stored in a UICC or USIM of the UE is displayed on the display of the UE.

10. The method of claim 9,
    when the network name related to the ID information of the first network does not exist in the UICC or the USIM of the UE, based on the information related to the name of the first network and the language setting related to the network name, the name of the network is displayed on a display of the UE.

11. The method of claim 10, wherein
    when the network name related to the ID information of the first network does not exist in the UICC or the USIM of UE and there is no information related to the name of the first network, based on the language setting related to the network name, a network name related to ID information of the first network stored in a mobile equipment (ME) of the UE is displayed on a display of the UE.

12. A method performed by a User Equipment (UE) to process network identity (ID) information, the method comprising:
    displaying, on a display of the UE, a setting screen into which language setting information related to a network name can be input; and
    displaying a name of a first network on the display, based on the language setting information related to the network name input based on the setting screen and network ID information of the first network,
    wherein the name of the first network includes a first character group based on a first language and a second character group based on a second language,
    wherein the first character group or the first character group and the second character group are displayed based on the language setting information related to the network name, and
    wherein the setting screen includes a first object related to whether to display all character groups included in the network name and a second object related to whether to display a character group based on one or more languages among at least two languages in the network name.

13. The method of claim 12,
    wherein the language setting information related to the network name includes an Unstructured Supplementary Service Data (USSD) code input based on the setting screen.

14. The method of claim 13,
    wherein the setting screen includes a plurality of numbers and at least one special character so that the USSD code can be input.

15. The method of claim 13,
    wherein the USSD code includes a first USSD code related to a network name and a second USSD code related to a language.

16. The method of claim 15,
    wherein the second USSD code is related to information related to whether to display all character groups included in the network name and/or information related to whether to display only a character group based on the first language in the network name.

17. A User Equipment (UE) configured to process network identity (ID) information, the UE comprising:
at least one processor; and
at least one memory for storing instructions and operably electrically connectable with the at least one processor,
wherein the at least one processor is configured to execute the instructions to perform operations comprising:
receiving network ID information of a first network,
wherein the network ID information includes information related to a name of the first network, and
wherein the name of the first network includes a first character group based on a first language and a second character group based on a second language; and
displaying, on a display of the UE, only the first character group or both of the first character group and the second character group as a network name,
wherein displaying whether the first character group or both of the first character group and the second character group is determined based on language setting information,
wherein the language setting information is configured based on displaying a setting screen on the display of the UE, and
wherein the setting screen includes a first object related to displaying all character groups regardless of languages for the network name and a second object related to displaying a character group based on one or more languages among at least two languages for the network name.

* * * * *